US011275572B2

(12) United States Patent
Hahn et al.

(10) Patent No.: US 11,275,572 B2
(45) Date of Patent: Mar. 15, 2022

(54) SYSTEMS AND METHODS FOR PROVIDING A PACKAGED PLURALITY OF APPLICATION DATA WITHIN A GROUP-BASED COMMUNICATION SYSTEM

(71) Applicant: Slack Technologies, LLC, San Francisco, CA (US)

(72) Inventors: Michael Hahn, San Francisco, CA (US); Salman Suhail, San Francisco, CA (US); Saurabh Sahni, San Francisco, CA (US); Maria-Ivmer Real Kalalang, Pacifica, CA (US); Giacomo DiGrigoli, San Francisco, CA (US)

(73) Assignee: Slack Technologies, LLC, San Francisco, CA (US)

( * ) Notice: Subject to any disclaimer, the term of this patent is extended or adjusted under 35 U.S.C. 154(b) by 218 days.

(21) Appl. No.: 16/777,772

(22) Filed: Jan. 30, 2020

(65) Prior Publication Data
US 2021/0240460 A1 Aug. 5, 2021

(51) Int. Cl.
*G06F 3/048* (2013.01)
*G06F 8/61* (2018.01)
(Continued)

(52) U.S. Cl.
CPC .............. *G06F 8/61* (2013.01); *G06F 3/0482* (2013.01); *H04L 51/046* (2013.01);
(Continued)

(58) Field of Classification Search
CPC ....... G06F 8/61; G06F 3/0482; H04L 51/046; H04L 63/104; H04L 67/306; H04L 67/32; H04L 67/34
See application file for complete search history.

(56) References Cited

U.S. PATENT DOCUMENTS

| 9,009,654 | B1 * | 4/2015 | Webster | G06F 3/0481 717/105 |
| 10,649,755 | B2 * | 5/2020 | Fradkin | G06F 8/63 |

(Continued)

OTHER PUBLICATIONS

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

(Continued)

*Primary Examiner* — Rashawn N Tillery
(74) *Attorney, Agent, or Firm* — Holland & Hart LLP

(57) ABSTRACT

Various embodiments are directed to apparatuses, systems, and methods for authorizing within a group-based communication interface a bundled plurality of applications to be collectively installed in a group-based communication workspace enabling communications between client devices via a group-based communication system. Various embodiments are directed to apparatuses, systems, and methods for collectively installing within a group-based communication system a bundled plurality of applications associated with an application bundle. Various embodiments are directed to apparatuses, systems, and methods for generating within a group-based communication interface application bundle data associated with a plurality of applications.

72 Claims, 19 Drawing Sheets

(51) Int. Cl.
<table>
<tr><td>H04L 67/60</td><td>(2022.01)</td></tr>
<tr><td>H04L 67/00</td><td>(2022.01)</td></tr>
<tr><td>H04L 29/06</td><td>(2006.01)</td></tr>
<tr><td>H04L 67/306</td><td>(2022.01)</td></tr>
<tr><td>G06F 3/0482</td><td>(2013.01)</td></tr>
<tr><td>H04L 51/046</td><td>(2022.01)</td></tr>
</table>

(52) U.S. Cl.
CPC .......... *H04L 63/104* (2013.01); *H04L 67/306* (2013.01); *H04L 67/32* (2013.01); *H04L 67/34* (2013.01)

(56) References Cited

U.S. PATENT DOCUMENTS

<table>
<tr><td>2014/0359606 A1*</td><td>12/2014</td><td>Salameh</td><td>H04L 67/34<br>717/178</td></tr>
<tr><td>2016/0342404 A1*</td><td>11/2016</td><td>Fawcett</td><td>G06F 8/61</td></tr>
<tr><td>2018/0287982 A1</td><td>10/2018</td><td>Draeger et al.</td><td></td></tr>
<tr><td>2020/0257515 A1*</td><td>8/2020</td><td>Totale</td><td>G06F 8/71</td></tr>
</table>

OTHER PUBLICATIONS

"How Slack changed the way we work by putting the customer experience first", Repeat Customer Podcast, Episode 3, [online][retrieved May 9, 2019], Retrieved from the Internet: <URL: https://www.zendesk.com/resources/slack-customer-experience/, (2019) 13 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

David Auerbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Ernie Smith, "Picking Up The Slack", Tedium, [online][retrieved May 9, 2019], Retrieved from the Internet: <URL: https://tedium.co/2017/10/17/irc-vs-slack-chat-history/>. (dated Oct. 17, 2017) 8 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 17 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications—", FUJITSU Sci. Tech. J., 36, 2, (Dec. 2000) 154-161.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield On How Slack Became A $2.8 Billion Unicorn", Forbes, [online][retrieved May 9, 2019], Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

SYSTEMS AND METHODS FOR PROVIDING A PACKAGED PLURALITY OF APPLICATION DATA WITHIN A GROUP-BASED COMMUNICATION SYSTEM

BACKGROUND

Various computer program products have been provided for providing one or more applications for the installation within a computer-integrated platform. Further, various computer program products have been provided for authorizing an application for the installation within a computer-integrated platform. Additionally, various computer program products have been provided for authenticating an application for the installation within a computer-integrated platform.

Through applied effort, ingenuity, and innovation many deficiencies of such platforms have been solved by developing solutions that are in accordance with the embodiments as discussed herein, many examples of which are described in detail herein.

BRIEF SUMMARY

Various embodiments are directed to systems and methods for providing a packaged plurality of applications within a group-based communication system.

Various embodiments are directed to an apparatus for authorizing within a group-based communication interface a bundled plurality of applications to be collectively installed in a group-based communication workspace enabling communications between client devices via a group-based communication system, the apparatus comprising at least one processor, and at least one non-transitory memory comprising instructions that, with the at least one processor, cause the apparatus to: receive an application bundle installation request comprising application bundle data; in response to receiving the application bundle installation request, retrieve the application bundle data from a group-based communication repository, the application bundle data comprising a plurality of application identifiers associated respectively with a plurality of applications and at least one executable instruction associated with each of the plurality of applications; generate an application bundle authorization data packet comprising an application bundle installation authorization request and at least one authorization token corresponding to the plurality of applications associated with an application bundle identifier, wherein the application bundle installation authorization request is associated with the application bundle identifier and a group-based communication workspace identifier; transmit the application bundle authorization data packet to at least one administrator client device respectively associated with at least one administrator user identifier associated with the group-based communication workspace identifier; upon receiving a response from the at least one administrator client device, wherein the response comprises the least one authorization token corresponding with the plurality of applications associated with the application bundle identifier, generate a plurality of authorized application indicators respectively associated with each of the plurality of applications associated with the application bundle identifier, each of the plurality of authorized application indicators being associated with the group-based communication workspace identifier.

In various embodiments, the at least one non-transitory memory may further comprise instructions that, with the at least one processor, cause the apparatus to retrieve from the repository an available application table associated with the group-based communication workspace identifier, the available application table identifying one or more applications available for installation within a group-based communication workspace associated with the group-based communication workspace identifier; parse the available application table to detect one or more of the plurality of application identifiers associated with the application bundle identifier; and determine, based at least in part on the available application table, whether each of the plurality of applications associated with the application bundle identifier are authorized. In various embodiments, the application bundle installation request identifying the application bundle identifier may be received from a client device associated with a user identifier, the application bundle request being associated with one or more of the user identifier, the group-based communication workspace identifier, or the application bundle identifier, wherein the user identifier is associated with access rights to a group-based communication workspace associated with the group-based communication workspace identifier.

In various embodiments, the at least one non-transitory memory may further comprise instructions that, with the at least one processor, cause the apparatus to generate a plurality of authorized application indicators respectively associated with each of the plurality of applications associated with the application bundle identifier and the group-based communication workspace identifier. In various embodiments, the at least one non-transitory memory may further comprise instructions that, with the at least one processor, cause the apparatus to execute the at least one executable instruction associated with the plurality of applications to install one or more of the plurality of applications at the group-based communication system such that all of the one or more of the plurality of applications is associated with one or more of a user identifier or a group-based communication workspace identifier, wherein the group-based communication workspace identifier is associated with a group-based communication workspace enabling communications between client devices via the group-based communication system, and wherein the user identifier is associated with access rights to a group-based communication workspace. In various embodiments, the application bundle data may comprise application data respectively associated with each of the plurality of application identifiers. In various embodiments, the application bundle data may comprise workflow data, wherein the workflow data is configured to cause a group-based communication system to facilitate execution of one or more steps required to install each of the plurality of applications respectively associated with each of the plurality of application identifiers within a group-based communication workspace.

In various embodiments, the at least one non-transitory memory may further comprise instructions that, with the at least one processor, cause the apparatus to receive user credential data associated with a user identifier associated with a user profile and with at least one application of the plurality of applications associated with a corresponding application identifier of the plurality of application identifiers associated with the application bundle identifier; and transmit an application authentication data packet to the at least one application respectively associated with the corresponding application identifier of the plurality of application identifiers associated with the application bundle identifier, the application authentication data packet comprising the user credential data associated with the corresponding application identifier of the plurality of application identifiers;

and receive at least one response from the at least one application, wherein the at least one response comprises at least one authentication token associated with the corresponding application identifier of the plurality of application identifiers, the user identifier, and the user credential data. In various embodiments, the at least one non-transitory memory may further comprise instructions that, with the at least one processor, cause the apparatus to transmit an interactive application bundle authentication interface comprising at least one interactive dialogs, each of the at least one interactive dialogs being respectively the at least one application associated with a corresponding application identifier of the plurality of application identifiers associated with the application bundle identifier and configured to receive user credential data associated with the corresponding application identifier of the plurality of application identifiers associated with the application bundle identifier. In various embodiments, the at least one application may comprise a plurality of unauthenticated applications, each of the plurality of unauthenticated applications being associated with a corresponding application identifier of the plurality of application identifiers.

In various embodiments, the at least one administrator user identifier may comprise a workspace administrator user identifier associated with a workspace administrator user, wherein the workspace administrator user is a user associated with a user profile that is associated with credentials that indicate that the administrator client device associated therewith may edit access control parameters associated with the group-based communication workspace identifier.

In various embodiments, the at least one administrator user identifier may comprise an enterprise administrator user identifier associated with an a enterprise administrator user and enterprise identifier associated with the group-based communication workspace identifier, wherein the enterprise administrator user is a user associated with a user profile having credentials indicating that the administrator client device associated therewith has permissions to edit access control parameters associated with a plurality of group-based communication workspaces associated with the enterprise identifier, the plurality of group-based communication workspaces comprising the group-based communication workspace. In various embodiments, the at least one authorization token may comprise a plurality of authorization tokens comprising a first authorization token and a second authorization token, wherein the first authorization token is associated with the group-based communication workspace identifier and the second authorization token is associated with a second group-based communication workspace identifier associated with a second group-based communication workspace of the plurality of group-based communication workspace associated with the enterprise identifier. In various embodiments, the at least one administrator user identifier may further comprise a workspace administrator user identifier associated with an a workspace administrator user and enterprise identifier associated with the group-based communication workspace identifier, wherein the workspace administrator user is a user associated with a user profile that is associated with credentials that indicate that the administrator client device associated therewith may edit access control parameters associated with the group-based communication workspace identifier.

In various embodiments, the application bundle authorization data packet may further comprise an interactive application bundle authorization interface configured to display at least one of the plurality of application identifiers, wherein the interactive application bundle authorization interface may be configured such that the response received from the administrator client device corresponds with a selective authorization of one or more of the at least one of the plurality of application identifiers for installation within a group-based communication workspace. In various embodiments, the interactive application bundle authorization interface may comprise a selectable element corresponding to each of the at least one of the plurality of application identifiers displayed within the interactive application bundle authorization interface, and wherein the response received from the administrator client device corresponds with a selective authorization of each of the at least one of the plurality of application identifiers for installation within the group-based communication workspace.

In various embodiments, the at least one non-transitory memory may further comprise instructions that, with the at least one processor, cause the apparatus to render a plurality of selectable elements respectively associated with each of the plurality of application identifiers for display within a group-based communication interface. In various embodiments, the at least one non-transitory memory may further comprise instructions that, with the at least one processor, cause the apparatus to serially install at least a portion of the plurality of applications respectively associated with the plurality of application identifiers associated with the application bundle identifier such that the at least a portion of the plurality of applications are installed within a group-based communication workspace in a first sequence.

In various embodiments, the at least one non-transitory memory may further comprise instructions that, with the at least one processor, cause the apparatus to at least substantially simultaneously install at least a portion of the plurality of applications respectively associated with the plurality of application identifiers associated with the application bundle identifier. In various embodiments, the application bundle data may further comprise an application bundle accessibility setting, the application bundle accessibility setting corresponding to data configured to define at least a portion of users of a group-based communication system to which a selectable element associated with the application bundle identifier is provided via a group-based communication interface associated with a corresponding user identifier associated therewith. In various embodiments, the at least one non-transitory memory may further comprise instructions that, with the at least one processor, cause the apparatus to render within a group-based communication interface an available application bundle menu comprising a selectable application bundle element associated with the application bundle identifier; wherein the available application bundle menu further comprises a recommended application bundle identifier, wherein the recommended application bundle identifier is generated based at least in part on one or both of historical data and contextual data associated with a user identifier associated with the client device.

Various embodiments are directed to a computer-implemented method for authorizing within a group-based communication interface a bundled plurality of applications to be collectively installed in a group-based communication workspace enabling communications between client devices via a group-based communication system. Various embodiments are directed to a computer program product for authorizing within a group-based communication interface a bundled plurality of applications to be collectively installed in a group-based communication workspace enabling communications between client devices via a group-based communication system.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
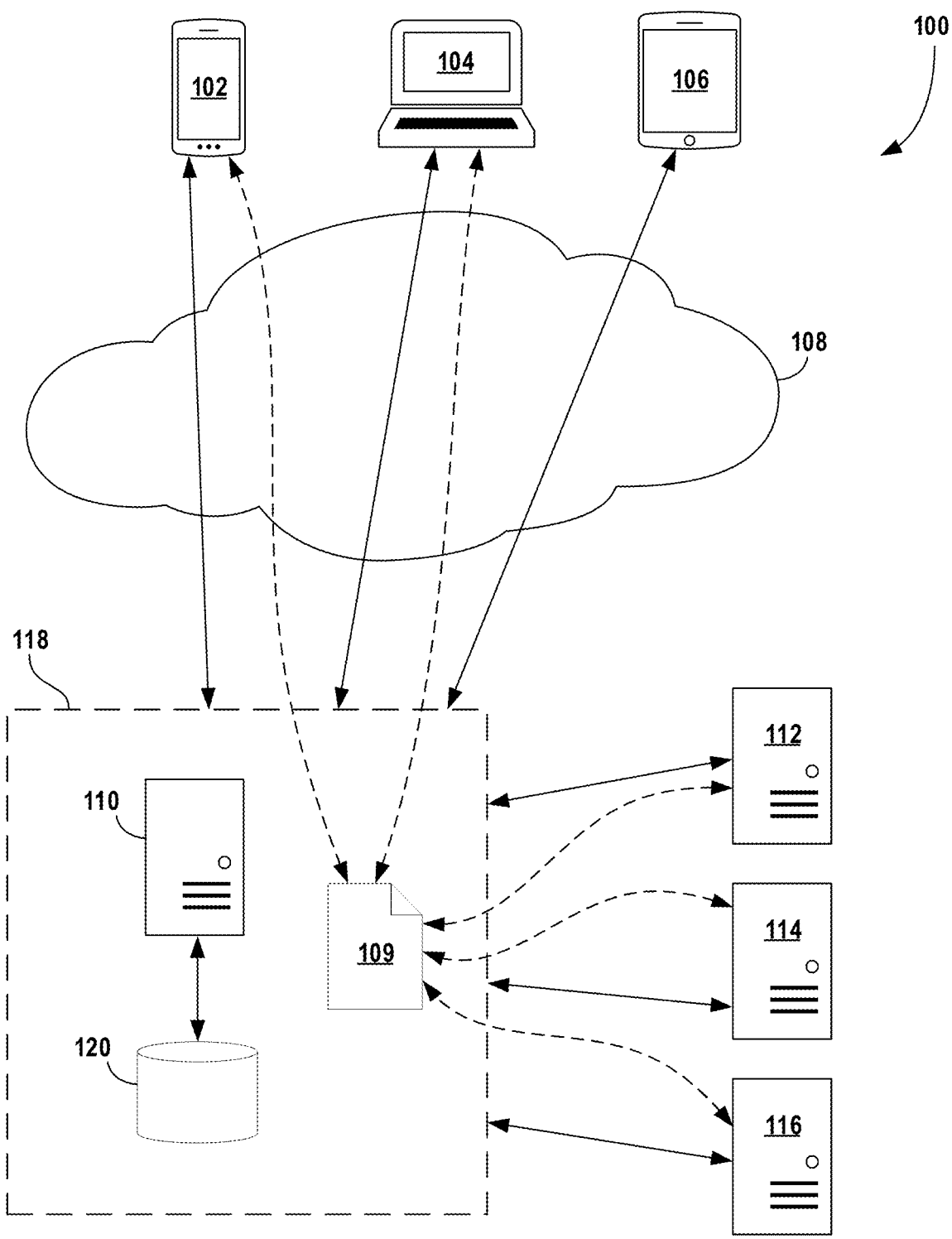
FIG. 1 illustrates a schematic view of a system encompassing a group-based communication system in communication with one or more client devices in accordance with one embodiment.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Glossary

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, objects, messages, etc., with specific groups.

The term "group-based communication system" refers to the platform through which client devices may communicate and interact in a group-based setting. The group-based communication system may comprise a collection of computing services that are accessible to one or more client devices, and that are operable to provide access to a plurality of software applications related to operations of databases. In some examples, the group-based communication system may take the form of one or more central servers disposed in communication with one or more additional servers running software applications, and having access to one or more databases storing digital content items, application-related data, and/or the like. The group-based communication system may also support client retention settings and other compliance aspects. Further, the group-based communication system may provide comprehensive third party developer support that grants appropriate access to the data and allows third parties to build applications and bots to integrate with customer's workflows. Group-based communication system users are organized into organization groups (e.g., employees of each company may be a separate organization group) and each organization group may have one or more communication channels (e.g., group-based communication channels) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier). Group-based communication system users may join and/or create communication channels (e.g., group-based communication channels). Some group-based communication channels may be globally accessible to those users having a particular enterprise identifier associated with their user profile (i.e., users who are members of the organization). A user may access the group-based communication system via a client device to enable access to one or more group-based communication interfaces including various information and/or data linked to group-based communication workspaces and/or group-based communication channels associated with an authenticated user account. Each user account may be provisioned to access one or more group-based communication workspaces and/or associated group-based communication channels. Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "group-based communication server" refers to computing devices configured for interacting with various client devices for receiving and/or disseminating messages for distribution within communication channels. Group-based communication servers may be configured to receive, store (in an associated database), and/or direct messages exchanged between users (operating via client devices). The functionality of the group-based communication servers may be provided via a single server or collection of servers having a common functionality, or the functionality of the group-based communication servers may be segmented among a plurality of servers or collections of servers performing subsets of the described functionality of the group-based communication servers. For example, a first subset of group-based communication servers may be configured for receiving messages from client devices and/or for transmitting messages to client devices (e.g., via one or more interface servers). These group-based communication servers may be in communication with a second subset of group-based communication servers configured for collecting messages distributed within communication channels and for storing those messages within a message repository database for indexing and archiving.

The term "group-based communication interface" refers to a virtual communications environment configured to facilitate user interaction with a group-based communications system. Each group-based communication interface is accessible and viewable to a select group of users, such as a group of employees of a business or organization (e.g., the Slack Corp. interface would be accessible and viewable to the Slack employees however the ACME Corporation group-based communication interface would not be accessible and viewable to Slack employees). The group-based communication interface may provide access to any of a number of accessible group-based communication channels within each workspace. The group-based communication interface includes a plurality of group-based communication channels (e.g., a marketing channel, sales channel, accounting channel, etc.), which are defined herein.

The term "group-based communication system data corpus" refers to a collection of data that has been received by a group-based communication system through group-based communication interfaces. In some embodiments, a group-based communication system data may comprise one or more of a group-based communication data work objects, group-based communication messages, group-based communication channels, and user profiles associated with the group-based communication system.

As used herein, the terms "group-based communication object," "group-based communication data object," and "group-based communication data works object" refer to a collection of data and instructions that represent an item or resource of the group-based communication system. Each group-based communication object has an object identifier that uniquely identifies a particular group-based communication object in the group-based communication system and an object type, which describes the category of objects to which the group-based communication object belongs. In some embodiments, users may perform actions via a group-based communication interface that create or modify group-based communication objects. Example group-based communication objects include group-based communication channels, user profile identifiers, indications of user profiles (such as pointers with reference to user profiles), files created and maintained in the group-based communication system, files linked or uploaded to the group-based communication system, user accounts, emojis posted in a group-based communication channel, emojis available in a group-based communication channel, metadata associated with group-based communication messages such as author identifiers, a post timestamp, a channel identifier, user identifiers of users with access rights to the group-based communication message, and the like.

As used herein, the term "group-based communication message" refers to any electronically generated digital content object provided by a user that has security sufficient such that it is accessible only to a defined group of users and that is configured for display within a group-based communication channel. Communication messages may include any text, image, video, audio, or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a timestamp associated with post of the message, a sending user identifier, a message identifier, message contents, a group identifier, a group-based communication channel identifier, a thread identifier, and the like. Each of the foregoing identifiers may comprise ASCII text, a pointer, a memory address, and the like.

The term "group-based communication workspace" refers to a group of users and a set of group-based communication objects all of which are associated with a common workspace identifier. The term "group-based communication workspace" may be used interchangeably with the term "group-based communication interface". In various embodiments, users sharing a workspace identifier and/or a group identifier also share group-based communication objects. In other words, users sharing a common workspace identifier that is also shared by a set of group-based communication objects may access those group-based communication objects to perform actions on those objects, such as viewing messages, posting messages, opening files, and the like. However, in some embodiments of a workspace, some group-based communication objects require that a group member have specific credentials or adequate permissions before the group-based communication object becomes accessible to the group member. As an example, private group-based communication channels are not generally accessible to all group members; instead, the private group-based communication channels are accessible to only a subset of group members. Similarly, certain files and other group-based communication objects, such as user accounts, are accessible to only a subset of the group members.

The term "group-based communication workspace identifier" refers to one or more identifiers by which a workspace within a group-based communication system may be uniquely identified. For example, a group-based communication workspace identifier may comprise ASCII text, a pointer, a memory address, and the like. An enterprise or other entity within a group-based communication system may be associated with any number of group-based communication workspace identifiers.

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) may be displayed to each member of the group-based communication channel. For instance, in one embodiment, a common set of group-based messaging communications will be displayed to each member of the respective group-based communication channel such that the content of the group-based communication channel (i.e., messaging communications) will not vary per member of the channel. However, in another embodiment, a member may join a group-based communication channel and only be able to view subsequent group-based messaging communications (as opposed to historical group-based messaging communications). The group-based communication channels are generally topic-oriented, long-lasting channels as opposed to ad hoc ephemeral conversations in conventional messaging apps.

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel. In various embodiments, a private group-based communication channel may be associated with a group-based communication channel identifier.

The term "group-based communication channel identifier" refers to one or more items of data by which a group-based communication channel may be uniquely identified. For example, a group-based communication channel identifier may comprise ASCII text, a pointer, a memory address, and the like.

"Group-based communication channel interface" in this context refers to a virtual communications environment or feed that is configured to display messaging communications posted by channel members (e.g., validated users accessing the environment using client devices) that are viewable only to the members of the group. The format of the group-based communication channel interface may appear differently to different members of the group-based communication channel; however, the content of the group-based communication channel interface (i.e., messaging communications) will be displayed to each member of the group-based communication channel. For instance, a common set of group-based messaging communications will be displayed to each member of the respective group-based communication channel such that the content of the group-based communication channel interface (i.e., messaging communications) will not vary per member of the group-based communication channel.

The term "group-based communication repository" refers to a computing location where data is stored, accessed, modified and otherwise maintained by the group-based communication system. The stored data includes information that facilitates the operation of the group-based communication system. The group-based communication repository may be embodied as a data storage device or devices, as a separate database server or servers, or as a combination of data storage devices and separate database servers. Further, in some embodiments, the group-based communication repository may be embodied as a distributed repository such that some of the stored data is stored centrally in a location within the group-based communication system and other data stored in a single remote location or a plurality of remote locations. Alternatively, in some embodiments, the group-based communication repository may be distributed over a plurality of remote storage locations only.

The term "group-based communication message timestamp" refers to a digital representation of network time associated with receipt of a group-based communication message by a group-based communication system. The timestamp may be analyzed to determine context regarding the message (e.g., the exact moment at which the message was sent in a group-based communication channel).

The term "group-based communication object timestamp" refers to a digital representation of network time associated with receipt of a group-based communication object by a group-based communication system. The timestamp may be analyzed to determine context regarding the object (e.g., the exact moment at which the object was transmitted in a in a group-based communication channel associated therewith, the exact moment at which the object was selectively associated with a digital signature data structure).

"Data" in this context refers to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like. Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "data packet" as utilized herein refers to a collection of individual data elements that may be transmitted between a plurality of computing entities collectively, such that the included data remains associated therewith. The data packet may be configured to store data (e.g., routing data) therein with a standardized formatting, such that computing entities may be configured to automatically determine the type of data stored within the data packet. For example, a data packet may comprise substantive data to be passed between computing entities stored within a payload of the data packet, and the data packet may comprise metadata associated with the generation of the data packet that is stored within a routing data portion of the data packet. In certain embodiments, for example, an application bundle authorization data packet comprising an application bundle installation authorization request and one or more authorization tokens may be generated by a group-based communication server and provided to a client device associated with an administrator user to enable the authorization of the installation one or more applications associated with an application bundle identifier within a group-based communication workspace. In certain embodiments, for example, an application bundle authentication data packet comprising application authentication routing data and payload data (e.g., user credential data) may be generated by a group-based communication server and provided to an application to enable the external application system to authenticate the user profile associated with a user identifier based at least in part on the payload data "User" in this context refers to an individual, a group of individuals, business, organization, and the like. Users may access a group-based communication or messaging system using client devices. "Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups. For example, a user may comprise a developer user associated with an external application.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, a plurality of historical conversation primitives associated with the user profile, an avatar, an email address, a real name (e.g., John Doe), a username (e.g., jdoe), a password, a real name, a time zone, a status, conversation segments associated with the user, metadata indicating historical messages with same conversation primitive shared with other user profiles, a digital signature data structure, and the like. The user account details can include a subset designation of user credentials, such as, for example, login information for the user including the user's username and password.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

Client devices access the group-based communication system via the network during "connection sessions" during which the client device maintains an active connection with the group-based communication system for data transfer therebetween. A single connection session may encompass a continuous time period during which the client device maintains a connection with the group-based communication system (e.g., between consecutive interruptions in connection, between consecutive occurrences of establishing and ending a connection, and/or the like). It should be understood that in certain embodiments, a connection session may continue between consecutive occurrences for establishing and ending a connection between a client device and the group-based communication system, despite the inclusion of one or more short-duration interruptions, during which the client device and/or the group-based communication system is configured to cache any data to be exchanged which is generated and/or retrieved during the short-duration interruption. While a connection session remains active, it may be referred to as a "current connection session." Once a current connection session ends (e.g., by termination of the connection between the client device and the group-based communication system) the current connection session becomes a prior connection session. Connection sessions may have associated unique "session identifiers," thereby enabling a client device and/or the group-based communication system to distinguish between a current connection session and prior connection sessions. These session identifiers may be alphanumeric strings (or other unique identifiers) that are unique to a particular session.

The term "enterprise" should be understood to refer to a company, organization and the like. These terms are used interchangeably throughout the disclosure. It will be appreciated that an "enterprise" or "organization" may be associated with an enterprise identifier or an organization identifier, respectively. In various embodiments, an enterprise may be associated with one or more group-based communication workspaces. Enterprises may each encompass a plurality of groups or teams, each associated with a particular group-based communication workspace, thereby providing a hierarchical structure to the enterprise. An enterprise may be associated with an enterprise administrator user identifier associated with an enterprise administrator.

The term "creator user identifier" refers to one or more items of data by which the creator of an application bundle installation request or an application bundle generation request may be identified. The creator user identifier may be an email address, user identifier, global identifier, an IP address, or any other type of information that can identify a requesting entity. In some embodiments, the creator user identifier may include a group-based communication workspace identifier, which may uniquely identify a group-based communication workspace associated with the creator user of the application bundle installation request or the application bundle generation request.

"Client token" in this context refers to an identifier that uniquely identifies a particular client device. The client tokens may be static (e.g., such that a client device is permanently associated with a particular client token until an affirmative action is taken to change the associated client token) or dynamic (e.g., such that a client token is assigned to a particular client device for a short duration, such as the period of time associated with performing a particular task, the period of time associated with a unique connection session between the client device and a group-based communication system, and/or the like). Moreover, client tokens may be encrypted in certain embodiments utilizing any of a variety of encryption methodologies for added security against unauthorized usage of the client token.

"Authorization token" in this context refers to data associated with (e.g., representative of) a set of instructions associated with a group-based communication workspace or enterprise that the group-based communication system may utilize to authorize the installation of an application within the group-based communication workspace. The authorization token may include or otherwise may be associated with information corresponding to an application. In various embodiments, the authorization token may be associated with a bundle of a plurality of applications, and thus the authorization token may comprise or represent information corresponding to one or more of a plurality of applications associated with an application bundle identifier. The authorization token(s) may be static (e.g., such that a group-based communication workspace and/or a particular application is permanently associated with a particular authorization token until an affirmative action is taken to change the associated authorization token) or dynamic (e.g., such that an authorization token is assigned to a particular group-based communication workspace and/or a particular application for a short duration, such as the period of time associated with performing a particular task, the period of time associated with a unique connection session between a client device and a group-based communication system, and/or the like). Moreover, authorization tokens may be encrypted in certain embodiments utilizing any of a variety of encryption methodologies for added security against unauthorized usage of the authorization token. In various embodiments, an authorization token may comprise executable instructions to install at least one application associated therewith in response to receiving an authorization signal indicating that an administrator user associated with a group-based communication workspace or enterprise has authorized within one or more group-based communication workspaces. In various embodiments, an authorization token may comprise an authorized application indicator associated with one of the group-based communication workspace and/or enterprise and the application.

An "authentication token" in this context may refer to an identifier that uniquely identifies a particular client device and/or a particular user profile. An authentication token may refer to one or more sets of credentials associated with a user profile and, respectively, one or more applications. The group-based communication system may utilize an authentication token to authenticate the identity of a user associated with the user profile and grant to the user permissions in the group-based communication system with respect to the one or more applications. The authentication token may include information specifying the permissions associated with an application. The authentication tokens may be static (e.g., such that a user profile is permanently associated with a particular authentication token until an affirmative action is taken to change the associated authentication token) or dynamic (e.g., such that a authentication token is assigned to a particular user profile for a short duration, such as the period of time associated with performing a particular task, the period of time associated with a unique connection session between a client device associated with the user profile and a group-based communication system, and/or the like). Moreover, authentication tokens may be encrypted in certain embodiments utilizing any of a variety of encryption methodologies for added security against unauthorized usage of the authentication token.

The term "third party security credential resource" refers to a third party security credential management application provided by way of a remote networked device, such as a server or processing device, maintained by a third party individual, company, or organization. The group-based communication server may access a third party application provided by a third party security credential resource to execute functions, flows, or actions associated with an application authentication data packet. In some embodiments, the functions, flows, or actions take effect within the third party security credential resource to produce an effect within the third party security credential resource. In various embodiments, the third party security credential resource may at least generate and/or store one or more application authentication data packets comprising one or more authentication tokens associated with one or more user profiles. In various embodiments, a group-based communication server may interact with a third party security credential resource to transmit an application authentication data packet comprising an application authentication request associated with a user identifier and a client device. In various embodiments, a group-based communication server may interact with a third party security credential resource to receive one or more application authentication data packets comprising on or more authentication tokens. In various embodiments, as a non-limiting example, the third party security credential resource may comprise a security credential generation engine and/or a security credential repository.

The terms "group administrator," "group admin" "team administrator," "team admin," "workspace administrator," "enterprise administrator," or "organization administrator" refer to credentials or identifiers associated with a user profile that indicate to a group-based communication server (e.g., an enterprise group-based communication server) that a client device associated with the user profile may edit access control parameters (e.g. channel settings, workspace settings) of respective groups and group-based communication channels associated with having identifiers associated with the user profile. In some embodiments, workspace administrators transmit channel creation requests to the group-based communication server to create enterprise group-based communication channels for a particular workspace. Users identified as workspace administrators may edit the access control rights to a workspace or group-based communication channel associated wherewith. The access control parameters and/or authorizations controlled by a workspace administrator may be limited by the settings and/or authorizations set by an enterprise administrator associated therewith. In various embodiments, an enterprise administrator may modify enterprise data and may control, access, modify, and authorize application installations for any group-based communication workspace and/or group-based communication channel (including private enterprise group-based communication channels).

The term "enterprise settings" or "enterprise data" refers to organizationally defined network parameters, protocols, keys, limits, and policies that enable or confirm specified availability, scalability, performance, compatibility and security levels associated with an enterprise identifier within group-based communication system. The enterprise settings authorize (whitelist) or deauthorize (or blacklist) workspaces/groups to set workspace/group specific settings. The enterprise settings authorize (whitelist) or deauthorize (or blacklist) users to perform various actions within the enterprise group-based communication system. Enterprise settings span channel creation, messaging and file usage, invitations, emoji creation, app installs, user profiles and access modes. The enterprise settings regulate all enterprise group-based communication channels and all enterprise group-based communication channels for the respective organization must comply with the enterprise settings. In various embodiments, the enterprise settings may comprise an enterprise administrator identifier associated with a user identifier associated with the enterprise administrator. In various embodiments, the enterprise settings associated with an enterprise may comprise one or more authorized application indicators and/or prohibited application indicators based at least in part on user input received from a client device associated with an enterprise administrator user associated with the enterprise. Further, in various embodiments, the enterprise settings may comprise one or more workspace administrator identifiers associated with a user identifier associated with a workspace administrator of a group-based communication workspace associated with the enterprise identifier with. The enterprise settings associated with an enterprise may further comprise one or more authorized application indicators and/or prohibited application indicators based at least in part on user input received from a client device associated with a workspace administrator user associated with the enterprise.

The term "workspace storage location" refers to one or more storage locations in the group-based communication repository for storing messages and/or workspace data that are a part of a group-based communication workspace. Each group-based communication workspace may have its own workspace storage location. "Location" within the definition of workspace storage location may refer to a physical location in memory where data is stored (e.g., a range of memory addresses) or to part of memory with distinct access control parameters. Access to the workspace storage location may be controlled by workspace identifiers. In one embodiment, the workspace storage location is nested inside of the enterprise storage location. For example, for an application bundle installation request to the workspace storage location for the group-based communication workspace entitled "Development Team only", a group-based communication server must receive (e.g., by querying the group-based communication repository) one or more workspace identifier(s) associated with the client device which generated the application bundle installation request. Once the group-based communication server has the workspace identifier(s), a comparison is performed to determine if there exists (for the user) a workspace identifier for the development team. If so, the user is allowed access to the "Development Team only" workspace.

The term "interactive application bundle generation interface" refers to one or more interface elements renderable to display an area by which a user may enter data to implement and/or configure various aspects of an application bundle within a group-based communication system. An interactive application bundle generation interface may be rendered within a group-based communication interface at a client device associated with the user. For example, an interactive application bundle generation interface may be rendered within a group-based communication interface at a client device associated with a developer user associated with a plurality of applications. The interactive application bundle generation interface may be configured to accept user input from the client device associated with the user (e.g., as a selection of one or more of a plurality of available settings options, as freeform input, and/or the like), the user input defining, at least in part, the application bundle data.

The term "interactive application bundle authorization interface" refers to one or more interface elements renderable to display an area by which an administrator user (e.g., an enterprise administrator user, a workspace administrator user) may selectively authorize one or more applications associated with an application bundle identifier for installation within a particular group-based communication workspace. An interactive application bundle authorization interface may be rendered within a group-based communication interface at a client device associated with an administrator user (e.g., an administrator client device). The interactive application bundle authorization interface may be configured to accept user input from the administrator client device. The administrator user input defining, at least in part, workspace data and/or enterprise data.

The term "interactive application bundle authentication interface" refers to one or more interface elements renderable to display an area by which a user may enter user credential data associated with one or more applications associated with an application bundle identifier within a group-based communication system. An interactive application bundle authentication interface may be rendered within a group-based communication interface at a client device associated with a user identifier associated with a group-based communication workspace identifier. The interactive application bundle authentication interface may be configured to accept user input from the client device (e.g., as a selection of one or more of a plurality of available settings options, as freeform input, and/or the like), the user input defining, at least in part, the user profile.

"Interactive dialog" in this context refers to a user interface element configured to accept user input (e.g., as a selection of one or more of a plurality of available options, as freeform input, and/or the like). The dialog may be presented as a pop-up or an overlaid display element displayed visually over another portion of a user interface, or the dialog may be presented as a portion of a larger user interface element. In certain embodiments, an interactive dialog may comprise one or more interactive dialog inputs.

"Proxy endpoint" in this context refers to a data transfer interface, such as, for example an Application Program Interface (API) between unconnected computing systems via a network. The proxy endpoint may be accessible over the network via a URL. For example, a proxy endpoint may enable data transfer of a data packet (comprising routing data and/or payload data) from a group-based communication system to an application associated with an application published and usable via the group-based communication system. In various embodiments, the proxy endpoint is defined at least in part by a URL accessible to the application, wherein the URL may be utilized to direct the application to a particular dataset (e.g., one or more data packets). As discussed herein, data packets provided to the application via the proxy endpoint may comprise data formatted to enable usage by the application to execute one or more instructions. The proxy endpoint enables transfer of the data packet to the application while maintaining the necessary formatting of the data packet to enable the application to use the included data. Moreover, in certain embodiments the proxy endpoint enable real-time transmission of data to the application (e.g., via push-based message transmission). In other embodiments, the proxy endpoint may be configured to enable the application to pull data from the group-based communication system (e.g., upon the occurrence of a trigger event acting to inform the application of the presence of data that is ready for transmission).

The term "selectable application bundle element" as used herein refers to a discrete user interface element (e.g., a selectable button) corresponding to one or more applications associated with an application bundle identifier that is presented to a user as a part of a group-based communication interface. In certain embodiments, a selectable application bundle element may be configured to initialize one or more executable instructions associated with the one or more applications associated with an application bundle identifier upon being selected via user input from a client device. In certain embodiments, a selectable application bundle element may be selectively presented throughout a group-based communication interface based at least in part on the accessibility setting of the application bundle data associated therewith. For example, a selectable application bundle element corresponding to a global accessibility setting may be presented to a user as a part of a global application bundle menu displayed within the group-based communication interface. In certain embodiments, a selectable application bundle element corresponding to an enterprise accessibility setting may be presented only to users having a user profile associated with a designated enterprise identifier as determined by the application bundle creator via the interactive application bundle generation interface. In certain embodiments, a selectable application bundle element corresponding to a workspace accessibility setting may be presented only to users having a user profile associated with a designated workspace identifier as determined by the application bundle creator via the interactive application bundle generation interface. In certain embodiments, a selectable application bundle element corresponding to a channel accessibility setting may be presented only to users having a user profile associated with a designated channel identifier as determined by the application bundle creator via the interactive application bundle generation interface.

"Contextual data" in this context refers to data indicative of a user's interaction with a group-based communication interface and/or an application system. For example, "environmental contextual data" in this context refers to one type of contextual data that is indicative of a user's interaction with a group-based communication interface at the time of, or immediately prior to the request of a processing action.

The term "payload data" refers to data forming a portion of a data packet, as discussed herein. In certain embodiments, the payload data may comprise one or more messages (e.g., message text, files attached to an exchanged message, a plurality of discrete exchanged messages, and/or the like). In certain embodiments, the payload data may comprise user credential data generated in response to user input defining one or more user credentials associated with an application in order to authenticate the user profile as being associated with the application. In certain embodiments, the payload data may comprise contextual data, and/or other data automatically selected for inclusion within the payload data for use by an application in authenticating a user profile.

"Application authentication routing data" in this context may identify an application to which an application user authentication request is to be transmitted. The application authentication routing data may be utilized by the group-based communication system to appropriately route an application authentication data packet to an appropriate proxy endpoint to trigger an application to perform a particular authentication process. The routing data may identify various characteristics of an application user authentication request, such as a timestamp indicating when an application user authentication request was generated, a group-based communication workspace identifier associated with the user credential data, a client token identifying the client device providing the user credential data, an authentication token, and/or the like.

The term "indicator" refers to one or more items of data associated with one or more elements of a group-based communication system that indicates that a particular condition corresponding to the one or more elements associated therewith is present. In various embodiments, an indicator may comprise a textual or graphical statement generated as a representation that a given condition is present. For example, an indicator may be a data structure comprising a flag, or a record of a data structure whereby a logical "1" indicates that the given condition is present and a logical "0" indicates that the given condition is not present. For example, in various embodiments, an indicator may be an authenticated application indicator, an authorized application indicator, a prohibited application indicator, or an unauthorized application indicator, as determined and described herein.

In various embodiments, the term "authorized application indicator" refers to one or more items of data associated with an application identifier and a group-based communication workspace that indicate that the application has been authorized by an administrator user to be installed by one or more users within the group-based communication workspace associated therewith. In certain embodiments, the authorized application indicator may be associated with, represented by, or stored within an application whitelist associated with the group-based communication workspace identifying a plurality of applications that are authorized for installation. For example, an authorized application indicator may be a data structure comprising a flag, or a record of a data structure whereby a logic "1" indicates that an application associated therewith has been authorized to be installed within the group-based communication workspace associated therewith and a logic "0" indicates that an application associated therewith has not been authorized to be installed within the group-based communication workspace associated therewith. In various embodiments, the authorized application indicator may be transmitted to one or more client devices associated with a group-based communication workspace identifier associated with a group-based communication workspace. In various embodiments, one or more authorized application indicators may be generated by the server upon receiving an application bundle authorization data packet comprising one or more authorization tokens corresponding to a plurality of applications associated with an application bundle identifier. In various embodiments, an authorization token may comprise an authorized application indicator.

Conversely, the term "prohibited application indicator" refers to one or more items of data associated with an application identifier and a group-based communication workspace that indicate that the application has been prohibited by an administrator user from being installed by users within the group-based communication workspace associated therewith. In certain embodiments, the prohibited application indicator may be associated with, represented by, or stored within an application blacklist associated with the group-based communication workspace identifying a plurality of applications that are prohibited from installation. For example, a prohibited application indicator may be a data structure comprising a flag, or a record of a data structure whereby a logic "1" indicates that an application associated therewith has been affirmatively prohibited from being installed within the group-based communication workspace associated therewith and a logic "0" indicates that an application associated therewith has been affirmatively prohibited from being installed within the group-based communication workspace associated therewith. In various embodiments, one or more prohibited application indicators may be generated by the server upon receiving application bundle authorization data packet comprising an authorization rejection signal corresponding to a plurality of applications associated with an application bundle identifier.

In various embodiments, the term "authenticated application indicator" refers to one or more items of data associated with an application identifier and a user profile that indicate that one or more user credentials provided by a user associated with the user profile have been authenticated by an application associated therewith. For example, an authenticated application indicator may be a data structure comprising a flag, or a record of a data structure whereby a logic "1" indicates that that one or more user credentials provided by a user associated with the user profile have been authenticated by the application associated therewith and a logic "0" indicates that one or more user credentials provided by a user associated with the user profile have not been authenticated by an application associated therewith. In various embodiments, the authenticated application indicator may be transmitted to one or more client devices associated with a group-based communication workspace identifier associated with a group-based communication workspace. In various embodiments, one or more authenticated application indicators may be generated by the server upon receiving an application bundle authentication data packet comprising one or more authentication tokens corresponding to a plurality of applications associated with an application bundle identifier. In various embodiments, an authentication token may comprise an authentication application indicator.

"Historical data" may supplement the environmental contextual data in certain embodiments. In certain embodiments, the historical data is indicative of environmental contextual data (and/or routing data) deemed relevant for execution of a processing action under similar, historical circumstances (occurring during a prior interaction between a client device and the group-based communication system (e.g., during a prior connection session)). For example, the historical data may indicate which processing actions are generally selected by one or more users during similar circumstances; which environmental contextual data is relevant for a processing action under similar circumstances; and/or the like. The historical data may encompass user historical data that is unique to a particular user, and identifies how that particular user has interacted with the group-based communication system in the past. In certain embodiments, the historical data encompasses universal historical data, which identifies how a plurality of users have generally interacted with the group-based communication system in the past under similar circumstances. In accordance with certain embodiments, the similar circumstances are determined and/or monitored via artificial intelligence and/or machine learning algorithms which monitor generated environmental contextual data and a user's resulting interaction with the group-based communication system under the circumstances of the generated environmental contextual data. This historical data may be consolidated and/or summarized into characteristics of the processing action and/or environmental contextual data deemed most relevant to a particular user under the particular circumstances.

The term "application" refers to a software program, application, platform, or service that is configured to communicate with the group-based system and which service, manage, and/or perform actions that form various functions of an application that is accessible to a client device via a group-based communication interface. The application operates on a compiled code base or repository that is separate and distinct from that which supports the group-based communication system. The application may comprise additional storage repositories (e.g., databases) associated with tasks, functions, and/or actions that may be performed via the application system. In some embodiments, the application system may communicate with the group-based communication system, and vice versa, through one or more application program interfaces (APIs). In some embodiments, the application receives tokens or other authentication credentials that are used to facilitate secure communication between the application and the group-based communication system in view of group-based communication system network security layers or protocols (e.g., network firewall protocols). As various examples, an application may be configured for executing a calendaring/scheduling app, a to-do list app, a service provider app, a software testing app, a storage repository app, and/or the like. As described herein, it should be understood that the term "application" may be user to refer to either an external application or an internal application (i.e. an application hosted within the group-based communication server). An application may be configured to execute an application workflow step associated with a workflow identifier initialized in the group-based communication system and/or the application by utilizing an application extension. Additionally or alternatively, in some embodiments, a group-based communication system stores one or more authentication token(s) for accessing functionality provided by the application. In some embodiments, access to an application is managed on a workspace level. In other embodiments, access to external resources is managed on an enterprise level. In various embodiments, a plurality of applications may be associated with an application bundle identifier so as to enable interaction with each of the plurality of applications (e.g., installation, authorization, authentication, and/or the like) via one or more instructions associated with a singular application bundle identifier.

The term "application identifier" refers to one or more items of data by which an application may be uniquely identified. For example, a group-based communication channel identifier may comprise ASCII text, a pointer, a memory address, and the like.

The term "application data" refers to a collection of data associated with an application that is capable of being transmitted, received, and/or stored. Application data may comprise data associated with an application which defines the implementation and/or functionality of the application within a group-based communication system. For example, application data may comprise processing action data, application informational data, application settings data, application home interface configuration data, application contextual data (e.g., application home interface contextual data), and/or the like. In certain embodiments, application data may be configured by a developer associated with an application and/or a group-based communication server.

The term "application bundle installation request" refers to a collection of data associated with an application bundle identifier and group-based communication workspace transmitted by a client device to a group-based communication server providing instructions requesting that a plurality of applications associated with the application bundle identifier be installed within the group-based communication workspace. In various embodiments, an application bundle installation request may be received by the group-based communication server in response to a user selection of a selectable application bundle element displayed within a group-based communication interface at a client device.

The term "application bundle installation authorization request" refers to a collection of data associated with an application bundle identifier and group-based communication workspace transmitted by a group-based communication server to an administrator user associated with the group-based communication workspace providing instructions requesting that a plurality of applications associated with the application bundle identifier be authorized for installation within the group-based communication workspace. In various embodiments, an application bundle installation authorization request may be generated by the group-based communication server in response to receiving an application bundle installation request from a client device and/or determining that one or more applications associated with an application bundle identifier associated with the application bundle installation request has not yet been authorized for installation within the group-based communication workspace. In various embodiments, an application bundle installation authorization request may define at least a portion of an application bundle authorization data packet associated with the application bundle identifier.

The term "application bundle generation request" refers to a collection of data associated with a plurality of applications transmitted by a client device to a group-based communication server providing instructions requesting that application bundle data be generated, such that an application bundle identifier is associated with each of the plurality of applications so as to enable interaction with each of the plurality of applications (e.g., installation, authorization, authentication, and/or the like) via one or more instructions associated with a singular application bundle identifier. In various embodiments, the user identifier associated with the client device from which an application bundle generation request is received by the group-based communication server may be associated with an application bundle creator identifier.

The term "application user authentication request" refers to a collection of data associated with an application and a user identifier transmitted by a group-based communication server to an application providing instructions requesting that user credential data provided by a user be authenticated by the application, such that the user profile associated with the user credential data is verified by the application as being associated with the application. In various embodiments, upon authentication, the user profile associated with the user identifier may be associated with at least a portion of application data associated with the application. In various embodiments, an application authentication request may be generated by the group-based communication server in response to receiving user credential data from a client device.

An "available application bundle list" is one type of list that may include at least a subset (or all) of application bundle identifiers associated with application bundles that are available to a user for installation within a group-based communication workspace. An available application bundle list may comprise a listing of application bundle identifiers that are each associated with a plurality of applications, each of the applications defining at least a portion of the available application table. In certain embodiments, at least one of the applications listed in a contextual application list may be associated with one or more processing action identifiers and a plurality of processing action characteristic identifiers. In certain embodiments, the available application bundle list of application bundles may exclude certain application bundles to the user, such that the available application bundle list includes only a subset of all of the application bundles available to a user within a particular workspace.

The term "available application table" in this context refers to a collection of stored data that identifies each of the applications available for a user within a group-based communication system. In various embodiments, an available application table may comprise one or more application identifiers associated with each of the applications available to a user for installation within a group-based communication workspace. For example, an available application table may comprise at least each application identifier associated with an authorized application indicator associated with the group-based communication workspace. In various embodiments, an available application table may be configured so as to prevent an application identifier associated with a prohibited application identifier associated with the group-based communication workspace from being included therein.

The term "application bundle" in this context refers to a packaged plurality of applications associated with a group-based communication system. An application bundle is defined by application bundle data that is generated so as to enable interaction with each of the plurality of applications (e.g., installation, authorization, authentication, and/or the like) via one or more instructions associated with a singular application bundle identifier. Application bundle data refers to a collection of data associated with a plurality of applications that is capable of being transmitted, received, and/or stored. Application bundle data may comprise data associated with a plurality of applications which defines the implementation and/or functionality of each of the applications within a group-based communication system. For example, application bundle data may comprise application data associated with each of the plurality of applications associated therewith. Further, application bundle data may comprise a creator user identifier associated with a user identifier associated with the client device from which the group-based communication server received the application bundle generation request. Application bundle data may comprise an application bundle identifier and an application bundle accessibility setting, as defined according to user input received via an interactive application bundle generation interface. In various embodiments, the group-based communication server may selectively limit the availability of an application bundle within the group-based communication system based at least in part on the application bundle accessibility setting (e.g., public, personal, channel, enterprise, and/or the like). In various embodiments, the application bundle data may further comprise a selectable application bundle element, as described herein.

In certain embodiments, application bundle data may comprise a plurality of application identifiers respectively associated with a plurality of applications and at least one executable instruction associated with each of the plurality of applications. In various embodiments, the at least one executable instruction defined by the application bundle data may be configured such that upon execution of the at least one instruction, the group-based communication server retrieves, from a repository, application data associated with each of the plurality of application identifiers, the application data comprising executable installation instructions. Additionally or alternatively, in various embodiments, application bundle data may comprise a plurality of application data respectively associated with each of the plurality of applications and at least one executable instruction associated with each of the plurality of applications. In such a circumstance, the at least one executable instruction defined by the application bundle data may be configured such that upon execution of the at least one instruction, the group-based communication server executes the installation instructions defined by the application bundle data for each of the plurality of applications associated with the application bundle identifier. Alternatively, or additionally, application bundle data may comprise workflow data defining the functionality of a workflow associated therewith, the workflow being configured to install each of a plurality of applications associated with the application bundle identifier within a group-based communication workspace. In such a circumstance, the workflow defined by the application bundle data may be configured to execute one or more steps required to install each of the plurality of applications associated with the application bundle identifier within a group-based communication workspace.

The term "application bundle identifier" refers to one or more identifiers by which an application bundle within a group-based communication system may be uniquely identified. For example, an application identifier may comprise ASCII text, a pointer, a memory address, and the like.

Overview

As discussed herein, certain embodiments of the present disclosure are directed to systems and methods of providing a packaged plurality of application data within a group-based communication system, for example, for installation, activation, use, and/or the like. Such packaged pluralities of application data may correspond to an application bundle, which is defined by application bundle data that is generated by a group-based communication server so as to enable interaction with each of the packaged plurality of applications (e.g., installation, authorization, authentication, and/or the like) via one or more instructions associated with a singular application bundle identifier. The configuration of the application bundle data, as described herein, within the group-based communication system functions to consolidate a user experience with respect to a plurality of applications into a singular action and/or interface.

The group-based communication system is configured to facilitate the generation of application bundle data comprising at least one executable instruction corresponding, at least in part, to each of the plurality of application identifiers associated with the application bundle identifier. The at least one executable instruction of the application bundle data may be configured to, upon receiving an application bundle installation request associated with a group-based communication workspace or group-based communication channel, facilitate the execution of an installation process for each of the plurality of applications associated with the application bundle identifier within a group-based communication workspace or group-based communication channel.

Application bundle data associated with an application bundle identifier, as defined by the user input of a creator user associated with the application bundle identifier at an application bundle generation interface, may be made available to the creator user for installation within other group-based communication workspaces to which the creator user has access rights. Further, based at least in part on the configuration of the application bundle data (e.g., an application bundle accessibility setting), the group-based communication system may make the application bundle data associated with an application bundle identifier available to other users throughout the group-based communication system for example, via a bundle selection interface comprising user-selectable elements associated with each of a plurality of available application bundles (each application bundle comprising a plurality of applications, as discussed herein). As such, the group-based communication system may comprise a crowd-sourced plurality of application bundles, each corresponding to a packaged plurality of applications, presented to users as being available for installation within the respective group-based communication workspaces and/or channels with which they are associated.

Moreover, various embodiments are directed to the group-based communication system facilitating the authorization and/or authentication of the plurality of applications associated with the application bundle identifier. The generation of the application bundle data, and the association of each of the application identifiers associated with the plurality of applications corresponding thereto allows the group-based communication system to minimize the repetitive authorization and/or authentication actions necessitated by engaging with each of the plurality of applications on an individual basis. By generating a singular application bundle associated with a packaged plurality of applications, wherein each of the application identifiers associated therewith being tethered to the common application bundle identifier, the group-based communication system streamlines both system and user interaction with a plurality of distinct applications across a plurality of unique group-based communication locations within the group-based communication system.

Example System Architecture

Methods, apparatuses, and computer program products of the present invention may be embodied by any of a variety of devices. For example, the method, apparatus, and computer program product of an example embodiment may be embodied by a network device, such as a server or other network entity, configured to communicate with one or more devices, such as one or more client devices. In some preferred and non-limiting embodiments, the computing device may include fixed computing devices, such as a personal computer or a computer workstation. Still further, example embodiments may be embodied by any of a variety of mobile devices, such as a portable digital assistant (PDA), mobile phone, smartphone, laptop computer, tablet computer, wearable device, or any combination of the aforementioned devices.

FIG. 1 illustrates an example computing system 100 within which embodiments of the present invention may operate. Users may access a group-based communication system 118 via a communication network 108 using client devices 102-106.

Communication network 108 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communication network 108 may include a cellular telephone, an 802.11, 802.16, 802.20, and/or WiMax network. Further, the communication network 108 may include a public network, such as the Internet, a private network, such as an intranet, or combinations thereof, and may utilize a variety of networking protocols now available or later developed including, but not limited to TCP/IP based networking protocols. As discussed herein, the networking protocol is configured to enable data transmission via websocket communications. For instance, the networking protocol may be customized to suit the needs of the group-based communication system. In some embodiments, the protocol is a custom protocol of JSON objects sent via a websocket channel. In some embodiments, data may be transmitted via a plurality of protocols, such as JSON over RPC, JSON over REST/HTTP, and the like.

In the illustrated embodiment, the group-based communication system 118 includes an at least one group-based communication server(s) 110 accessible via the communication network 108. Collectively, the at least one group-based communication server(s) 110 is configured for receiving messages transmitted from one or more client devices 102-106, storing the messages within a group-based communication repository for individual communication channels, and/or for transmitting messages to appropriate client devices 102-106. Moreover, the group-based communication system 118 encompasses one or more group-based communication repositories 120, which may define one or more cache memory storage areas and/or one or more long term storage areas, such as for storing historical data utilized for executing one or more models as discussed herein.

The client devices 102-106 may be any computing device as defined above. Electronic message data exchanged between the group-based communication server(s) 110 and the client devices 102-106 may be provided in various forms and via various methods.

In some preferred and non-limiting embodiments, one or more of the client devices 102-106 are mobile devices, such as smartphones or tablets. The one or more client devices may execute an "app" to interact with the group-based communication server(s) 110. Such apps are typically designed to execute on mobile devices, such as smartphones or tablets. For example, an app may be provided that executes on mobile device operating systems such as Apple Inc.'s iOS®, Google Inc.'s Android®, or Microsoft Inc.'s Windows 10 Mobile®. These platforms typically provide frameworks that allow apps to communicate with one another, and with particular hardware and software components of mobile devices. For example, the mobile operating systems named above each provides frameworks for interacting with location services circuitry, wired and wireless network interfaces, user contacts, and other applications. Communication with hardware and software modules executing outside of the app is typically provided via application programming interfaces (APIs) provided by the mobile device operating system. Thus, via the app executing on the client devices 102-106, these client devices 102-106 are configured for communicating with the group-based communication system 118.

In some preferred and non-limiting embodiments, the client devices 102-106 may interact with the group-based communication server(s) 110 via a web browser. The client devices 102-106 may also include various hardware or firmware designed to interact with the group-based communication server(s) 110. Again, via the browser of the client devices 102-106, the client devices 102-106 are configured for communicating with the group-based communication system 118.

In some embodiments of an exemplary group-based communication system 118, a message or messaging communication may be sent from a client device 102-106 to a group-based communication system 118. In various implementations, messages may be sent to the group-based communication system 118 over communication network 108 directly by one of the client devices 102-106. The messages may be sent to the group-based communication system 118 via an intermediary such as a message server, and/or the like. For example, a client device 102-106 may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., file objects), message hierarchy data (e.g., the message may be a reply to another message), third party metadata, and/or the like. In one embodiment, the client device 102-106 may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.example.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
            //it should be noted that although several client details
            //sections are provided to show example variants of client
            //sources, further messages will include only one to save
            //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MSM.app</app_name>
        <app_version>1.0 </app_version>
```

```
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-
XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-
XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <message>
        <message_identifier>ID_message_10</message_identifier>
        <team_identifier>ID_team_1</team_identifier>
        <channel_identifier>ID_channel_1</channel_identifier>
        <contents>That is an interesting invention. I have attached a copy our patent
policy.</contents>
        <attachments>patent_policy.pdf</attachments>
    </message>
</auth_request>
```

In the illustrated embodiment, the group-based communication system 118 comprises a plurality of group-based communication servers 110 configured to receive messages transmitted between a plurality of client devices 102-106 within a group-based communication channel identified by a channel identifier and/or a group identifier, and to facilitate dissemination of those messages among client devices 102-106 that collectively form the membership of the group-based communication channel.

In some embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel interface in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

```
SELECT messageResponses
FROM MSM_Message
WHERE messageID = ID_message_10.
```

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, file objects may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) and/or to facilitate various facets of searching (i.e., search queries that return results from the group-based communication servers 110). Metadata associated with the message may be determined and the message may be indexed in the group-based communication server(s) 110. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes). If there are attachments associated with the message, file contents of the associated files may be used to index such files in the group-based communication server(s) 110 to facilitate searching. In one embodiment, the files may be indexed such that a company's or a group's files are indexed at a separate distributed repository. Similarly, as discussed herein, app data associated with various applications and/or processing actions may be stored in association with a particular group's messages, such that app data associated with a plurality of groups are stored separately.

Examples of electronic message exchange among one or more client devices 102-106 and the group-based communication system 118 are described below in reference to FIG. 1.

As shown in FIG. 1, the group-based communication system 118 enables individual client devices 102-106 to exchange objects (e.g., messages) with one another and to interact with one or more application systems 112-116. To exchange messages and/or other objects between client devices 102-106, individual client devices 102-106 transmit messages (e.g., text-based messages, file objects, video and/or audio streams, and/or the like) to the group-based communication system 118. Those messages are ultimately provided to one or more group-based communication server(s) 110, which indexes the messages and distributes those messages to the intended recipients (e.g., client devices 102-106) of the message.

In accordance with the embodiment shown in FIG. 1, the client devices 102-106 are configured to display the received messages in a contextually-relevant user interface available to the user of the client device. For example, messages transmitted from a first client device 102 as a part of a group-based communication channel are displayed in a user interface display on client devices 102-106 associated with other members of the group-based communication channel.

As discussed in greater detail herein, messages, other objects, and/or other data may be provided to application systems 112-116 to initiate one or more application functionalities (e.g., processing actions) executable within the respective application systems. In certain embodiments, those functionalities are made available to client devices 102-106 on a group-based communication workspace basis (e.g., such that individual processing actions are available to every member of a particular group), on a group-based communication channel basis (e.g., such that individual processing actions are available to every member of a particular communication channel), on an individual basis (e.g., such that individual processing actions are available to certain individual client devices 102-106), on a sending user identifier basis (e.g., such that individual processing actions are available only for certain messages transmitted by particular users, such that the message is associated with a particular sending user identifier), and/or the like. As an added limitation, certain functionalities may only be executable via client devices 102-106 that are directly authenticated with a particular application system configured to execute the functionalities (as indicated by the dashed lines between the individual client devices 102-106 and example application system 112-116).

Various application functionalities may be made available by the application system 112-116 based on developer interaction with the group-based communication system 118 setting access limitations for the functionalities. Those functionalities may comprise one or more discrete functions provided by the application system. For example, a single function of the application system may be called via a processing actions, or a plurality of processing actions, collectively considered a workflow characterized by passing input and/or output between each of the plurality of functions, may define a processing action. In certain embodiments, a workflow may rely on one or more functions performed by the group-based communication system to begin a workflow, to end a workflow, and/or between other functions of a workflow. For example, a workflow may comprise functions performed by the application system 112-116 to generate an output passed back to the group-based communication system 118, that output causing the group-based communication system 112-116 to execution one or more additional functions, which may be utilized by one or more additional functions of the application system 112-116.

As discussed in greater detail herein, the group-based communication system 118 may comprise one or more application bundles 109 defined by a packaged plurality of applications 112-116 associated with the group-based communication system 118. An application bundle 109 is defined by application bundle data that is generated so as to enable group-based communication server 110 interaction with each of the plurality of applications (e.g., installation, authorization, authentication, and/or the like) via one or more instructions associated with a singular application bundle identifier. Application bundle data refers to a collection of data associated with a plurality of applications that is capable of being transmitted, received, and/or stored. As illustrated, the application bundle data may be transmitted to and/or received by one or more of a plurality of client device 102-106 and a plurality of applications 112-116. Application bundle data may comprise at least one executable instruction associated with a plurality of applications that defines the installation process of each of the applications within a group-based communication workspace within the group-based communication system 118.

In certain embodiments, a user identifier associated with a creator user identifier associated with the application bundle data associated with the application bundle 109 may provide user input to the group-based communication system 118 identifying an application bundle accessibility setting to thereby enable the group-based communication server 110 to determine how the application bundle data is to be made available to users throughout the group-based communication system 118. For example, user input may specify that a particular application bundle is associated with a channel application bundle accessibility setting, to be rendered as available to users for installation via a channel-specific menu associated with a designated group-based communication channel.

Example Apparatuses Utilized with Various Embodiments

Figure 2:
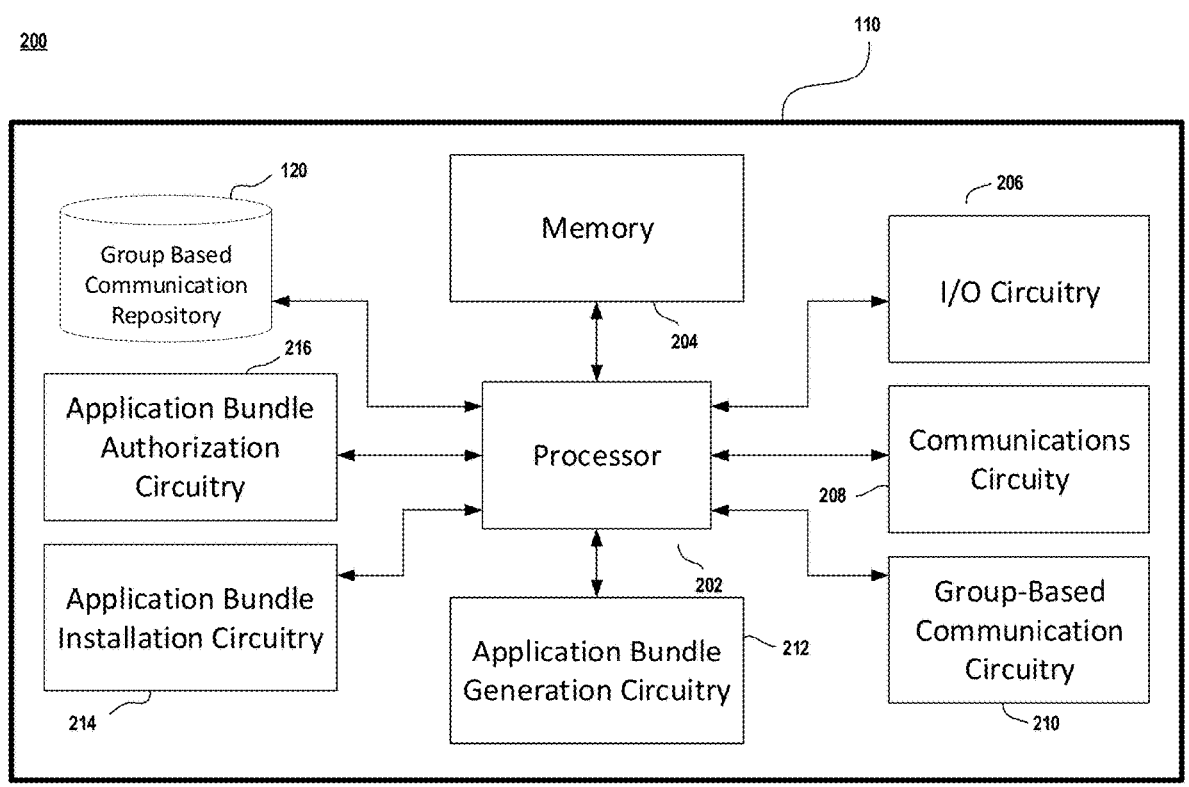
FIG. 2 illustrates an apparatus of a group-based communication server(s) in accordance with one embodiment.

Each group-based communication server(s) 110 may be embodied by one or more computing systems, such as apparatus 200 shown in FIG. 2. The apparatus 200 may include processor 202, memory 204, input/output circuitry 206, communications circuitry 208, and group-based communication circuitry 210, application bundle generation circuitry 212, application bundle installation circuitry 214, and application bundle authorization circuitry 216. The apparatus 200 may be configured to execute at least a portion of the operations described herein with respect to FIGS. 3-10C. Although these components 202-216 are described with respect to functional limitations, it should be understood that the particular implementations necessarily include the use of particular hardware. It should also be understood that certain of these components 202-216 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus 200 to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

As just one example, the processor 202 may be configured to maintain one or more communication channels connecting a plurality of client devices 102-106 to enable message sharing therebetween. The processor 202 ensures that messages intended for exchange between the client devices 102-106 within the particular communication channel are properly disseminated to those client devices 102-106 for display within respective display windows provided via the client devices 102-106.

Moreover, the processor 202 may be configured to synchronize messages exchanged on a particular communication channel with a database for storage and/or indexing of messages therein. In certain embodiments, the processor 202 may provide stored and/or indexed messages for dissemination to client devices 102-106.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communication circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communication circuitry 208 may include, for example, a network interface for enabling communications with a wired or wireless communication network. For example, the communication circuitry 208 may include one or more network interface cards, antennae, buses, switches, routers, modems, and supporting hardware and/or software, or any other device suitable for enabling communications via a network. Additionally or alternatively, the communication circuitry 208 may include the circuitry for interacting with the antenna/antennae to cause transmission of signals via the antenna/antennae or to handle receipt of signals received via the antenna/antennae.

Group-based communication circuitry 210 includes hardware configured to support a group-based communication system 118. The group-based communication circuitry 210 may utilize processing circuitry, such as the processor 202, to perform these actions. The group-based communication circuitry 210 may send and/or receive data from group-based communication repository 120. In some implementations, the sent and/or received data may be of digital content objects organized among a plurality of group-based communication channels. It should also be appreciated that, in some embodiments, the group-based communication circuitry 210 may include a separate processor, specially configured field programmable gate array (FPGA), or application specific interface circuit (ASIC). The group-based communication circuitry 210 may be implemented using hardware components of the apparatus 200 configured by either hardware or software for implementing these planned functions.

The application bundle generation circuitry 212 may be any means such as a device or circuitry embodied in either hardware or a combination of hardware and software that is configured to generate an interactive application bundle generation interface based at least in part on an application bundle generation request and various enterprise data, workspace data, and/or channel data associated with the one or more identifiers associated with the user identifier associated with the application bundle generation request. Further, in various embodiments, the application bundle generation circuitry 212 may be configured to process one or more executable instructions generated based at least in part on user engagement by a client device with an interactive application bundle generation interface. The application bundle generation circuitry may utilize processing circuitry, such as the processor 202, to perform these actions. The application bundle generation circuitry may send and/or receive data from group-based communication repository 120. In some implementations, the sent and/or received data may be an interactive application bundle generation interface, application bundle configuration data, developer enterprise data, workspace data, and/or other data of a group-based communication data corpus. It should also be appreciated that, in some embodiments, the application bundle generation circuitry 212 may include a separate processor, specially configured field programmable gate array (FPGA), or application specific interface circuit (ASIC).

The application bundle installation circuitry 214 may be any means such as a device or circuitry embodied in either hardware or a combination of hardware and software that is configured to, upon detecting user engagement by a selectable application bundle element associated with an application bundle identifier, initialize the installation and facilitate the execution of the at least one executable instruction defined by the application bundle data associated therewith. Further, in various embodiments, the application bundle installation circuitry 214 may be configured to initialize the authentication process associated with one or more of the applications associated with the application bundle identifier, and further to facilitate the authentication of the user credential data provided by a user at an interactive application bundle authentication interface displayed at a client device. The application bundle installation circuitry 214 may utilize processing circuitry, such as the processor 202, to perform these actions. The application bundle installation circuitry 214 may send and/or receive data from group-based communication repository 120. In some implementations, the sent and/or received data may be an interactive application bundle authentication interface, an application bundle authentication data packet, user credential data, workspace data, one or more authenticated application indicators and/or other data of a group-based communication data corpus. It should also be appreciated that, in some embodiments, the application bundle installation circuitry 214 may include a separate processor, specially configured field programmable gate array (FPGA), or application specific interface circuit (ASIC).

The application bundle authorization circuitry 216 may be any means such as a device or circuitry embodied in either hardware or a combination of hardware and software that is configured to determine whether each of the applications associated with an application bundle identifier associated with an application bundle installation request are fully authorized for installation within the group-based communication workspace and/or group-based communication channel associated with the application bundle installation request. Further, in various embodiments, the application bundle authorization circuitry 216 may be configured to generate an application bundle authorization interface configured to receive user input from one or more administrator users associated with a group-based communication workspace and/or channel. The application bundle authorization circuitry 216 may utilize processing circuitry, such as the processor 202, to perform these actions. The application bundle authorization circuitry 216 may send and/or receive data from group-based communication repository 120. In some implementations, the sent and/or received data may be an interactive application bundle authorization interface, an authorization signal, an application bundle authorization data packet, workspace data, enterprise data, one or more authorized application indicators, one or more authorized prohibited indicators, and/or other data of a group-based communication data corpus. It should also be appreciated that, in some embodiments, application bundle authorization circuitry 216 may include a separate processor, specially configured field programmable gate array (FPGA), or application specific interface circuit (ASIC).

It is also noted that all or some of the information discussed herein can be based on data that is received, generated and/or maintained by one or more components of apparatus 200. In some embodiments, one or more application systems (such as a remote cloud computing and/or data storage system) may also be leveraged to provide at least some of the functionality discussed herein.

The term "circuitry" should be understood broadly to include hardware and, in some embodiments, software for configuring the hardware. With respect to components of each apparatus 200, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communication circuitry 208 may provide network interface functionality, and the like.

As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Moreover, although not shown, various embodiments of a group-based communication system 118 may comprise one or more databases (e.g., storage locations) configured for storing and/or indexing data exchanged within and/or associated with various group-based communication workspaces and/or group-based communication channels, including those particular group-based communication workspaces and/or channels associated with enterprise identifiers, as described herein.

Exemplary Data Flows

A. Authorizing a Plurality of Applications Associated with Application Bundle

As noted above, systems and methods for authorizing a bundled plurality of applications to be collectively installed in a group-based communication workspace enabling communications between client devices via a group-based communication system according to various embodiments are discussed herein.

Figure 3:
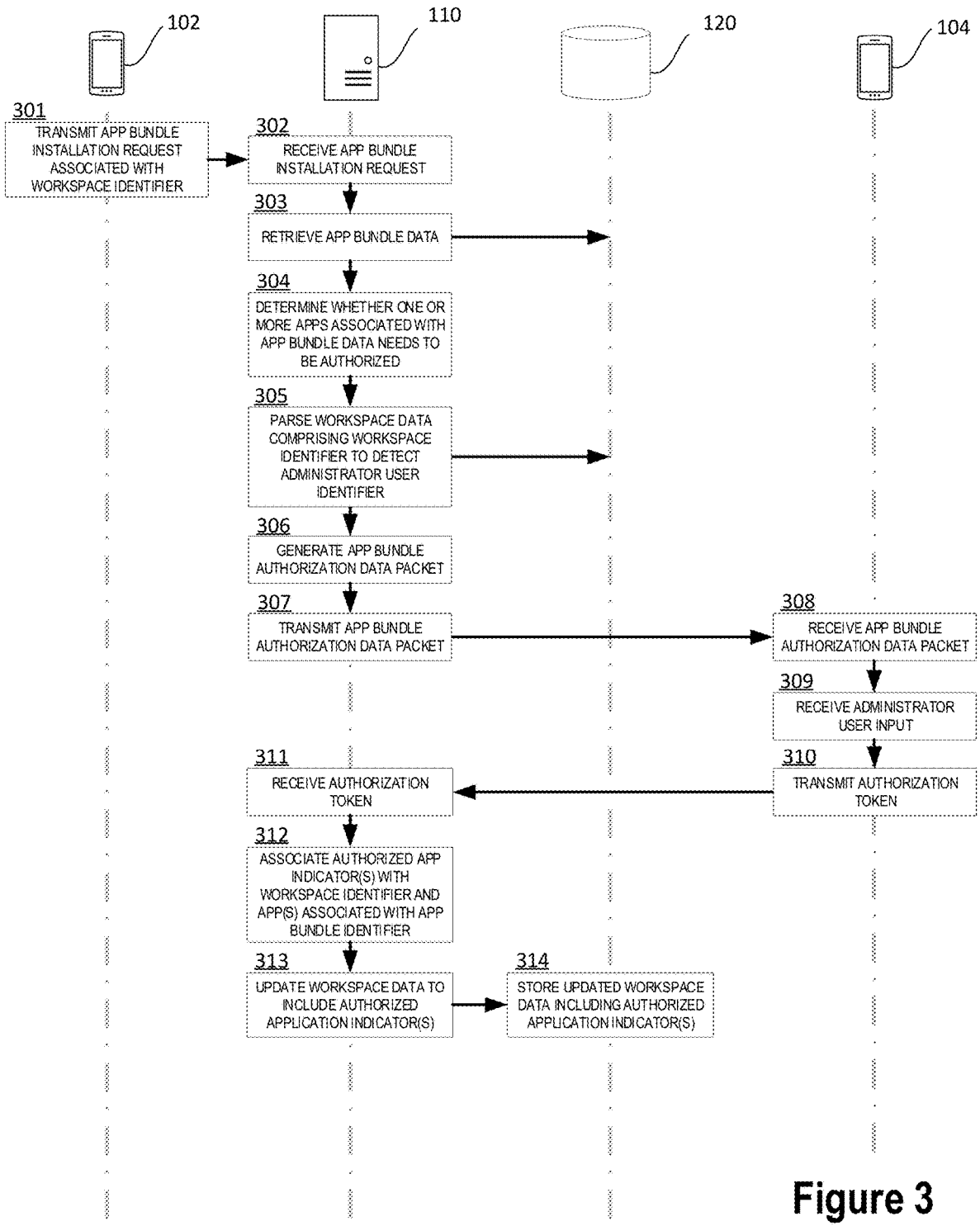
FIG. 3 illustrates a lane diagram showing functionality of various components in accordance with various embodiments.

FIG. 3 illustrates a lane diagram showing functionality of various components associated with exemplary application bundle data in accordance with various embodiments. As noted herein, application bundle data is data which defines an application bundle. Application bundle data may be is associated with a plurality of application such that the data defines the implementation and/or functionality of each of the applications within a group-based communication system. In various embodiments, application bundle data may comprise application data associated with each of the plurality of applications associated therewith and at least one executable instruction associated with each of the plurality of applications. Further, for example, application bundle data may comprise an application bundle identifier and a selectable application bundle element, which may be selectively presented throughout a group-based communication interface and may be configured to initialize one or more of the at least one executable instructions associated with the plurality of applications associated with an application bundle identifier, such as, for example, an installation instruction, upon being selected via user input from a client device.

In various embodiments, in response to receiving a selection of a selectable application bundle element associated with the application bundle identifier at a group-based communication interface displayed on the client device, a client device 102 may transmit an application bundle installation request associated with an application bundle identifier to a group-based communication server 110, as shown at Block 301 of FIG. 3. In various embodiments, the application bundle installation request may comprise a collection of data associated with an application bundle identifier that is transmitted by a client device 102 associated with a user identifier associated with a user to the group-based communication server 110 as a result of the user indicating a desire to install an application bundle associated with the application bundle identifier within a group-based communication workspace associated with the user identifier. For example, an application bundle installation request may be associated with the user identifier associated with a group-based communication workspace identifier, the user and/or a client device 102 associated therewith, the application bundle identifier, and each of the plurality of applications associated with the application bundle identifier. As shown at Block 302, the group-based communication server 110 may be configured to receive the application bundle installation request from the client device 102.

Upon receipt of the application bundle installation request, the process proceeds to Block 303, at which the group-based communication server 110 may retrieve, from a group-based communication repository 120, the application bundle data comprising the application bundle identifier associated with application bundle installation request. As described herein, the application bundle data may comprise a plurality of application identifiers respectively associated with the plurality of applications associated with the application bundle identifier and at least one executable instruction. For example, in various embodiments, an application bundle may, itself, be embodied as an application within the group-based communication system 118 that, upon execution, based at least in part on the application bundle data associated therewith (e.g., the plurality of application identifiers, the at least one executable instruction, and/or the like), causes the group-based communication server 110 to retrieve the application data associated respectively with each of the plurality of application identifiers. In such a circumstance, and wherein the application data associated respectively with each of the plurality of application identifiers comprises one or more corresponding installation instructions, the at least one executable instruction of the application bundle data may cause the group-based communication server to initialize the installation process within a group-based communication workspace for each of the plurality of applications.

Further, in various embodiments, the application bundle data may comprise application data associated respectively with each application of the plurality of applications associated with the application bundle identifier. For example, as described above, the application bundle may, itself, be embodied as an application within the group-based communication system 118. In such an exemplary circumstance, wherein the application bundle data may comprise application data associated respectively with each application of the plurality of applications associated with the application bundle identifier, the at least one executable instruction of the application bundle data may cause the group-based communication server to initialize the installation process within a group-based communication workspace for each of the plurality of applications.

Further, in various embodiments, application bundle data may comprise workflow data defining the functionality of a workflow associated therewith, the workflow being configured to install each of a plurality of applications associated with the application bundle identifier within a group-based communication workspace. For example, in various embodiments, an application bundle may be embodied as an executable workflow. In such a circumstance, the workflow may be defined by the application bundle data, which may comprise at least one executable instruction configured to facilitate the execution of one or more steps required to install each of the plurality of applications associated with the application bundle identifier within a group-based communication workspace.

Upon retrieving the application bundle data comprising the application bundle identifier associated with the application bundle installation request, the group-based communication server 110 may determine whether one or more of the applications associated with the application bundle identifier needs to be authorized for installation within the group-based communication workspace, as shown at Block 304. An exemplary method by which a group-based communication server 110 may make such a determination is shown in FIG. 4, which shows a flowchart illustrating example steps for authorizing an application bundle for installation within a group-based communication workspace.

Figure 4:
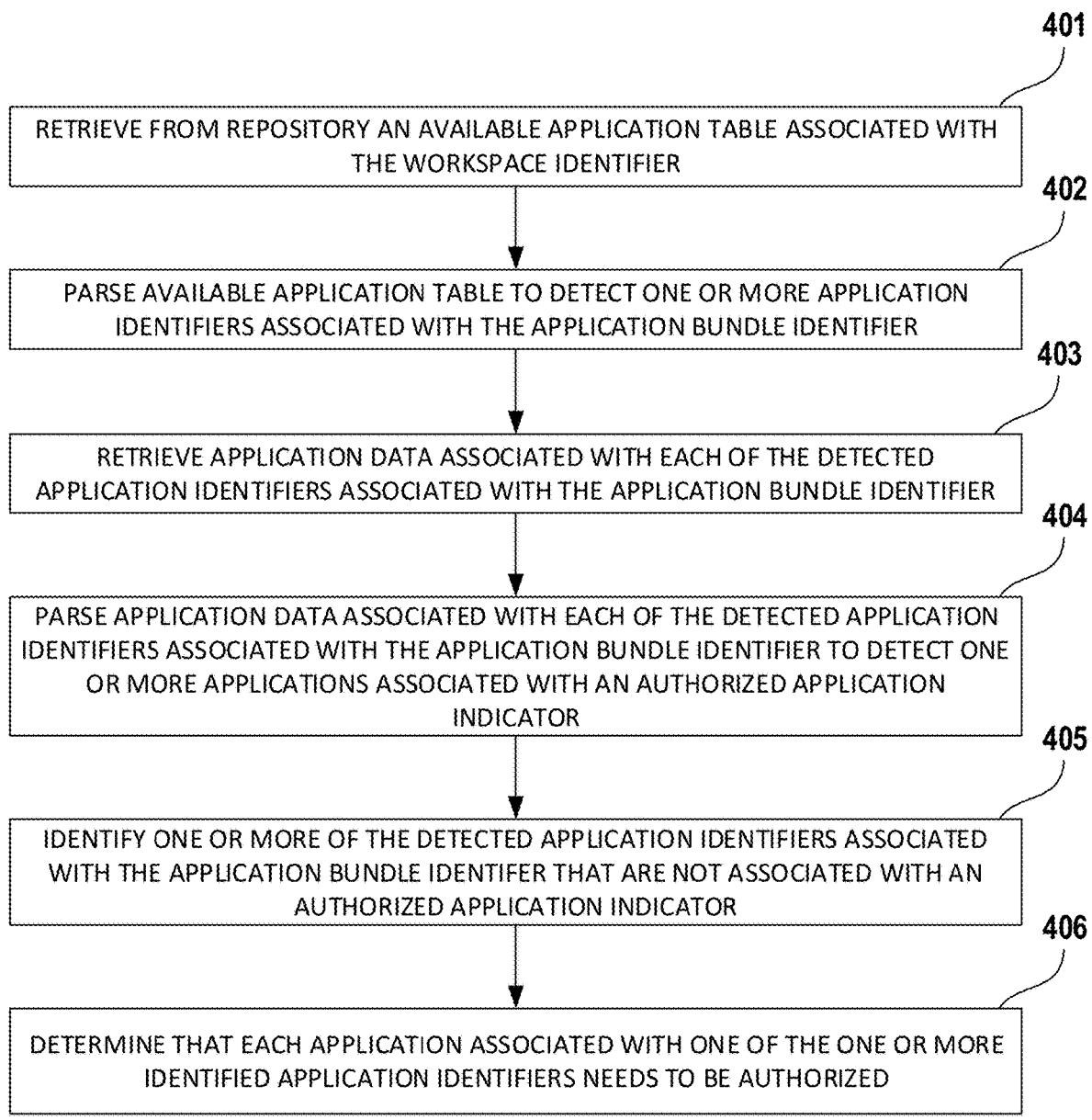
FIG. 4 is a flowchart illustrating example steps for determining whether one or more of the applications associated with an application bundle needs to be authorized for installation within the group-based communication workspace.

As shown at Block 401 of FIG. 4, a group-based communication server 110 may retrieve from a group-based communication repository 120 an available application table associated with the group-based communication workspace identifier. In various embodiments, the available application table may be retrieved from a workspace storage location associated with the group-based communication workspace defining at least a portion of the group-based communication repository 120. In various embodiments, the available application table may identify one or more applications available for installation within the group-based communication workspace associated with the group-based communication workspace identifier. In various embodiments, an available application table associated with a group-based communication workspace may comprise a plurality of application identifiers, each being associated with an application that is available to a user for installation within a group-based communication workspace. For example, the available application table may embody a comprehensive collection of every application identifier corresponding to an application that is available to a user for installation within the group-based communication workspace. As described herein, in various embodiments, application data may be stored individually for various group-based communication workspaces (e.g., groups), and accordingly the application data may be stored in an application table (e.g., an available action table) associated with the particular group-based communication workspace, such that a client device 102 associated with the particular group-based communication workspace has access to the stored application data (and accordingly the application data associated with the applications available to the client device 102 for installation within the group-based communication workspace). In various embodiments, the applications available to a user for installation within a group-based communication workspace may comprise each application within the group-based communication system 118 that is determined to not be associated with a prohibited application indicator associated with the group-based communication workspace. For example, in various embodiments, an available application table may be generated by compiling a plurality of application identifiers associated with the group-based communication system 118 into the available application table and removing from the available action table those applications associated with a prohibited application indicator associated with the group-based communication workspace identifier, as described herein. For example, an available application table may comprise at least each application identifier associated with an authorized application identifier associated with the group-based communication workspace. Applications within the group-based communication system 118 that are associated with neither an authorized application indicator nor a prohibited application indicator may comprise unauthorized applications, which may be included in an available application table as the availability of each of said applications within a particular group-based communication workspace may not have been affirmatively determined by a workspace administrator user associated with a workspace administrator user identifier associated with the group-based communication workspace.

Upon retrieving from the group-based communication repository 120 an available application table associated with the group-based communication workspace identifier, method 400 continues, at Block 402, with parsing the available application table to detect one or more application identifiers associated with the application bundle identifier. In various embodiments, the group-based communication server 110 may be configured to parse the plurality of application identifiers included in the available application table and, based at least in part on the retrieved application bundle data associated with the application bundle identifier, determine whether one or more of the application identifiers associated with the application bundle identifier are included in the available action table associated with the group-based communication workspace. In various embodiments, wherein one or more of the application identifiers associated with the application bundle identifier are not present within the available action table associated with the group-based communication workspace, the group-based communication server 110 may forego the remaining operations of method 400 and transmit a signal to client device 102 indicating that the installation of the application bundle associated with the application bundle installation request is prohibited within the group-based communication workspace.

Upon determining that one or more of the application identifiers present within the available action table associated with the group-based communication workspace is associated with the application bundle identifier, method 400 continues, at Block 403, with retrieving the respective application data associated with each of the detected application identifiers associated with the application bundle identifier. In various embodiments, the group-based communication server 110 may retrieve at least a portion of application data corresponding to each of the applications respectively associated with the detected application identifiers, as described herein, from the group-based communication repository 120. Alternatively, as described herein, in various embodiments, the application data associated with each of the detected application identifiers associated with the application bundle identifier may define at least a portion of the application bundle data retrieved from the group-based communication repository as described in reference to Block 303 of FIG. 3.

In various embodiments, the method 400 continues, at Block 404, with parsing the respective application data associated with each of the detected application identifiers associated with the application bundle identifier to detect one or more applications associated with an authorized application indicator associated with the group-based communication workspace identifier. As described herein, an authorized application indicator may comprise one or more items of data associated with an application identifier and a group-based communication workspace that indicates that the application associated therewith has been authorized by an administrator user to be installed by one or more users within the group-based communication workspace. For example, where user credentials and/or authorizations are applied at a group-based communication workspace-level, each authorized application indicator may be associated with a group-based communication workspace identifier so as to limit the scope of authorization based at least in part on administrator user input and/or the group-based communication workspace identifier with which an application bundle installation request is associated. In various embodiments, the group-based communication server 110 may parse the respective application data associated with each of the detected application identifiers associated with the application bundle identifier to identify an application defined by application data comprising an authorized application indicator associated with the group-based communication workspace identifier. In various embodiments, as described herein, the group-based communication server 110 may associate an application with an authorized application indicator upon receiving, for example, an authorization token corresponding to the application from a client device 104 associated with a workspace administrator user identifier associated with a group-based communication workspace. As such, in various embodiments, the group-based communication server 110 may determine that an application associated with an authorized application indicator associated with a group-based communication workspace identifier has been previously authorized for installation within the group-based communication workspace. In such a circumstance, for example, the group-based communication server 110 may be configured to determine that each application associated with an authorized application indicator associated with the group-based communication workspace identifier does not need to be further authorized by the administrator user for installation within the group-based communication workspace.

In various embodiments, as shown at Block 405, the group-based communication server 110 may identify one or more of the detected application identifiers associated with the application bundle identifier from the available action table that is not associated with an authorized application indicator. In various embodiments, the group-based communication server 110 may parse the respective application data associated with each of the detected application identifiers associated with the application bundle identifier to identify an application defined by application data that does not comprise an authorized application indicator associated with the group-based communication workspace identifier. In such a circumstance, for example, the group-based communication server 110 may be configured to identify each application that is not associated with an authorized application indicator associated with the group-based communication workspace identifier as having yet to be affirmatively authorized and, thus, needing to be transmitted to the administrator user associated with client device 104 for installation authorization prior to installation within the associated group-based communication workspace. Alternatively, in various embodiments, the group-based communication server 110 may be configured to, upon determining which applications associated with an authorized application indicator associated with the group-based communication workspace identifier do not need to be further authorized by the administrator user, programmatically deduce, based at least in part on the configuration of the available application table, that each of the remainder applications (i.e. those not associated with an authenticated application indicator) need to be authorized by the administrator user prior to installation within the group-based communication workspace.

Upon identifying one or more of the detected application identifiers associated with the application bundle identifier that are not associated with an authorized application indicator, the group-based communication server 110 may, at Block 406, determine that each application associated with one of the one or more identified application identifiers require further authorization from the administrator user prior to installation within the group-based communication workspace. For example, each of the applications determined to need installation authorization may be associated with the application bundle identifier and may be defined, at least in part, by application data that does not comprise an authorized application indicator.

Alternatively, in various embodiments, the group-based communication server 110 may determine which of the plurality of applications associated with the application bundle identifier needs to be authorized by parsing application data associated with each of the applications associated with the group-based communication system 118. In various embodiments, the group-based communication server 110 may identify each application associated with either an authorized application indicator or a prohibited application indicator. The group-based communication server 110 may determine that further authorization instructions are not needed with respect to the applications associated with either an authorized application indicator or a prohibited application indicator, as both the authorized application indicator and the prohibited application indicator are associated with an application by the group-based communication server 110 in response to an affirmative authorization instruction by an administrator user associated with a group-based communication workspace. In such a circumstance, the group-based communication server 110 may be further configured to programmatically deduce that each of the remainder applications (i.e. those not associated with either an authenticated application indicator or a prohibited application indicator) need to be authorized by the administrator user prior to installation within the group-based communication workspace.

With reference again to FIG. 3, upon determining that one or more of the applications associated with the application bundle identifier need to be authorized for installation within the group-based communication workspace, the group-based communication server 110 may parse workspace data comprising the group-based communication workspace identifier to detect a workspace administrator user identifier, as shown at Block 305. As described herein, the workspace data may comprise a collection of data associated with a group-based communication workspace that is capable of being transmitted, received, and/or stored. In various embodiments, workspace data may comprise data associated with a group-based communication workspace, such as, for example, a group-based communication workspace identifier, one or more user identifiers of users with access rights to the group-based communication workspace, a workspace administrator user identifier associated with a workspace administrator user, an enterprise identifier associated with an enterprise having managerial control over the group-based communication workspace, one or more application identifiers associated with an authorized application indicator associated with the group-based communication workspace, and/or the like. As described herein, a workspace administrator user may be a user associated with a user profile that is associated with credentials, indicators, and/or identifiers that indicate to a group-based communication server 110 that a client device associated with the user profile may edit access control parameters (e.g. workspace data, channel settings) of various group-based communication workspaces and group-based communication channels having identifiers associated with the workspace administrator user identifier. For example, in various embodiments, a workspace administrator user associated with a workspace administrator user identifier may authorize the installation of an application within a group-based communication workspace associated with the workspace administrator user identifier.

As shown at Block 306, the group-based communication server 110 may generate an application bundle authorization data packet. In various embodiments, the application bundle authorization data packet may comprise an application bundle installation authorization request and at least one authorization token corresponding with a plurality of applications associated with an application bundle identifier, wherein the application bundle installation authorization request is associated with the application bundle identifier and the group-based communication workspace identifier. In various embodiments, the application bundle installation authorization request may comprise a collection of data providing instructions requesting that a plurality of applications associated with the application bundle identifier be authorized for installation within the group-based communication workspace. For example, the application bundle installation authorization request may correspond to the application bundle installation request received by the group-based communication server 110, as described above in reference to Blocks 301-302.

Further, as described herein, the at least one authorization token corresponding with a plurality of applications associated with an application bundle identifier may comprise or otherwise may be associated with information corresponding to an application. The at least one authorization token may be associated with a bundle of a plurality of applications, and thus the at least one authorization token may comprise or represent information corresponding to one or more of a plurality of applications associated with an application bundle identifier. In various embodiments, a single authorization token of the application bundle authorization data packet may comprise or represent information corresponding to each of the plurality of applications associated with the application bundle identifier. For example, wherein a group-based communication server 110 has determined that less than all of the plurality of applications associated with the application bundle identifier need to be authorized, as described above in reference to Block 304, the single authorization token of the application bundle authorization data packet may comprise or represent information corresponding to those applications of the plurality of applications that the group-based communication server 110 determines need to be authorized. Alternatively, or additionally, in various embodiments, the at least one authorization token of the application bundle authorization data packet may comprise a plurality of authorization tokens, each comprising or representing information corresponding to a respective application of the plurality of applications associated with the application bundle identifier, such that each of the plurality of authorization tokens is associated with a single application of the plurality of applications. As described herein, in various embodiments, an authorization token may comprise executable instructions to install at least one application associated therewith in response to receiving an authorization signal indicating that an administrator user associated with a group-based communication workspace has authorized the at least one application for installation within the group-based communication workspace. In various embodiments, an authorization token may further comprise an authorized application indicator associated with the group-based communication workspace and the application.

In various embodiments, the application bundle authorization data packet may further comprise (1) a group-based communication workspace identifier, (2) a group-based communication channel identifier, (3) a user identifier (e.g., the user identifier associated with the application bundle installation request corresponding to the application bundle installation authorization request), (4) an application bundle identifier, (5) at least one application identifiers (e.g., the at least one application identifiers being respectively associated with each of the applications associated with the application bundle identifier identified by the group-based communication server 110 as needing to be authorized for installation in the group-based communication workspace), (6) an interactive application bundle authorization interface, as described herein, (7) a timestamp indicating when the application bundle installation is requested (e.g., when a group-based communication server 110 received an application bundle installation request, as described herein), (8) a workspace administrator user identifier, and/or the like.

As shown at Blocks 307 and 308, the group-based communication server 110 may transmit the application bundle authorization data packet to a client device 104 associated with the workspace administrator identifier associated with the group-based communication workspace, as described above in reference to Block 305. Upon receiving the application bundle authorization data packet, the client device 104 may display the interactive application bundle authorization interface within a group-based communication interface at a display device associated with the client device 104. As described in further detail herein with respect to FIG. 11A, the interactive application bundle authorization interface may render at least one selectable element corresponding to one or more application identifiers. In various embodiments, the interactive application bundle authorization interface may render each of the application identifiers contained within the application bundle authorization data packet (e.g., the at least one application identifiers being respectively associated with each of the applications associated with the application bundle). In various embodiments, the interactive application bundle authorization interface may be configured to receive user input comprising a selection of one or more of the at least one selectable elements corresponding to one or more application identifiers. The user selection of one or more of the at least one selectable elements may indicate a desire to authorize or prohibit the installation of at least one of the applications associated with the application bundle identifier within the group-based communication workspace associated with the group-based communication workspace identifier included in the application bundle authorization data packet.

As shown at Block 309, the client device 104 associated with the workspace administrator user identifier may receive user input at the interactive application bundle authorization interface via the group-based communication interface. In various embodiments, the user input received by the client device 104 may comprise a selection of one or more of the at least one selectable elements corresponding to one or more application identifiers. For example, in various embodiments, the selection of one or more of the at least one selectable element may comprise an authorization signal indicating a desire of the workspace administrator user to authorize the installation of the at least one applications corresponding to the selected element. In various embodiments, a selectable element may correspond to each of the at least one application identifiers rendered within the interactive application bundle authorization interface, such that a selection of the selectable element may generate an authorization signal associated with each of the application identifiers (e.g., an "authorize all" signal) included in the application bundle authorization data packet.

As shown at Blocks 310 and 311, upon receiving user input at the interactive application bundle authorization interface, the client device 104 transmits at least a portion of the application bundle authorization data packet comprising the authorization token to the group-based communication server 110. In various embodiments, wherein the application bundle authorization data packet transmitted to the client device 104 included a single authorization token corresponding to each of the at least one application identifiers included in the application bundle authorization data packet, the group-based communication server 110 may receive the authorization token from the client device 104 in response to the client device 104 receiving user input indicating that the at least one applications respectively associated with the at least one application identifiers is to be authorized for installation within the group-based communication workspace. Alternatively, in various embodiments, wherein the application bundle authorization data packet transmitted to the client device 104 included a plurality of authorization tokens corresponding respectively to each of the plurality of application identifiers included in the application bundle authorization data packet, the group-based communication server 110 may receive from the client device 104 the respective authorization tokens corresponding to each of the application identifiers associated with applications that were indicated by the workspace administrator user input to be authorized for installation within the group-based communication workspace. In various embodiments, the client device 104 may be configured to transmit additional data associated with the application bundle authorization data packet, such as (1) the workspace identifier (e.g., the group identifier), (2) the channel identifier, (3) the user identifier (e.g., the user identifier associated with the application bundle installation request corresponding to the application bundle installation authorization request), (4) an application bundle identifier, (5) at least one application identifier (e.g., the at least one application identifier being respectively associated with each of the applications associated with the application bundle identifier identified by the group-based communication server 110 as needing to be authorized for installation in the group-based communication workspace), (6) a timestamp indicating when the user input was received at the interactive application bundle authorization interface, and/or the like. In various embodiments, the group-based communication server 110 may be configured to detect the absence of one or more of the authorization tokens within the application bundle authorization data packet and, in response, transmit a group-based communication object to the client device 102 associated with the application bundle installation request indicating that one or more of the applications was not authorized for installation within the group-based communication workspace.

As shown at Block 312, upon receiving at least one authorization token associated with one or more of the plurality of applications associated with the application bundle identifier, the group-based communication server 110 may associate an authorized application indicator with each of the one or more applications corresponding to the authorization token, each of the authorized application indicators being further associated with the group-based communication workspace identifier associated with the application bundle authorization data packet. In various embodiments, each authorization token may comprise one or more executable instructions configured to cause the group-based communication server 110 to generate an authorized application indicator for each of the one or more applications to which the authorization token corresponds. In various embodiments, each authorization token may comprise one or more authorized application indicators and one or more executable instructions corresponding to each of the one or more authorized application indicators, wherein the executable instructions are configured to cause the group-based communication server 110 to associate each of the one or more authorized application indicators with the group-based communication workspace identifier associated with the application bundle authorization data packet and one of the applications corresponding to the authorization token. For example, in various embodiments wherein the one or more authorization tokens received by the group-based communication server 110 from the client device 104 comprises a single authorization token corresponding to each of a plurality of application identifiers included in the application bundle authorization data packet, the authorization token may comprise executable instructions to associate a plurality of authorized application indicators with the group-based communication workspace and, respectively, with each of the at least one application identifiers included in the application bundle authorization data packet. Alternatively, in various embodiments, wherein the one or more authorization tokens received by the group-based communication server 110 from the client device 104 comprises a plurality of authorization tokens, each of which corresponds to a respective application identifier of a plurality of application identifiers, each of the plurality of authorization tokens may comprise executable instructions to associate an authorized application indicator with the group-based communication workspace and one of the plurality of application identifiers included in the application bundle authorization data packet.

Upon associating one or more authorized application indicators with the group-based communication workspace identifier and each of the applications corresponding to an authorization token received from the client device 104, the group-based communication server 110 updates the workspace data comprising the group-based communication workspace identifier to include the one or more authorized indicators, as shown at Block 313. As described herein, the workspace data associated with the group-based communication workspace may comprise a collection of data capable of being transmitted, received, and/or stored. In various embodiments, workspace data may comprise data associated with a group-based communication workspace, such as, for example, a group-based communication workspace identifier, one or more user identifiers of users with access rights to the group-based communication workspace, a workspace administrator user identifier associated with a workspace administrator user, an enterprise identifier associated with an enterprise having managerial control over the group-based communication workspace, one or more application identifiers associated with an authorized application indicator associated with the group-based communication workspace, and/or the like.

As shown in Block 314, the group-based communication server 110 may transmit the updated workspace data associated with the group-based communication workspace and comprising at least one authorized application indicator associated with the group-based communication workspace identifier and an application identifier to a group-based communication repository 120 for storage. For example, the updated workspace data may be stored in a workspace storage location configured to store group-based communication messages and/or workspace data associated with a particular group-based communication workspace identifier. In various embodiments, each group-based communication workspace may have its own workspace storage location, wherein data is selectively stored within said workspace storage based on the data being associated with the group-based communication workspace identifier.

The exemplary embodiments described herein in reference to FIGS. 3 and 4 comprise systems and methods for a client device 104 associated with a workspace administrator user identifier authorizing a bundled plurality of applications to be collectively installed in a group-based communication workspace in response to an application bundle installation request being received by the group-based communication server 110, the application bundle installation request having been transferred from a client device 102. Additionally or alternatively, in various embodiments, an application bundle may be authorized for installation within a group-based communication workspace in response to user input received by the client device 104 and transmitted to the group-based communication server 110, the user input being a proactive workspace administrator user input indicating a desire of the workspace administrator user to proactively authorize an application bundle (e.g., each of the plurality of applications associated with the application bundle identifier) for installation within the group-based communication workspace associated with the workspace administrator user identifier. In various embodiments, the aforementioned workspace administrator user input may be received by the client device 104 at a group-based communication interface and may comprise a modification of workspace data associated with the group-based communication workspace. For example, the workspace administrator user input may correspond to an application bundle associated with an application bundle identifier. The client device 104 may transmit a corresponding authorization signal to the group-based communication server 110. Upon receiving the authorization signal from the client device 104, the group-based communication server 101 may detect the workspace administrator user identifier associated with the authorization signal. The group-based communication server 110 may, based on the configuration of the authorization signal received from the client device 104, associate an authorized application indicator associated with the group-based communication workspace with each of the plurality of applications associated with the application bundle identifier. Further, as described above in reference to Blocks 313-314, the group-based communication server may be configured to update the workspace data associated with the group-based communication workspace associated with the workspace administrator user identifier and transmit the updated workspace data to a group-based communication repository 120 for storage.

Alternatively, in various embodiments, the workspace administrator user input described above may be indicative of a desire of the workspace administrator user to proactively prohibit an application bundle from being installed within the group-based communication workspace associated with the workspace administrator user identifier. In such a circumstance, the client device 104 may transmit a corresponding prohibition signal to the group-based communication server 110. Upon receiving the prohibition signal from the client device 104 and detecting the workspace administrator user identifier, the group-based communication server 110 may associate a prohibited application indicator associated with the group-based communication workspace with each of the plurality of applications associated with the application bundle identifier.

Figure 5A:
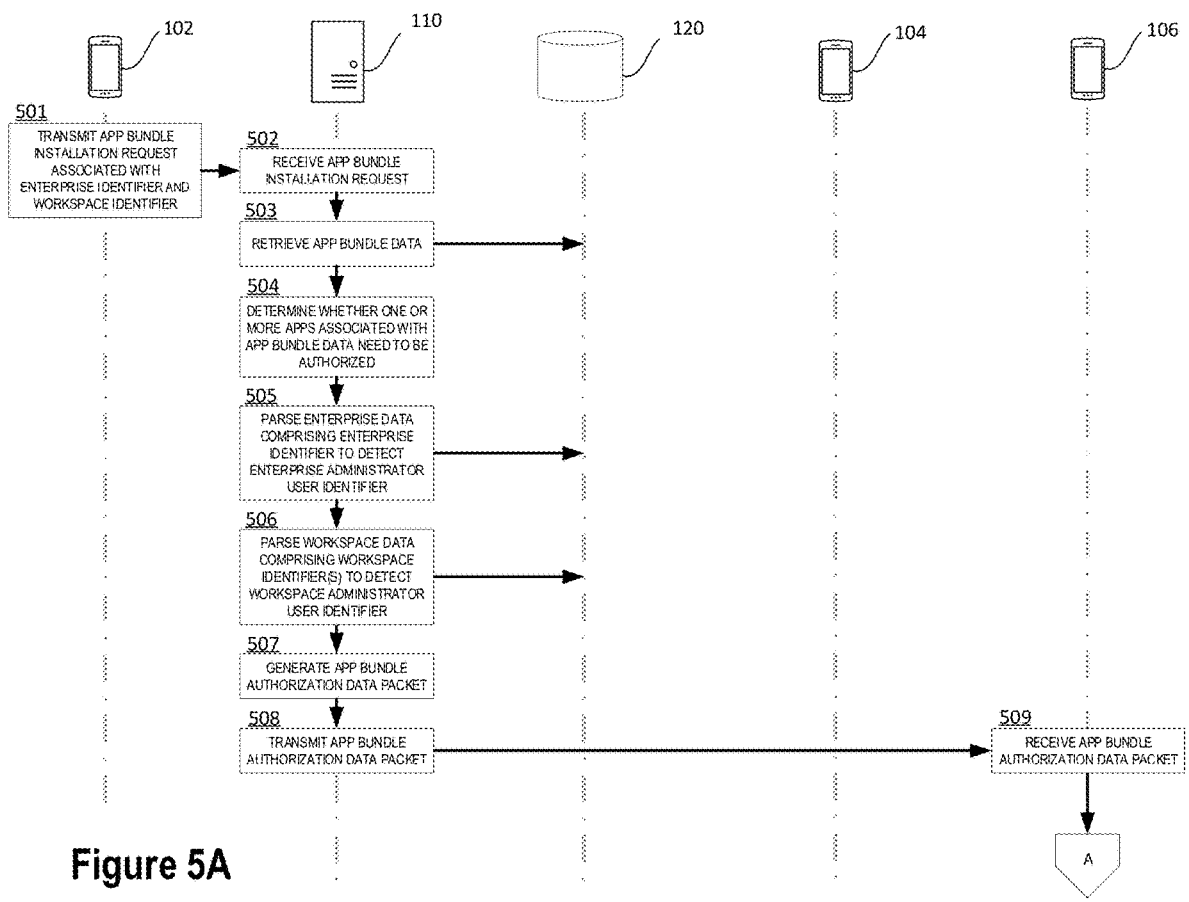
FIGS. 5A-5B illustrate a lane diagram showing functionality of various components in accordance with various embodiments.
Figure 5B:
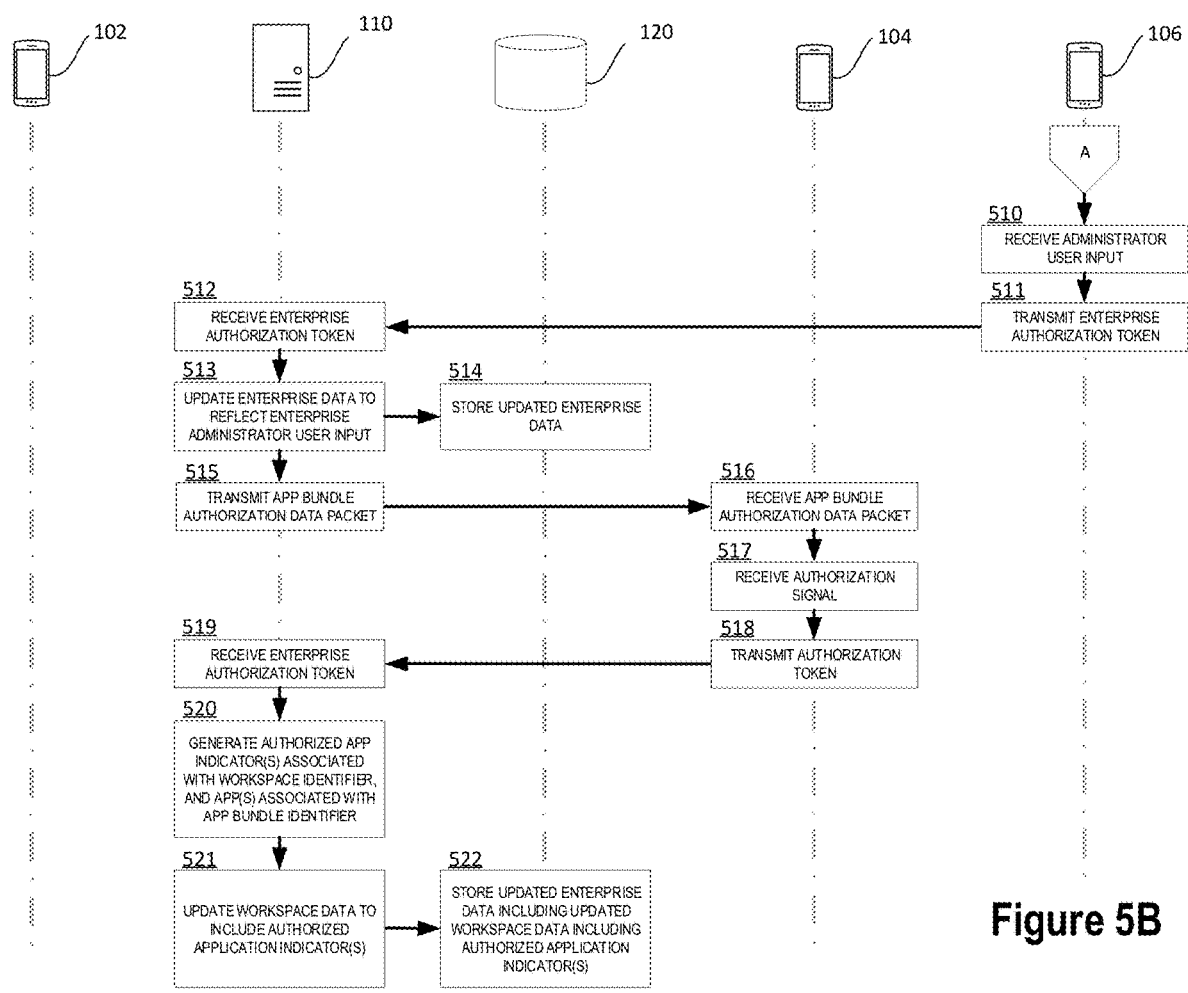

FIGS. 5A-5B illustrate a lane diagram showing functionality of various components associated with exemplary application bundle data in accordance with various embodiments. In particular, FIGS. 5A-5B illustrate various exemplary operations associated with systems and methods for authorizing a bundled plurality of applications to be collectively installed in a group-based communication workspace, wherein the group-based communication workspace is associated with an enterprise.

As noted herein, an enterprise may be a company, organization, and/or the like, comprising a plurality of groups, subgroups, and users, which may be associated with various group-based communication workspaces and group-based communication channels within the group-based communication system 118. Accordingly, as described herein, the enterprise structure may define a hierarchical structure associated with a particular group, in which an enterprise (of which all users associated with a group may be a member of) may encompass a plurality of subgroups (of which a subset of users associated with the group may be a member of). Group-based communication workspaces may be associated with the enterprise or with one or more subgroups and may still be accessible only to users associated with the enterprise. Further, as described herein, because group-based communication workspaces are stored within a plurality of physically disparate database shards, the group-based communication system 118 may utilize a plurality of data tables within the group-based communication repository 120 to relate communication channels with related groups (and enterprises), to relate group-based communication workspaces and/or group-based communication channels with users, and to relate users with groups, subgroups, and/or enterprises. In various embodiments, an enterprise may comprise a plurality of groups, each group comprising a plurality of subgroups. For example, the group-based communication system 118 may be configured such that each of the plurality of groups associated with the enterprise is associated with a respective group-based communication workspace. In such a circumstance, the group would be associated with a group identifier, which would be associated with both the group-based communication workspace identifier and an enterprise identifier associated with the enterprise. Similarly, each member of the group would be associated with a user identifier, which would be associated with the group identifier, group-based communication workspace identifier, and an enterprise identifier associated with the enterprise. In various embodiments, the group-based communication system 118 utilizes a similar hierarchical structure with respect to subgroups, each subgroup having a subgroup identifier associated with a group-based communication channel identifier, a group-based communication workspace identifier, and the enterprise identifier, and each member of the subgroup having a user identifier associated with the subgroup identifier, the group identifier, the enterprise identifier, the group-based communication channel identifier, and the group-based communication workspace identifier.

In various embodiments, in response to receiving a selection of a selectable application bundle element associated with the application bundle identifier at a group-based communication interface displayed on the client device, a client device 102 may transmit an application bundle installation request associated with an application bundle identifier to a group-based communication server 110, as shown at Block 501 of FIG. 5A. For example, the client device 102 may be associated with a user identifier associated with a user. Further, the user identifier may be associated with an enterprise identifier, a group identifier, and a group-based communication workspace identifier. In various embodiments, the application bundle installation request may comprise a collection of data associated with an application bundle identifier that is transmitted by a client device 102 to the group-based communication server 110 as a result of the user indicating a desire to install an application bundle associated with the application bundle identifier within a group-based communication workspace associated with the user identifier. For example, an application bundle installation request may be associated with the client device 102, the user identifier, an enterprise identifier, a group-based communication workspace identifier, the application bundle identifier, and each of the plurality of application identifiers associated with the application bundle identifier. As shown at Block 502, the group-based communication server 110 may be configured to receive the application bundle installation request from the client device 102.

Upon receipt of the application bundle installation request, the process proceeds to Block 503, at which the group-based communication server 110 may retrieve, from a group-based communication repository 120, as described in further detail herein in reference to Block 303 in FIG. 3, wherein the application bundle data comprising the application bundle identifier associated with application bundle installation request.

Upon retrieving the application bundle data comprising the application bundle identifier associated with the application bundle installation request, the group-based communication server 110 may determine whether one or more of the applications associated with the application bundle identifier needs to be authorized for installation within the group-based communication workspace, as shown at Block 504. An exemplary method by which a group-based communication server 110 may make such a determination is shown in FIG. 6, which shows a flowchart illustrating example steps for authorizing an application bundle for installation within a group-based communication workspace associated with an enterprise identifier.

Figure 6:
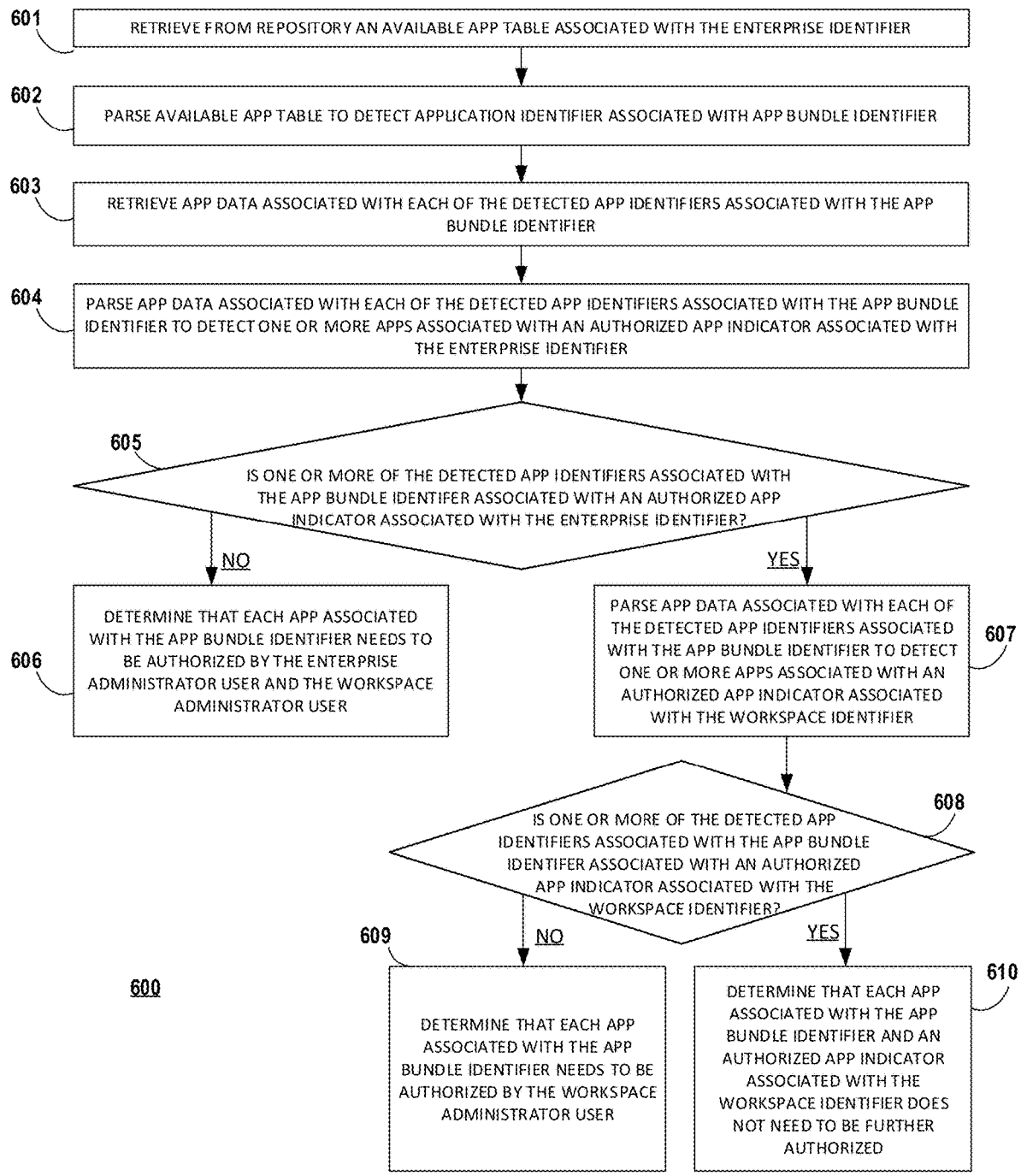
FIG. 6 is a flowchart illustrating example steps for determining whether one or more of the applications associated with an application bundle needs to be authorized for installation within the group-based communication workspace.

As shown at Block 601 of FIG. 6, a group-based communication server 110 may retrieve from a group-based communication repository 120 an available application table associated with the group-based communication workspace identifier and an enterprise identifier. In various embodiments, the available application table may be retrieved from a workspace storage location defining at least a portion of the group-based communication repository 120, such as, for example, a workspace storage location defining at least a portion of an enterprise storage location defining at least a portion of the group-based communication repository 120, the workspace storage location being associated with the group-based communication workspace.

In various embodiments, the applications available to a user for installation within a group-based communication workspace may comprise each application within the group-based communication system 118 that is determined to not be associated with a prohibited application indicator associated with the group-based communication workspace and/or the enterprise identifier. For example, in various embodiments, an available application table may be generated by compiling a plurality of application identifiers associated with the group-based communication system 118 into the available application table and removing from the available action table those applications associated with a prohibited application indicator associated with the group-based communication workspace identifier, as described herein. The available application table may be further refined by removing those applications which the group-based communication server 110 determines to have been prohibited from being installed in one or more group-based communication workspaces associated with an enterprise identifier based at least in part on the enterprise data associated with the enterprise identifier associated with the group-based communication workspace.

In various embodiments, an available application table may comprise each application identifier associated with an authorized application identifier associated with the group-based communication workspace and the enterprise identifier. Further, in various embodiments, an available application table may comprise one or more application identifiers associated with an authorized application identifier associated with the enterprise identifier (e.g., an enterprise authorized application indicator). Applications within the group-based communication system 118 that are associated with neither an authorized application indicator nor a prohibited application indicator may comprise unauthorized applications, which may be included in an available application table as the authorization of each of said applications within a particular group-based communication workspace may not have been affirmatively determined by at least both of 1) an enterprise administrator user associated with an enterprise administrator user identifier associated with the enterprise identifier, and 2) a workspace administrator user associated with a workspace administrator user identifier associated with the group-based communication workspace.

Upon retrieving from the group-based communication repository 120 an available application table associated with the group-based communication workspace identifier, method 600 continues, at Block 602, with parsing the available application table to detect one or more application identifiers associated with the application bundle identifier.

Upon determining that one or more of the application identifiers present within the available action table associated with the group-based communication workspace is associated with the application bundle identifier, method 600 continues, at Block 603, with retrieving the respective application data associated with each of the detected application identifiers associated with the application bundle identifier. In various embodiments, the group-based communication server 110 may retrieve at least a portion of application data corresponding to each of the applications respectively associated with the detected application identifiers, as described herein, from the group-based communication repository 120. Alternatively, as described herein, in various embodiments, the application data associated with each of the detected application identifiers associated with the application bundle identifier may define at least a portion of the application bundle data retrieved from the group-based communication repository as described in reference to Block 503 of FIG. 5A.

In various embodiments, the method 600 continues, at Block 604, with parsing the respective application data associated with each of the detected application identifiers associated with the application bundle identifier to detect one or more applications associated with an authorized application indicator associated with the group-based communication enterprise identifier. As described herein, an authorized application indicator may comprise one or more items of data associated with an application identifier that indicates that the application associated therewith has been authorized by one or more administrator users to be installed by one or more users within the group-based communication workspace. In various embodiments, wherein the group-based communication workspace is associated with an enterprise identifier, an authorized application indicator may be further associated with one or more of an enterprise identifier and a group-based communication workspace identifier. For example, a group-based communication server 110 may associate an application with an authorized application indicator associated with an enterprise identifier (e.g., an enterprise authorized application indicator) upon receiving an authorization signal from a client device 106 associated with an enterprise administrator user identifier. Alternatively, in various embodiments, the group-based communication server 110 may associate an application with an authorized application indicator associated with an enterprise identifier and a group-based communication workspace identifier upon receiving an authorization signal from a client device 106 associated with an enterprise administrator user identifier and a client device 104 associated with a workspace administrator user identifier. For example, where user credentials and/or authorizations are applied at an enterprise level, each authorized application indicator may be associated with an enterprise identifier so as to limit the scope of installation authorization based at least in part on administrator user input and/or the enterprise identifier with which an application bundle installation request is associated.

As described herein, based at least in part on the hierarchical enterprise structure associated with an enterprise, an application that has been authorized by an enterprise administrator user for installation within a group-based communication workspace may be prohibited by the workspace administrator user, such that the group-based communication server 110 will not recognize the application as being authorized for installation within the group-based communication workspace. Conversely, an application that has been prohibited by an enterprise administrator user for installation within a group-based communication workspace may not be authorized by the workspace administrator user, such that the group-based communication server 110 will recognize the application as being authorized for installation within the group-based communication workspace. An application associated with a prohibited application indicator associated with an enterprise identifier is prohibited from being installed in each of the group-based communication workspaces associated with the enterprise identifier.

Upon parsing the respective application data associated with each of the detected application identifiers associated with the application bundle identifier, the method 600 continues at Block 605 with determining whether one or more application identifiers associated with the application bundle identifier are associated with an authorized application indicator associated with enterprise identifier.

In various exemplary circumstances wherein the group-based communication server 110 determines that none of the applications associated with the application bundle identifier are associated with an authorized application indicator associated with the enterprise identifier, method 600 continues at Block 606, with the group-based communication server 110 determining that each of the applications associated with the one or more application identifiers associated with the application bundle identifier require further authorization from the enterprise administrator user prior to installation within the group-based communication workspace. For example, each of the applications determined to need installation authorization may be associated with the application bundle identifier and may be defined by application data that does not comprise an authorized application indicator associated with the enterprise identifier associated with the group-based communication workspace.

Referring back to Element 605, in various exemplary circumstances wherein the group-based communication server 110 determines that one or more of the applications associated with the application bundle identifier are associated with an authorized application indicator associated with the enterprise identifier, method 600 continues at Block 607, with the group-based communication server 110 parsing the respective application data associated with each of the detected application identifiers associated with the application bundle identifier and an authorized application indicator associated with the enterprise identifier associated with the group-based communication workspace. In various embodiments, method 600 continues at Block 608, with the group-based communication server 110 determining whether one or more application identifiers associated with the application bundle identifier and an authorized application indicator associated with an enterprise identifier associated with the group-based communication workspace are further associated with an authorized application indicator associated with the group-based communication workspace identifier.

In various exemplary circumstances wherein the group-based communication server 110 determines that none of the applications associated with application identifiers associated with the application bundle identifier and an authorized application indicator associated with the enterprise identifier are associated with an authorized application indicator associated with the group-based communication workspace identifier, method 600 continues at Block 609, with the group-based communication server 110 determining that each of the applications associated with application identifiers associated with the application bundle identifier and an authorized application indicator associated with the enterprise identifier require further authorization from the workspace administrator user associated with the group-based communication workspace prior to installation within said group-based communication workspace.

Referring back to Element 608, in various exemplary circumstances wherein the group-based communication server 110 determines that one or more of the applications associated with application identifiers associated with the application bundle identifier and an authorized application indicator associated with the enterprise identifier are associated with an authorized application indicator associated with the group-based communication workspace identifier, method 600 continues at Block 610, with the group-based communication server 110 determining that each application associated with an application identifier associated with the application bundle identifier and an authorized application indicator associated with the enterprise identifier and the group-based communication workspace identifier do not require further authorization prior to being installed within the group-based communication workspace.

With reference again to FIG. 5A, upon determining that one or more of the applications associated with the application bundle identifier need to be authorized for installation within the group-based communication workspace, the group-based communication server 110 may parse enterprise data comprising the enterprise identifier associated with the application bundle installation request to detect an enterprise administrator user identifier, as shown at Block 505. As described herein, the enterprise data may comprise a collection of data associated with an enterprise that is capable of being transmitted, received, and/or stored. In various embodiments, enterprise data may comprise data associated with an enterprise, such as, for example, an enterprise identifier, one or more user identifiers associated with the enterprise identifier, an enterprise administrator user identifier associated with an enterprise administrator user, one or more group-based communication workspace identifiers, one or more group-based communication channel identifiers, a plurality of group identifiers, a plurality of subgroup identifiers, one or more application identifiers associated with an authorized application indicator associated with the enterprise identifier, and/or the like. As described herein, an enterprise administrator user may be a user associated with a user profile that is associated with credentials, indicators, and/or identifiers that indicate to a group-based communication server 110 that a client device associated with the user profile may edit access control parameters (e.g. enterprise data, workspace data, channel settings) of various group-based communication enterprise workspaces and group-based communication channels having identifiers associated with the enterprise identifier and/or the enterprise administrator user identifier. For example, in various embodiments, an enterprise administrator user associated with an enterprise administrator user identifier may authorize the installation of an application within a group-based communication workspace associated with the enterprise administrator user identifier.

Further, the group-based communication server 110 may parse workspace data comprising the group-based communication workspace identifier to detect a workspace administrator user identifier, as shown at Block 506. As described herein in further detail in reference to Block 305 of FIG. 3, the workspace data may comprise a collection of data associated with a group-based communication workspace that is capable of being transmitted, received, and/or stored. In various embodiments, workspace data may comprise data associated with a group-based communication workspace, such as, for example, a group-based communication workspace identifier, one or more user identifiers of users with access rights to the group-based communication workspace, a workspace administrator user identifier associated with a workspace administrator user, an enterprise identifier associated with an enterprise having managerial control over the group-based communication workspace, an enterprise administrator user identifier associated with an enterprise administrator user, one or more application identifiers associated with an authorized application indicator associated with the group-based communication workspace, and/or the like.

As shown at Block 507, the group-based communication server 110 may generate an application bundle authorization data packet. In various embodiments, the application bundle authorization data packet may comprise an application bundle installation authorization request and at least one authorization token corresponding with a plurality of applications associated with an application bundle identifier, wherein the application bundle installation authorization request is associated with the application bundle identifier, and the group-based communication workspace identifier. As described herein, in various embodiments, the application bundle installation authorization request may comprise a collection of data providing instructions requesting that a plurality of applications associated with the application bundle identifier be authorized for installation within the group-based communication workspace. For example, the application bundle installation authorization request may correspond to the application bundle installation request received by the group-based communication server 110, as described above in reference to Blocks 501-502.

Further, as described herein, the at least one authorization token corresponding with a plurality of applications associated with an application bundle identifier may comprise or otherwise may be associated with information corresponding to an application. The at least one authorization token may be associated with a bundle of a plurality of applications, and thus the at least one authorization token may comprise or represent information corresponding to one or more of a plurality of applications associated with an application bundle identifier. As described herein, the at least one authorization token of the application bundle authorization data packet may comprise either a single authorization token corresponding to each of the plurality of applications associated with the application bundle identifier or, alternatively, a plurality of authorization tokens, each corresponding to a respective application of the plurality of applications associated with the application bundle identifier. As described herein, an authorization token may comprise executable instructions to install at least one application associated therewith in response to receiving an authorization signals from both a client device associated with an enterprise administrator user identifier and a client device associated with a workspace administrator user identifier indicating that both administrator users associated with a group-based communication workspace (e.g., at a workspace level and at an enterprise level) have authorized the corresponding at least one application within the group-based communication workspace. Further, in various embodiments, an authorization token may comprise an executable instruction to, upon receiving an authorization token from the client device 106 associated with the enterprise administrator user identifier, transmit an application bundle authorization data packet to a client device 104 associated with a workspace administrator user identifier. In various embodiments, an authorization token may further comprise an authorized application indicator associated with the enterprise identifier, group-based communication workspace, and the application corresponding to the authorization token.

In various embodiments, the application bundle authorization data packet may further comprise (1) a group-based communication workspace identifier, (2) a group-based communication channel identifier, (3) a user identifier (e.g., the user identifier associated with the application bundle installation request corresponding to the application bundle installation authorization request), (4) an application bundle identifier, (5) at least one application identifiers (e.g., the at least one application identifiers being respectively associated with each of the applications associated with the application bundle identifier identified by the group-based communication server 110 as needing to be authorized for installation in the group-based communication workspace), (6) an interactive application bundle authorization interface, as described herein, (7) a timestamp indicating when the application bundle installation is requested (e.g., when a group-based communication server 110 received an application bundle installation request, as described herein), (8) a workspace administrator user identifier, (9) an enterprise identifier, (10) an enterprise administrator identifier, and/or the like.

As shown at Blocks 508 and 509, the group-based communication server 110 may transmit the application bundle authorization data packet to a client device 106 associated with the enterprise administrator identifier associated with the enterprise identifier associated with the group-based communication workspace, as described above in reference to Block 505. In various embodiments, the group-based communication server 110 may transmit an application bundle authorization data packet to the client device 106 prior to transmitting the same to a client device 104 associated with a workspace administrator user associated with the group-based communication workspace based at least in part on the hierarchical enterprise structure associated with the enterprise. Upon receiving the application bundle authorization data packet, the client device 106 may display the interactive application bundle authorization interface, as described herein, within a group-based communication interface at a display device associated with the client device 106.

As shown at Block 510 of FIG. 5B, the client device 106 associated with the enterprise administrator user identifier may receive user input at the interactive application bundle authorization interface via the group-based communication interface. In various embodiments, the user input received by the client device 106 may comprise a selection of one or more of the at least one selectable elements corresponding to one or more application identifiers. For example, in various embodiments, the selection of one or more of the at least one selectable element may comprise an authorization signal indicating a desire of the enterprise administrator user to authorize the installation of the at least one applications corresponding to the selected element.

As shown at Blocks 511 and 512, upon receiving user input at the interactive application bundle authorization interface, the client device 106 transmits at least a portion of the application bundle authorization data packet comprising the authorization token to the group-based communication server 110. In various embodiments, the group-based communication server 110 may receive at least one authorization token from the client device 106 in response to the client device 106 receiving user input indicating that the at least one applications respectively associated with the at least one application identifiers is authorized by the enterprise administrator user for installation within the group-based communication workspace. Further, in various embodiments, the group-based communication server 110 may receive at least one authorization token from the client device 106 in response to the client device 106 receiving user input indicating that the at least one applications respectively associated with the at least one application identifiers is authorized by the enterprise administrator user for installation within one or more group-based communication workspaces (e.g., each of a plurality of group-based communication workspaces) associated with the enterprise identifier. In various embodiments, the group-based communication server 110 may be configured to detect the absence of one or more of the authorization tokens within the application bundle authorization data packet and, in response, transmit a group-based communication object to the client device 102 associated with the application bundle installation request indicating that one or more of the applications was not authorized for installation within the group-based communication workspace.

As shown at Block 513, upon receiving, from the client device 106, at least one authorization token associated with one or more of the plurality of applications associated with the application bundle identifier, the group-based communication server 110 may update the enterprise data comprising the enterprise identifier to reflect the authorization signal received from the client device 106. As described herein, the enterprise data associated with the enterprise may comprise a collection of data capable of being transmitted, received, and/or stored. In various embodiments, enterprise data may comprise data associated with an enterprise, such as, for example, a plurality of user identifiers, an enterprise administrator user identifier associated with an enterprise administrator user, a plurality of group-based communication workspace identifiers, a plurality of workspace administrator user identifiers, a plurality of group-based communication channel identifiers, a plurality of channel administrator user identifiers, enterprise application authorization data comprising at least one application identifier associated with one or more of an authorized application indicator, a prohibited application indicator, and data representative of a partial installation authorization, and/or the like. In various embodiments, enterprise data may comprise data representative of a partial installation authorization wherein the group-based communication server 110 has received an authorization signal associated with an application from at least a portion, but not all, of the administrator users from whom installation authorization of the application is required. The group-based communication server 110 may update the enterprise data to reflect that an authorization signal has been received from the client device 106 associated with the enterprise administrator user identifier, but that installation authorization from the workspace administrator user associated with the group-based communication workspace has not been received.

In various embodiments, upon receiving an authorization signal associated with one or more applications from a client device associated with an enterprise administrator user identifier, the group-based communication server 110 may be configured to generate an enterprise authorized application indicator associated with the one or more applications. The enterprise authorized application indicator may comprise data indicative of an authorization received by the group-based communication server 110 from the client device 106 associated with the enterprise administrator user identifier for installation of the application associated therewith in each of the group-based communication workspaces associated with the enterprise identifier. For example, such an enterprise authorized application indicator associated with an enterprise identifier may act as installation authorization for an application in each of the group-based communication workspaces associated with the enterprise identifier. In such an exemplary circumstance, upon detecting an enterprise authorized application indicator, the group-based communication server 110 may determine that further authorization from the enterprise administrator user for installation of the application in a group-based communication workspace associated with the enterprise identifier is not required.

As shown in Block 514, the group-based communication server 110 may transmit the updated enterprise data associated with the enterprise identifier to a group-based communication repository 120 for storage. For example, the updated enterprise data may be stored in an enterprise storage location configured to store enterprise data and group-based communication messages and/or objects associated with each group-based communication workspace identifier associated. In various embodiments, each enterprise associated with the group-based communication system 118 may have its own enterprise storage location associated with the enterprise identifier, wherein data is selectively stored within said enterprise storage location based on the data being associated with the enterprise identifier. Further, in various embodiments, each group-based communication workspace associated with the enterprise identifier may have its own workspace storage location within the enterprise storage location, wherein data is selectively stored within said workspace storage location based on the data being associated with the enterprise identifier and the group-based communication workspace identifier.

In various embodiments, the operations illustrated by Blocks 515-521 comprise the same steps and group-based communication system 118 components as described herein in reference to Blocks 307-314 of FIG. 3. The group-based communication server 110 may transmit an application bundle authorization data packet to the client device 104 associated with the workspace administrator user identifier associated with the group-based communication workspace. The client device 104 may receive an authorization signal via user input at the group-based communication interface by the workspace administrator user indicating the desire of the workspace administrator user to authorize for installation within the group-based communication workspace one or more of the applications associated with the application bundle identifier. Further, the client device 104 may transmit an authorization token, as described herein, to the group-based communication server 110. Upon receiving at least one authorization token associated with one or more of the plurality of applications associated with the application bundle identifier, the group-based communication server 110 may associate an authorized application indicator with each of the one or more applications corresponding to the authorization token, each of the authorized application indicators being further associated with the group-based communication workspace identifier associated with the application bundle authorization data packet. Upon associating one or more authorized application indicators with the group-based communication workspace identifier and each of the applications corresponding to an authorization token received from the client device 104, the group-based communication server 110 updates the workspace data comprising the group-based communication workspace identifier to include the one or more authorized indicators. Additionally, as shown at Block 522, the group-based communication server 110 may transmit the updated workspace data comprising at least one authorized application indicator associated with the group-based communication workspace identifier and an application identifier to a group-based communication repository 120 for storage. For example, the workspace data may be stored in a workspace storage location within an enterprise storage location associated with the enterprise identifier.

B. Installing a Plurality of Applications Associated with Application Bundle

As noted above, systems and methods for collectively installing a bundled plurality of applications in a group-based communication workspace enabling communications between client devices via a group-based communication system according to various embodiments are discussed herein.

Figure 7A:
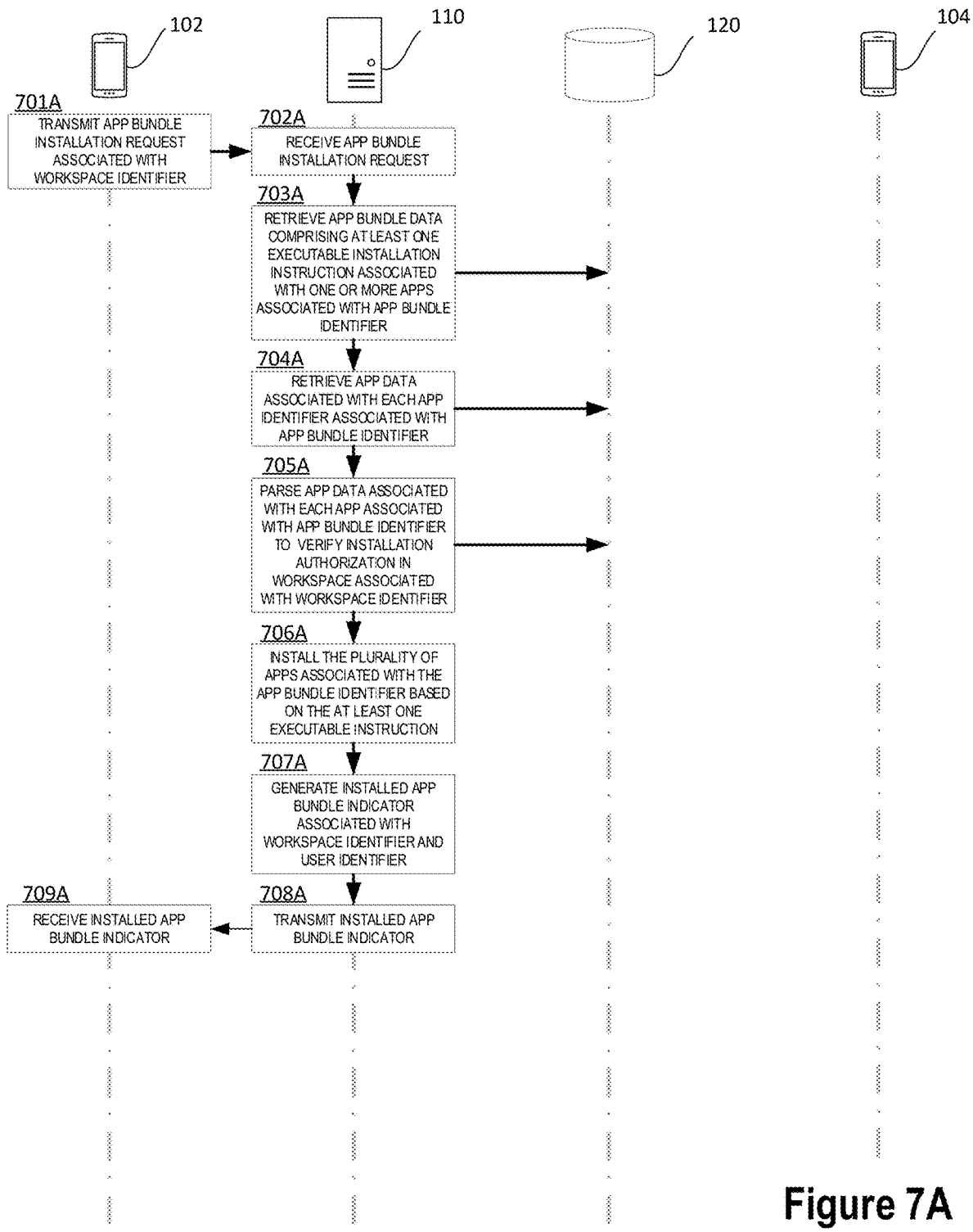
FIGS. 7A-7C illustrate lane diagrams showing functionality of various components in accordance with various embodiments.
Figure 7B:
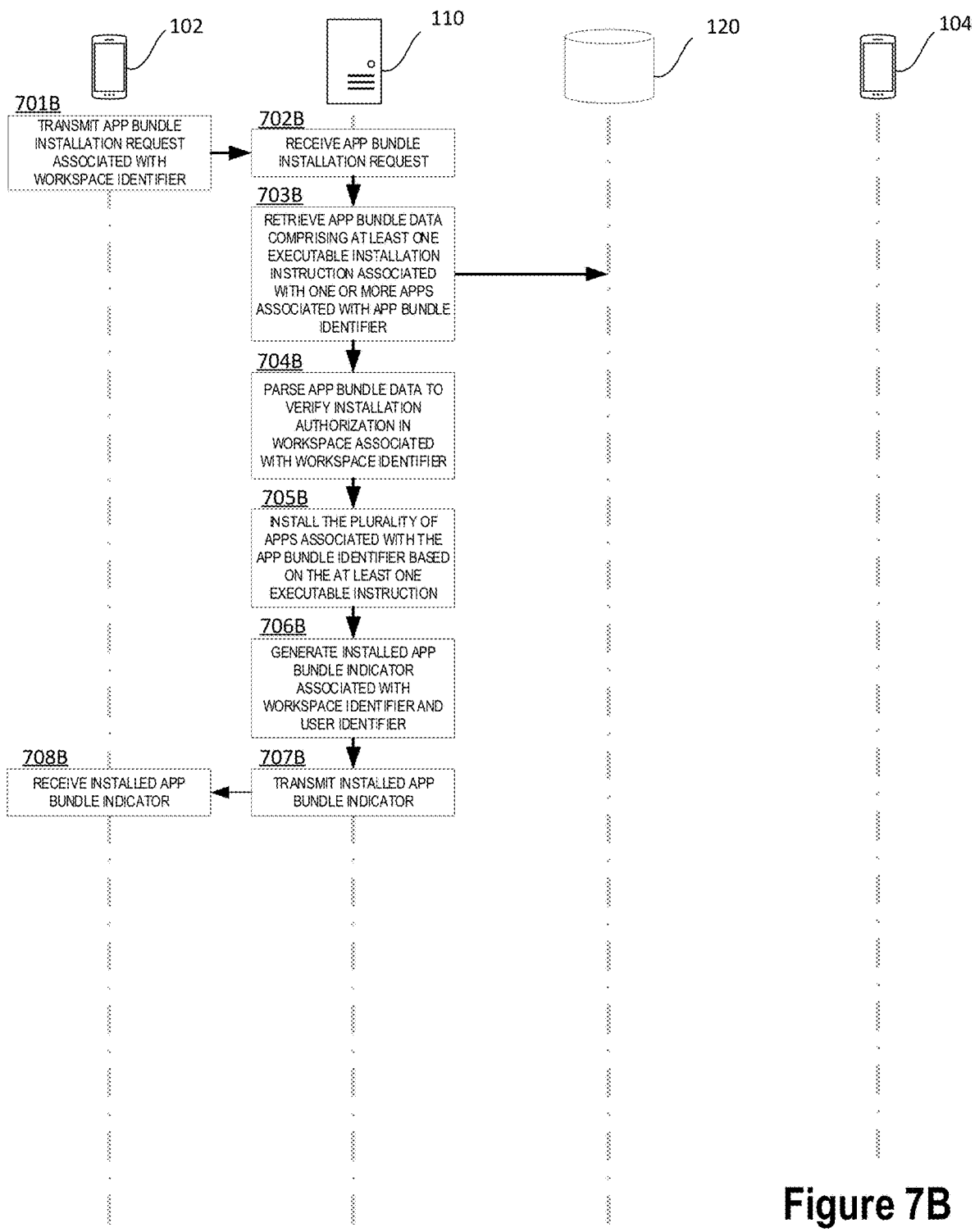
Figure 7C:
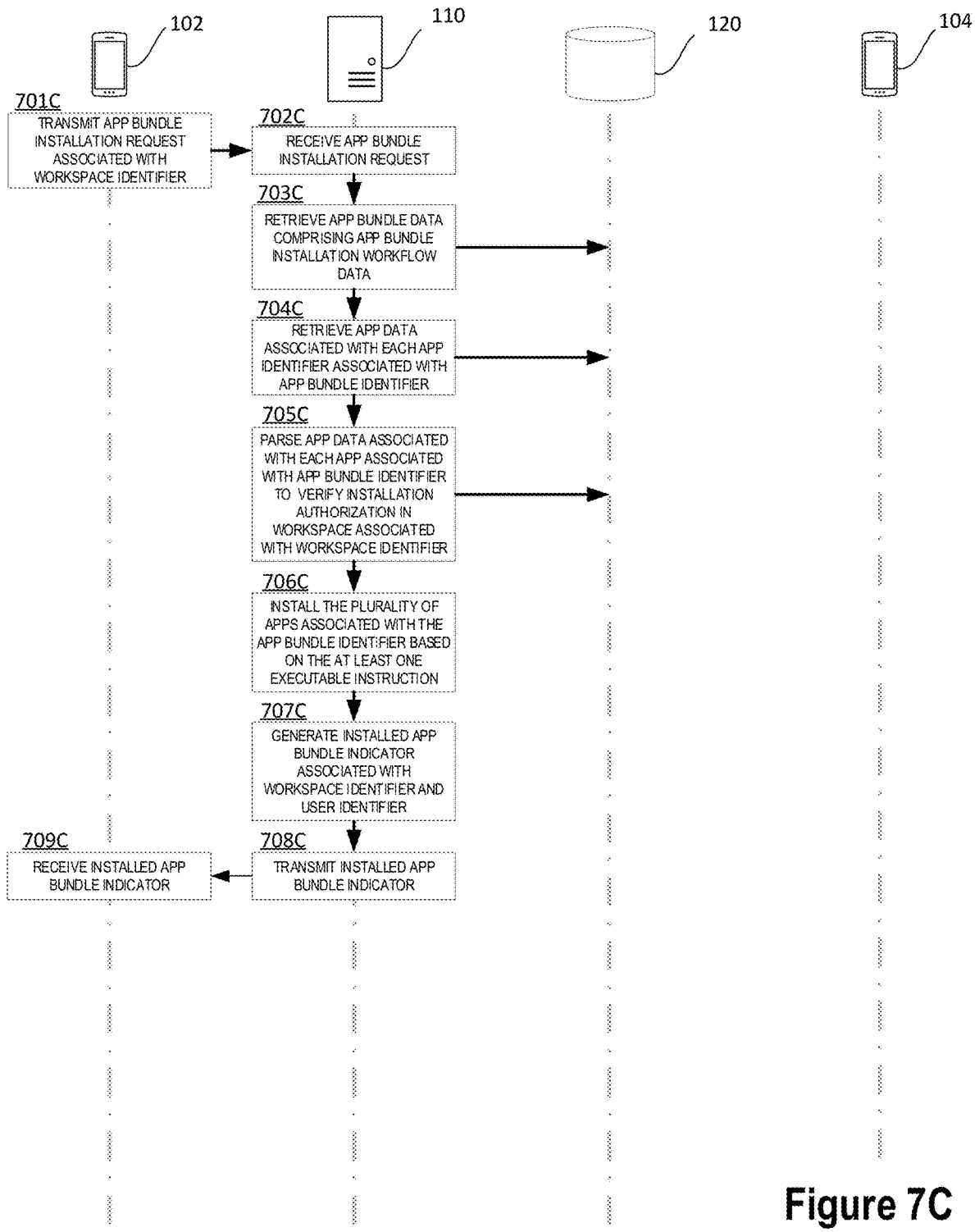

FIGS. 7A-7C illustrate lane diagrams showing functionality of various components associated with exemplary application bundle data in accordance with various embodiments. In particular, FIGS. 7A-7C illustrate various exemplary operations associated with systems and methods for installing a bundled plurality of applications within a group-based communication workspace. As described herein, application bundle data may comprise a plurality of application identifiers respectively associated with the plurality of applications associated with the application bundle identifier and at least one executable instruction. For example, in various embodiments, an application bundle may, itself, be embodied as an application within the group-based communication system 118 that, upon execution, based at least in part on the application bundle data associated therewith (e.g., the plurality of application identifiers, the at least one executable instruction, and/or the like), causes the group-based communication server 110 to retrieve the application data associated respectively with each of the plurality of application identifiers. Further, in various embodiments, the application bundle data may comprise various application data associated respectively with each application of the plurality of applications associated with the application bundle identifier. In such an exemplary circumstance, the at least one executable instruction of the application bundle data may cause the group-based communication server 110 to initialize the installation process within a group-based communication workspace for each of the plurality of applications based at least in part on the various application data included in the application bundle data. Alternatively, the application bundle data may comprise workflow data defining the functionality of a workflow associated therewith, the workflow being configured to install each of a plurality of applications associated with the application bundle identifier within a group-based communication workspace. For example, the at least one executable instruction of the application bundle data may facilitate the execution of one or more steps required to install each of the plurality of applications associated with the application bundle identifier within a group-based communication workspace.

FIG. 7A illustrates various exemplary operations associated with systems and methods for installing a bundled plurality of applications within a group-based communication workspace, wherein the application bundle is embodied as an application within the group-based communication system 118 defined by the corresponding application bundle data, wherein the application bundle data does not comprise the application data associated with the various applications associated with the application bundle identifier.

In various embodiments, in response to receiving a selection of a selectable application bundle element associated with the application bundle identifier at a group-based communication interface displayed on the client device, a client device 102 may transmit an application bundle installation request, as described herein, associated with an application bundle identifier and a group-based communication workspace to a group-based communication server 110, as shown at Block 701A of FIG. 7A. As shown at Block 702A, the group-based communication server 110 may be configured to receive the application bundle installation request from the client device 102.

Upon receipt of the application bundle installation request, the process proceeds to Block 703A, at which the group-based communication server 110 may retrieve, from a group-based communication repository 120, the application bundle data comprising the application bundle identifier associated with application bundle installation request. As described herein, the application bundle data may comprise a plurality of application identifiers respectively associated with the plurality of applications associated with the application bundle identifier and at least one executable instruction. In various embodiments, the at least one executable instruction of the application bundle data may cause the group-based communication server 110 to retrieve the application data associated respectively with each of the plurality of application identifiers from a group-based communication repository 120, as shown at Block 704A.

Upon retrieving the application data associated with each application identifier associated with the application bundle identifier, the group-based communication server 110, as shown at Block 705A, may parse the various application data associated each of the application identifiers associated with the application bundle identifier to verify that each of the one or more of the applications associated with the application bundle identifier is authorized for installation within the group-based communication workspace. The group-based communication server 110 may verify the installation authorization of each of the one or more of the applications associated with the application bundle identifier by executing one or more of the exemplary operations described in further detail herein in reference to Block 304 and/or Block 504 of FIG. 3 and FIG. 5A, respectively. In various embodiments, as further described herein, upon determining that one or more of the applications associated with the application bundle identifier requires further authorization to be installed within the group-based communication workspace, the group-based communication server 110 may transmit one or more application bundle installation authorization interfaces to one or more client devices associated with administrator user identifier associated with the group-based communication workspace (e.g., an enterprise administrator user identifier, a workspace administrator user identifier) in order to receive the proper authorization.

Upon verifying that each of the one or more of the applications associated with the application bundle identifier is authorized for installation within the group-based communication workspace, the group-based communication server 110, as shown at Block 706A, may install each of the plurality of applications associated with the application bundle identifier within the group-based communication workspace. In various embodiments, installing each of the plurality of applications within the group-based communication workspace may comprise the group-based communication server 110 executing at least one executable instruction of the application bundle data, the executable instruction comprising instructions to retrieve installation instructions corresponding to each of the plurality of applications associated with the application bundle identifier from the application data respectively associated with each application. As described herein, the at least one executable instructions of the application bundle data may define at least a portion of one or more tokens. In various embodiments, the group-based communication server 110 may first install an application comprising the application bundle data, which, upon execution thereof by the group-based communication server 110, may initiate the installation of each of the plurality of applications associated with the application bundle identifier. For example, the group-based communication server 110 may generate application data associated with the user identifier and the group-based communication workspace identifier associated with the application bundle installation request. The generated application data may comprise data configured to enable the user associated with the user identifier to access and/or execute various functionalities of the application within the group-based communication workspace associated with the group-based communication workspace identifier. In various embodiments, installing an application bundle within a group-based communication workspace may further comprise rendering within the group-based communication workspace interface a plurality of selectable application elements associated, respectively, with each of the plurality of applications associated with the application bundle identifier.

In various embodiments, based at least in part on the at least one executable instruction of the application bundle data, the group-based communication server 110 may install at least a portion of the plurality of applications associated with the application bundle identifier at least substantially simultaneously. Alternatively, or additionally, the group-based communication server 110 may serially install at least a portion of the plurality of applications associated with the application bundle identifier, such that the applications are installed within the group-based communication workspace in sequence. In various embodiments, wherein the at least a portion of the plurality of applications associated with the application bundle identifier are serially installed, the group-based communication server 110 may sequentially install the plurality of applications based at least in part on a predetermined application bundle installation order. For example, the application bundle installation order may be defined by the at least one executable instructions of the application bundle data.

As shown at Block 707A, upon determining that each of the plurality of applications associated with the application bundle identifier have been installed within the group-based communication workspace, the group-based communication server 110 may generate an installed application bundle indicator associated with the application bundle identifier, the group-based communication workspace, and the user identifier associated with the client device 102. In various embodiments, an installed application bundle indicator may comprise data that indicates that each of applications associated with the application bundle identifier have been installed. In various embodiments, the installed application bundle indicator may comprise a textual or graphical statement generated as a representation that the selected the plurality of applications corresponding to the application bundle identifier associated with the application bundle installation request have been installed. As shown at Blocks 708A and 709A, the group-based communication server 110 provides the installed application bundle indicator to the client device 102. For example, the installed application bundle indicator may be rendered within the group-based communication interface displayed at the client device 102. In various embodiments, based at least in part on the application bundle data associated with the application bundle identifier, the group-based communication server 110 may further transfer application bundle data to the client device 102.

FIG. 7B illustrates various exemplary operations associated with systems and methods for installing a bundled plurality of applications within a group-based communication workspace, wherein the application bundle is embodied as an application within the group-based communication system 118 defined by the corresponding application bundle data, wherein the application bundle data comprises various application data associated with each of the plurality of applications associated with the application bundle identifier.

In various embodiments, the operations illustrated by Blocks 701B-702B comprise the same steps and group-based communication system 118 components as described herein in reference to Blocks 701A-702A of FIG. 7A. Upon receipt of the application bundle installation request by the group-based communication server 110, the process proceeds to Block 703B, at which the group-based communication server 110 may retrieve, from a group-based communication repository 120, the application bundle data comprising the application bundle identifier associated with application bundle installation request. As described herein, the application bundle data may comprise a plurality of application identifiers respectively associated with the plurality of applications associated with the application bundle identifier and at least one executable instruction. In the exemplary embodiment described in reference to FIG. 7B, the application bundle data may further comprise various application data associated respectively with each application of the plurality of applications associated with the application bundle identifier. In such an exemplary circumstance, the at least one executable instruction of the application bundle data is configured to initialize the installation process within a group-based communication workspace for each of the plurality of applications based at least in part on the various application data—and the respective installation instructions included therein—included in the application bundle data.

Upon retrieving the application bundle data associated with the application bundle identifier, the group-based communication server 110, as shown at Block 705A, may parse the application bundle data to verify that each of the one or more of the applications associated with the application bundle identifier is authorized for installation within the group-based communication workspace. For example, the group-based communication server 110 may parse the various application data defining at least a portion of the application bundle data. The group-based communication server 110 may verify the installation authorization of each of the one or more of the applications associated with the application bundle identifier by executing one or more of the exemplary operations described in further detail herein in reference to Block 304 and/or Block 504 of FIG. 3 and FIG. 5A, respectively. In various embodiments, as further described herein, upon determining that one or more of the applications associated with the application bundle identifier requires further authorization to be installed within the group-based communication workspace, the group-based communication server 110 may transmit one or more application bundle installation authorization interfaces to one or more client devices associated with administrator user identifier associated with the group-based communication workspace (e.g., an enterprise administrator user identifier, a workspace administrator user identifier) in order to receive the proper authorization.

Upon verifying that each of the one or more of the applications associated with the application bundle identifier is authorized for installation within the group-based communication workspace, the group-based communication server 110, as shown at Block 705B, may install each of the plurality of applications associated with the application bundle identifier within the group-based communication workspace. In various embodiments, installing each of the plurality of applications within the group-based communication workspace may comprise the group-based communication server 110 executing at least one executable instruction of the application bundle data, the executable instruction comprising instructions causing the group-based communication server 110 to initialize the installation process within a group-based communication workspace for each of the plurality of applications based at least in part on the various application data included in the application bundle data. Accordingly, the group-based communication server 110 may be configured to execute the installation of each of the plurality of applications associated with the application bundle identifier, as described in further detail herein.

Upon determining that each of the plurality of applications associated with the application bundle identifier have been installed within the group-based communication workspace, the group-based communication server 110 may generate an installed application bundle indicator associated with the application bundle identifier, the group-based communication workspace, and the user identifier associated with the client device 102. In various embodiments, the operations illustrated by Blocks 706B-708B comprise the same steps and group-based communication system 118 components as described herein in reference to Blocks 707AB-709A of FIG. 7A.

FIG. 7C illustrates various exemplary operations associated with systems and methods for installing a bundled plurality of applications within a group-based communication workspace, wherein the application bundle is embodied as an executable workflow configured to install each of the plurality of applications associated with the application bundle identifier within a group-based communication workspace. In various embodiments, the operations illustrated by Blocks 701C-702C comprise the same steps and group-based communication system 118 components as described herein in reference to Blocks 701A-702A of FIG. 7A. Upon receipt of the application bundle installation request by the group-based communication server 110, the process proceeds to Block 703C, at which the group-based communication server 110 may retrieve, from a group-based communication repository 120, the application bundle data comprising the application bundle identifier associated with application bundle installation request. As described herein, the application bundle data may comprise a plurality of application identifiers respectively associated with the plurality of applications associated with the application bundle identifier and at least one executable instruction. In the exemplary embodiment described in reference to FIG. 7C, the application bundle data may comprise application bundle installation workflow data, the application bundle installation workflow data defining the functionality of an application bundle installation workflow associated therewith. In various embodiments, the application bundle installation workflow may comprise a workflow of the group-based communication system 118 configured to cause the group-based communication server 110 to install each of a plurality of applications associated with the application bundle identifier within a group-based communication workspace. For example, the application bundle may be embodied as an executable workflow defined by the application bundle data, which may comprise application bundle installation workflow data comprising at least one executable instruction configured to facilitate the execution of one or more steps required to install each of the plurality of applications associated with the application bundle identifier within a group-based communication workspace.

In various embodiments, the at least one executable instruction of the application bundle data (e.g., the application bundle installation workflow data) may cause the group-based communication server 110 to retrieve the application data associated respectively with each of the plurality of application identifiers from a group-based communication repository 120, as shown at Block 704C.

Upon retrieving the application data associated with each application identifier associated with the application bundle identifier, the group-based communication server 110, as shown at Block 705C, may parse the various application data associated with each of the application identifiers associated with the application bundle identifier to verify that each of the one or more of the applications associated with the application bundle identifier is authorized for installation within the group-based communication workspace. The group-based communication server 110 may verify the installation authorization of each of the one or more of the applications associated with the application bundle identifier by executing one or more of the exemplary operations described in further detail herein in reference to Block 304 and/or Block 504 of FIG. 3 and FIG. 5A, respectively. In various embodiments, as further described herein, upon determining that one or more of the applications associated with the application bundle identifier requires further authorization to be installed within the group-based communication workspace, the application bundle installation workflow may be defined such that the group-based communication server 110 may transmit one or more application bundle installation authorization interfaces to one or more client devices associated with administrator user identifier associated with the group-based communication workspace (e.g., an enterprise administrator user identifier, a workspace administrator user identifier) in order to receive the proper authorization.

Upon verifying that each of the one or more of the applications associated with the application bundle identifier is authorized for installation within the group-based communication workspace, the group-based communication server 110, as shown at Block 706C, may install each of the plurality of applications associated with the application bundle identifier within the group-based communication workspace. In various embodiments, installing each of the plurality of applications within the group-based communication workspace may comprise the group-based communication server 110 executing at least one executable instruction of the application bundle data, the executable instruction comprising application bundle installation workflow data configured to cause the group-based communication server 110 to execute one or more workflow steps to retrieve installation instructions corresponding to each of the plurality of applications associated with the application bundle identifier from the application data respectively associated with each application. In various embodiments, the application bundle installation workflow data may be configured such that the group-based communication server 110 may generate application data associated with the user identifier and the group-based communication workspace identifier associated with the application bundle installation request. For example, the generated application data may comprise data configured to enable the user associated with the user identifier to access and/or execute various functionalities of the application within the group-based communication workspace associated with the group-based communication workspace identifier. In various embodiments, the application bundle installation workflow data may comprise one or more instructions corresponding to a workflow step wherein the group-based communication server 110 may render within the group-based communication workspace interface a plurality of selectable application elements associated, respectively, with each of the plurality of applications associated with the application bundle identifier.

Upon determining that each of the plurality of applications associated with the application bundle identifier have been installed within the group-based communication workspace, the application bundle installation workflow defined by the application bundle data may be configured such that the group-based communication server 110 may generate an installed application bundle indicator associated with the application bundle identifier, the group-based communication workspace, and the user identifier associated with the client device 102. In various embodiments, the operations illustrated by Blocks 707C-709C comprise the same steps and group-based communication system 118 components as described herein in reference to Blocks 707AB-709A of FIG. 7A.

C. Installing a Plurality of Applications Associated with Application Bundle

As noted above, systems and methods for generating a bundled plurality of applications to be collectively installed in a group-based communication workspace enabling communications between client devices via a group-based communication system according to various embodiments are discussed herein.

Figure 8A:
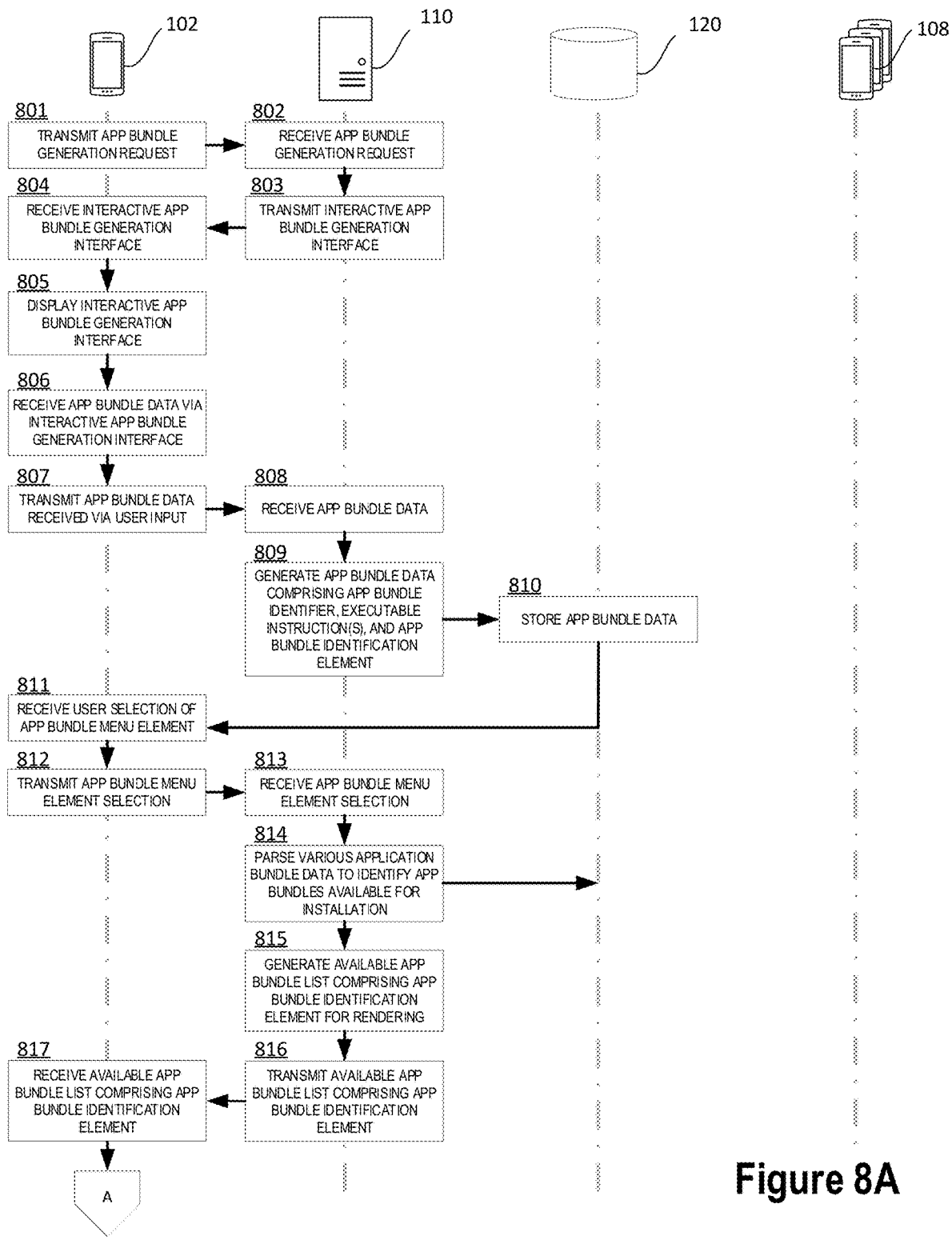
FIGS. 8A-8B illustrate a lane diagram showing functionality of various components in accordance with various embodiments.
Figure 8B:
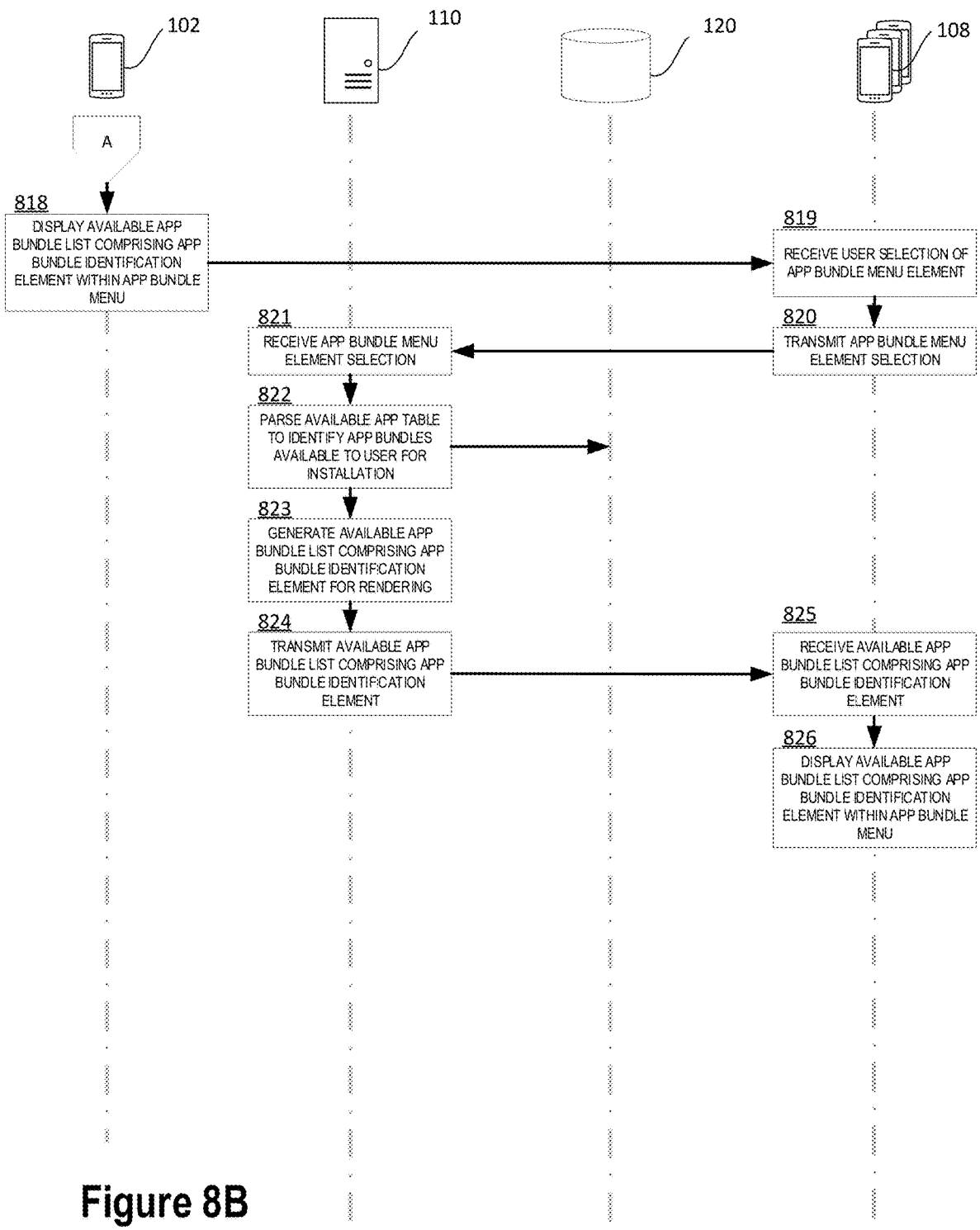

FIGS. 8A-8B illustrate lane diagrams showing functionality of various components associated with exemplary application bundle data in accordance with various embodiments. In particular, FIGS. 8A-8B illustrate various exemplary operations associated with systems and methods for generating a bundled plurality of applications within a group-based communication workspace and displaying data corresponding to the bundled plurality of applications within a group-based communication interface.

In various embodiments, in response to receiving a selection of a selectable application bundle generation element at a group-based communication interface displayed on the client device, a client device 102 may transmit an application bundle generation request to a group-based communication server 110, as shown at Block 801 of FIG. 8. In various embodiments, the application bundle generation request may comprise a collection of data associated with a user identifier that is transmitted by a client device 102 associated with the user identifier to the group-based communication server 110 as a result of the user associated with the user identifier indicating a desire to generate an application bundle within a group-based communication system 118. For example, an application bundle generation request may be associated with the user identifier and/or a client device 102 associated therewith. In various embodiments, the user identifier associated with the application bundle generation request may be associated with an application bundle creator identifier. As shown at Block 802, the group-based communication server 110 may be configured to receive the application bundle generation request from the client device 102.

Upon receiving the application bundle generation request from the client device 102, as shown at Blocks 803 and 804, the group-based communication server 110 may transmit an interactive application bundle generation interface to the client device 102 for rendering at a display device associated therewith. As described herein, the interactive application bundle generation interface transmitted to the client device 102 in response to receiving an application bundle generation request may be embodied as a universal template with one or more pre-defined input parameters (i.e. input fields corresponding to various characteristics of an application bundle) configured according to one or more executable instructions defined by the group-based communication server 110. For example, the interactive application bundle generation interface may comprise a plurality of input elements configured to receive user input from the client device 102, the user input corresponding to the configuration of application bundle data to be generated based at least in part on the user input, as described herein. For example, the interactive application bundle generation interface may comprise a plurality of input elements configured to receive user input corresponding to an application bundle identifier (e.g., application bundle title and/or application bundle image) and an application bundle accessibility setting. In various embodiments, the interactive application bundle generation interface may comprise an application menu element comprising a list of applications implemented within the group-based communication system 118. For example, in various embodiments, the application menu element may comprise a list of selectable application identifier elements associated with applications associated with the user identifier associated with the client device 102 (e.g., the applications that have been installed within the group-based communication workspace by the user), a list of selectable application identifier elements associated with applications available to the user for installation within the group-based communication workspace, and/or a list of selectable application identifier elements associated with every application implemented within the group-based communication system 118. Further, the interactive application bundle generation interface may be configured to render a list of a plurality of application identifiers selected by the user from the application menu, each listed application identifier corresponding to an application selected by the user to be included in the bundled plurality of applications associated with the application bundle to be generated. The interactive application bundle generation interface may further comprise a selectable application bundle creation element configured to receive user selection thereof as confirmation of the desire of the user to create an application bundle configured according to the user input displayed at the interactive application bundle generation interface at the time of the user selection.

As shown at Block 805, the interactive application bundle generation interface may be displayed at the client device 102 within the group-based communication interface. Further, as shown at Block 806, the client device 102 may receive application bundle configuration data defined by the user input at the interactive application bundle generation interface. In various embodiments, the application bundle data received by the client device 102 may comprise an application bundle identifier (e.g., application bundle title, an application bundle image, and/or the like), an application bundle accessibility setting, and a plurality of application identifiers selected by the user from a list of applications displayed within an application menu element, each of the plurality of application identifiers corresponding to an application selected by the user to be included in the bundled plurality of applications associated with the application bundle to be generated. In various embodiments, application bundle configuration data may comprise one or more executable instructions configured to facilitate the generation of application bundle data. As described herein, the client device 102 may receive user input at an input element rendered within the interactive application bundle generation interface that embodies a user selection of an application bundle accessibility setting. An application bundle accessibility setting may correspond to data configured to define the extent to which an application bundle defined by the application bundle data comprising the application bundle accessibility setting is available to various users throughout group-based communication system 118. For example, based at least in part on the application bundle accessibility setting, the group-based communication server 110 may generate one or more executable instructions configured to selectively render a selectable application bundle element associated with the application bundle data to application bundle menus displayed within group-based communication interfaces associated with a designated subset of user identifiers.

For example, in various embodiments, a client device 102 may receive user input corresponding to an application bundle accessibility setting of "Public," "Enterprise," "Workspace," "Channel," "Personal," and/or the like. Application bundle data comprising a global application bundle accessibility setting may comprise an executable instruction causing the group-based communication server 110 to present a selectable application bundle element associated with the application bundle identifier to one or more users via a global application bundle menu displayed within the group-based communication interface. A selectable application bundle element associated with an application bundle identifier associated with a global application bundle accessibility setting may be available for user selection by every client device within the group-based communication system (e.g., with the exception of those subject to application prohibitions based on data provided by an associated administrator user).

Application bundle data comprising an enterprise application bundle accessibility setting may comprise an executable instruction causing the group-based communication server 110 to present a selectable application bundle element associated with the application bundle identifier to one or more users via an application bundle menu displayed within a group-based communication interface associated with a designated enterprise identifier. A selectable application bundle element associated with an application bundle identifier associated with an enterprise application bundle accessibility setting may be available for user selection by each client device within the group-based communication system 118 that is associated with a user profile associated with a designated enterprise identifier, wherein the designated enterprise identifier is based at least in part on user input received by the client device 102 at the interactive application bundle generation interface. In various embodiments, upon receiving a user selection of an enterprise application bundle accessibility setting, the group-based communication server 110 may automatically identify the enterprise identifier associated with the client device 102 as the designated enterprise identifier based at least in part on contextual data.

Application bundle data comprising a channel application bundle accessibility setting may comprise an executable instruction causing the group-based communication server 110 to present a selectable application bundle element associated with the application bundle identifier to one or more users via an application bundle menu displayed within a group-based communication channel interface associated with a designated group-based communication channel identifier. A selectable application bundle element associated with an application bundle identifier associated with a channel application bundle accessibility setting may be available for user selection by each client device associated with a user profile having access rights to a designated group-based communication channel, wherein the designated group-based communication channel is based at least in part on user input received by the client device 102 at the interactive application bundle generation interface. In various embodiments, upon receiving a user selection of a channel application bundle accessibility setting, the group-based communication server 110 may automatically identify the group-based communication channel associated with the application bundle generation request as the designated group-based communication channel based at least in part on contextual data.

In various embodiments, application bundle data comprising a personal application bundle accessibility setting may comprise an executable instruction causing the group-based communication server 110 present a selectable application bundle element associated with the application bundle identifier exclusively to the user associated with the client device 102.

As shown at Blocks 807 and 808, the client device 102 may transmit the application bundle configuration data received via the interactive application bundle generation interface to the group-based communication server 110. As described herein, the application bundle configuration data received by the group-based communication server 110 may comprise an application bundle identifier (e.g., application bundle title, an application bundle image, and/or the like), an application bundle accessibility setting, and a plurality of application identifiers selected by the user from a list of applications displayed within an application menu element, each of the plurality of application identifiers corresponding to an application selected by the user to be included in the bundled plurality of applications associated with the application bundle to be generated.

Upon receiving the application bundle configuration data from the client device 102, the group-based communication server 110 may generate application bundle data comprising an application bundle identifier, at least one executable instruction, a plurality of application identifiers, and a selectable application bundle element, as shown at Block 809. In various embodiments, the application data generated by the group-based communication server 110 may be configured based at least in part on the application bundle configuration data received from the client device 102. For example, in various embodiments, the application bundle data may comprise an application bundle creator identifier associated with the user identifier associated with the client device 102 from which the group-based communication server 110 received the application bundle generation request. Further, the application bundle data may comprise one or more application bundle identifiers, an application bundle accessibility setting, as described herein, and each of the plurality of application identifiers selected by the application bundle creator user at the interactive application bundle generation interface.

As described herein in further detail, the at least one executable instruction of the application bundle data may cause the group-based communication server 110 to initialize and/or carry out an installation process within a group-based communication workspace for each of the plurality of applications. Further, in various embodiments the application bundle data may further comprise application data associated respectively with each application of the plurality of application identifiers included within the application bundle data. Alternatively, in various embodiments, application bundle data may comprise workflow data defining the functionality of a workflow associated therewith, the workflow being configured to install each of a plurality of applications associated with the application bundle identifier within a group-based communication workspace. In such an exemplary circumstance, the at least one executable instruction of the application bundle data may be configured to facilitate the execution of one or more steps required to install each of the plurality of applications associated with the application bundle identifier within a group-based communication workspace. As shown in Block 810, the group-based communication server 110 may transmit the application bundle data to the group-based communication repository 120 for storage.

As shown at Block 811, the client device 102 may receive a user selection of an application bundle menu element at a group-based communication interface, the application bundle menu element being associated with an application bundle menu. In various embodiments, the selection of the application bundle menu element (e.g., a selectable button) may represent a user request to provide an application bundle menu within the group-based communication interface. For example, an application bundle menu may comprise a list of selectable application bundle identifier elements, each selectable application bundle identifier elements being associated with an application bundle implemented within the group-based communication system 118, as described herein. The user selection of the application bundle menu element may be received at the client device 102 and transmitted to the group-based communication server 110, as shown at Blocks 812 and 813. In various embodiments, the user selection of the application bundle menu element may be associated with a user identifier associated with the client device 102 and one or more of an enterprise identifier associated with the user identifier, a group-based communication workspace identifier associated with the group-based communication workspace in which the application bundle menu element was selected, and a group-based communication channel identifier associated with the group-based communication channel in which the application bundle menu element was selected.

As shown at Block 814, upon receiving the user selection of an application menu bundle element, the group-based communication server 110 may parse various application bundle data to identify one or more application bundles available to the user associated with the user identifier associated with the client device 102 for installation within a group-based communication workspace and/or group-based communication channel. In various embodiments, parsing various application data to identify one or more application bundles available to the user for installation may comprise identifying the application bundle accessibility setting defined within the application bundle data of each of the application bundles of the group-based communication system 118. For example, wherein the user selection of the application menu element received by the group-based communication server 110 is associated with a user identifier, the group-based communication server 110 may identify as available for presentation within an application bundle menu each application bundle identifier associated with a public application bundle accessibility setting, and a personal application bundle accessibility setting, wherein the user identifier associated with the selection of the application bundle menu element is the creator user identifier as defined by the application bundle data.

In various embodiments, wherein the user selection of the application menu element received by the group-based communication server 110 is associated with a user identifier associated with an enterprise identifier, the group-based communication server 110 may identify as available for presentation within an application bundle menu each application bundle identifier associated with 1) a public application bundle accessibility setting, 2) a personal application bundle accessibility setting, wherein the user identifier associated with the selection of the application bundle menu element is the creator user identifier and 3) an enterprise application bundle accessibility setting, wherein the enterprise identifier associated with the user identifier is the designated enterprise identifier as defined by the application bundle data.

Additionally, in various embodiments wherein the user selection of the application menu element received by the group-based communication server 110 is associated with a group-based communication workspace identifier, the group-based communication server 110 may identify as available for presentation within an application bundle menu at least each application bundle identifier associated with a workspace application bundle accessibility setting, wherein the group-based communication workspace identifier associated with the selection of the application bundle menu element is the designated group-based communication workspace identifier as defined by the application bundle data.

Additionally, in various embodiments wherein the user selection of the application menu element received by the group-based communication server 110 is associated with a group-based communication channel identifier, the group-based communication server 110 may identify as available for presentation within an application bundle menu at least each application bundle identifier associated with a channel application bundle accessibility setting, wherein the group-based communication channel identifier associated with the selection of the application bundle menu element is the designated group-based communication channel identifier as defined by the application bundle data.

In various embodiments, the group-based communication server 110 may identify an application bundle as being available for installation based at least in part on determining whether each of the plurality of applications associated with the application bundle identifier has been authorized for installation by each of the one or more administrative users associated with the group-based communication workspace and/or group-based communication channel associated with the user selection of the application menu element received by the group-based communication server 110. For example, as described herein in further detail in reference to Block 504 of FIG. 5A, the group-based communication server 110 may parse an available application table associated with the enterprise identifier, the group-based communication workspace and/or the group-based communication channel to identify one or more application identifiers associated with a prohibited application indicator. In various embodiments wherein an application identifier associated with an application bundle identifier is associated with a prohibited application indicator, the group-based communication server 110 may determine that the application bundle associated with the application bundle identifier associated with the application identifier is not available for installation.

As shown at Block 815, upon identifying each of the application bundle identifiers associated with an application bundle that is determined to be available to a user for installation, the group-based communication server 110 may generate an application bundle menu comprising an available application bundle list of one or more selectable application bundle elements, each selectable application bundle element being associated with a respective application bundle identifier associated with an available application bundle. For example, the one or more selectable application bundle elements rendered within the available application bundle list (e.g., within the application bundle menu) may correspond to at least a portion of the application bundle identifiers identified by the group-based communication server 110 as being available to a user for installation, as described in further detail herein. For example, in the exemplary embodiment illustrated in FIG. 8A, the group-based communication server 110 may determine that user selection of the application bundle menu element was received from the client device 102 associated with the creator user identifier of the application bundle data associated with the application bundle generated by the user associated with the client device 102 as described herein in reference to Blocks 801-810. Accordingly, the group-based communication server 110 may be configured to include the selectable application bundle element associated with the application bundle identifier associated with the creator user identifier within the available application bundle list displayed within the application bundle menu.

Further, in various embodiments, the group-based communication server may be configured to include within the available application bundle menu one or more selectable application bundle elements associated with a recommended application bundle identifier. For example, the group-based communication server 110 may generate relevance scores for each of a plurality of application bundle identifiers identified by the group-based communication server 110 as being available to a user based at least in part on historical data associated with a user identifier associated with the client device 102 and/or environmental contextual data generated for the client device 102. In various embodiments, the group-based communication server 110 may utilize one or more models and/or algorithms generated via machine learning and/or artificial intelligence based at least in part on training data to determine (and/or generate) one or more recommended application bundles (e.g., selectable application bundle elements) for presentation to the user. The training data in certain embodiments comprises sets of training data, wherein each set of training data comprises environmental contextual data (e.g., active workspace and/or channel identifiers; prior workspace and/or channel identifiers (and their respective order of presentation to the user); active group identifiers; time stamps; and/or the like) presented when an application bundle menu element was selected, and the application bundle identifier associated with the selectable application bundle element ultimately selected by the user. Training data may be group-specific (or other subset of user-specific) and may be utilized to generate models and/or algorithms specific to a particular group. Moreover, the training data as well as the resulting models and/or algorithms may be stored in a memory storage area accessible to the group-based communication server 110, such that the group-based communication server may quickly access and apply the stored models and/or algorithms based on the environmental contextual data retrieved for either the at least partial search query or the particular requested application bundle identifier.

As shown at Blocks 816 and 817, the group-based communication server may transmit the generated available application bundle list for rendering within the application bundle menu to the client device 102, which may be configured to receive the list. Upon receiving the available application bundle list comprising one or more selectable application bundle elements, as shown at Block 818 of FIG. 8B, the client device 102 may be further configured to display the available application bundle list within the application bundle menu at the group-based communication interface. As described herein, the client device 102 may be configured to receive a user selection of a selectable application bundle element via the application bundle menu rendered within the group-based communication interface at the client device 102.

As shown at Block 819, the client device 108 may receive a user selection of an application bundle menu element at a group-based communication interface associated with the client device 108, the client device 108 being associated with a user identifier that is not associated with the user identifier associated with client device 102. As described herein in further detail in reference to Block 811, the selection of the application bundle menu element may represent a user request to provide an application bundle menu within the group-based communication interface. The user selection of the application bundle menu element may be received at the client device 108 and transmitted to the group-based communication server 110, as shown at Blocks 820 and 821. In various embodiments, the user selection of the application bundle menu element may be associated with a user identifier associated with the client device 108 and one or more of an enterprise identifier associated with the user identifier, a group-based communication workspace identifier associated with the group-based communication workspace in which the application bundle menu element was selected, and a group-based communication channel identifier associated with the group-based communication channel in which the application bundle menu element was selected.

At Block 822, upon receiving the selection of the application bundle menu element from the client device 108, the group-based communication server may be configured to may parse various application bundle data to identify one or more application bundles available to the user associated with the user identifier associated with the client device 108 for installation within a group-based communication workspace and/or group-based communication channel, as described herein in further detail in reference to Block 814. For example, in the exemplary embodiment illustrated in FIGS. 8A-8B, the group-based communication server 110 may parse the application bundle data associated with the application bundle generated by the client device 102, as described herein in reference to Blocks 801-810. The group-based communication server 110 may determine that the application bundle data associated with the application bundle generated by the client device 102 comprises a public application bundle accessibility setting. Accordingly, in an exemplary embodiment wherein the client device 108 is associated with a group-based communication workspace that is not associate with any prohibited application indicators, the group-based communication server 110 may be configured to determine that the application bundle generated by the client device 102 may be available to the client device 108 for installation within the group-based communication workspace associated therewith.

As shown at Block 823, upon identifying each of the application bundle identifiers associated with an application bundle determined to be available to a user for installation, the group-based communication server 110 may generate an application bundle menu comprising an available application bundle list of one or more selectable application bundle elements, each selectable application bundle element being associated with a respective application bundle identifier associated with an available application bundle. In various embodiments, the one or more selectable application bundle elements rendered within the available application bundle list (e.g., within the application bundle menu) may correspond to at least a portion of the application bundle identifiers identified by the group-based communication server 110 as being available to a user for installation, as described in further detail herein. For example, continuing the description of the exemplary embodiment described above in reference to Blocks 801-810 and 822, wherein the application bundle generated by the client device 102 is determined by the group-based communication server 110 to be available to the client device 108 for installation within the group-based communication workspace associated therewith, the group-based communication server 110 may be configured to include the selectable application bundle element defined by the application bundle data corresponding to the application bundle generated by the client device 102 within the available application bundle list.

As shown at Blocks 824 and 825, the group-based communication server 110 may transmit the generated available application bundle list for rendering within the application bundle menu to the client device 108, which may be configured to receive the list. Upon receiving the available application bundle list comprising one or more selectable application bundle elements, as shown at Block 826, the client device 108 may be further configured to display the available application bundle list within the application bundle menu at the group-based communication interface. As described herein, the client device 108 may be configured to receive a user selection of a selectable application bundle element (e.g., the selectable application bundle element defined by the application bundle data corresponding to the application bundle generated by the client device 102) via the application bundle menu rendered within the group-based communication interface at the client device 108.

Figure 9:
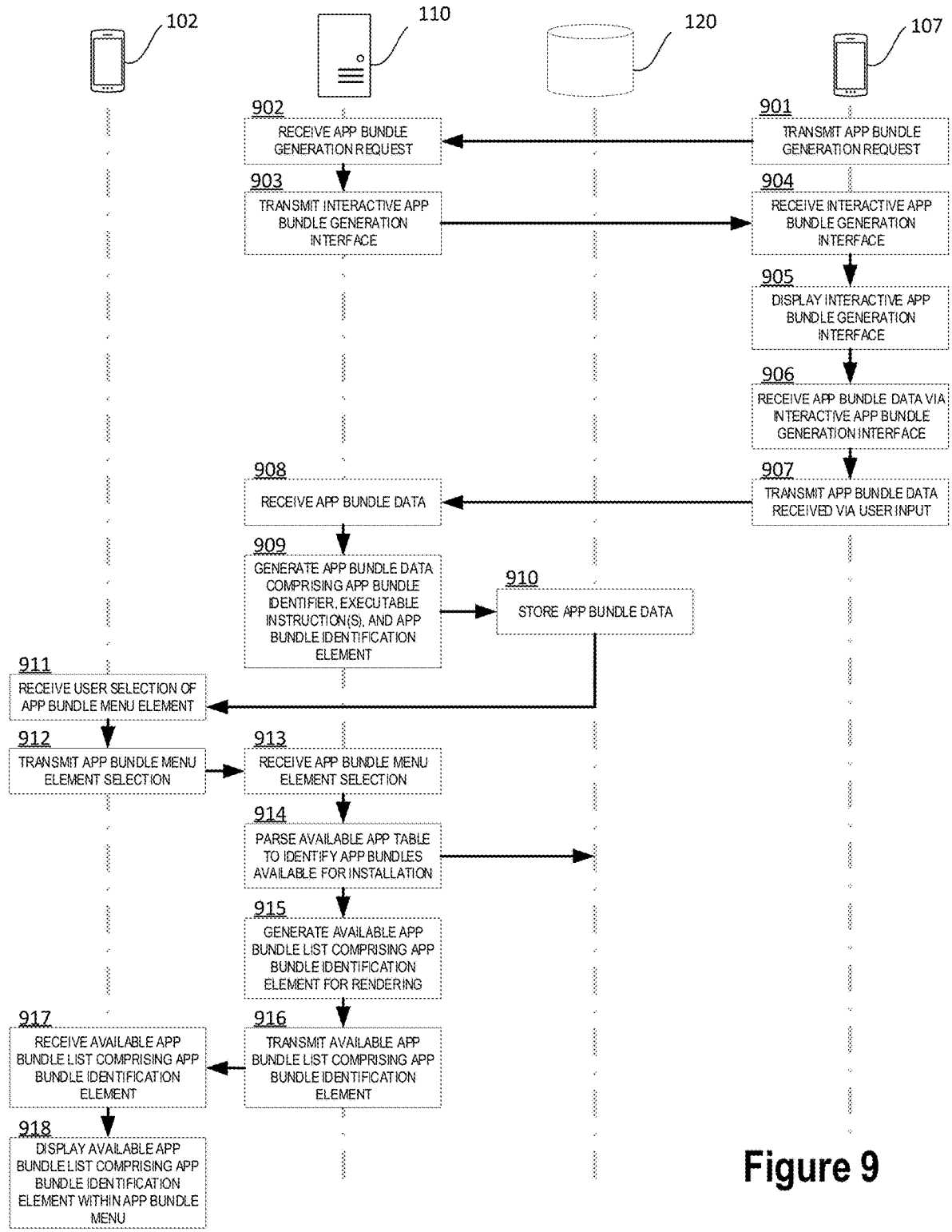
FIG. 9 illustrates a lane diagram showing functionality of various components in accordance with various embodiments.

FIG. 9 illustrates a lane diagram showing functionality of various components associated with exemplary application bundle data in accordance with various embodiments. In particular, FIG. 9 illustrates various exemplary operations associated with systems and methods for generating a bundled plurality of applications within a group-based communication workspace and displaying data corresponding to the bundled plurality of applications within a group-based communication interface.

In various embodiments, in response to receiving a selection of a selectable application bundle generation element at a group-based communication interface displayed on the client device, a client device 107 may transmit an application bundle generation request to a group-based communication server 110, as shown at Block 901 of FIG. 9. In reference to the exemplary operations illustrated in FIG. 9, client device 107 may comprise a developer client device, wherein the client device 107 is associated with a developer user identifier associated with a developer enterprise identifier associated with a plurality of applications implemented within the group-based communication system 118. In various embodiments, the application bundle generation request may comprise a collection of data associated with a developer user identifier and the plurality of application identifier associated therewith that is transmitted by a client device 107 associated with the user identifier to the group-based communication server 110 as a result of the user associated with the user identifier indicating a desire to generate an application bundle within a group-based communication system 118. For example, an application bundle generation request may be associated with the developer user identifier, the client device 107, and/or the developer enterprise identifier associated therewith. In various embodiments, the developer user identifier and/or the developer enterprise identifier associated with the application bundle generation request may be associated with an application bundle creator identifier. As shown at Block 902, the group-based communication server 110 may be configured to receive the application bundle generation request from the developer client device 107.

Upon receiving the application bundle generation request from the developer client device 107, as shown at Blocks 903 and 904, the group-based communication server 110 may transmit an interactive application bundle generation interface to the developer client device 107 for rendering at a display device associated therewith. The interactive application bundle generation interface may be configured according to various exemplary embodiments described herein in reference to Blocks 803 and 804 of FIG. 8A, as well as FIG. 12. In various embodiments, the group-based communication server 110 may detect the developer enterprise identifier associated with the developer client device 107 from which the application bundle generation request was received. In such a circumstance, the group-based communication server 110 may configure the application menu rendered within the interactive application bundle generation interface displayed at the developer client device 107 such that the application menu comprises a list of selectable application identifier elements associated with applications associated with the developer enterprise identifier associated with the client device 107. Accordingly, in various embodiments wherein the application bundle generation request is associated with a developer enterprise identifier, the plurality of application identifiers presented to the developer user (e.g., via the application menu of the interactive application bundle generation interface displayed at the developer client device 107) as being available for inclusion in an application bundle to be generated may comprise exclusively of application identifiers associated with the developer enterprise identifier.

In various embodiments, the operations illustrated by Blocks 905-910 comprise substantially the same steps as described herein in reference to Blocks 805-810 of FIG. 8A. The interactive application bundle generation interface may be displayed at the developer client device 109 within the group-based communication interface. The developer client device 107 may receive application bundle configuration data defined by developer user input received by the developer client device 107 at the interactive application bundle generation interface. The developer client device 107 may transmit the application bundle configuration data received via the interactive application bundle generation interface to the group-based communication server 110. As described herein, the application bundle configuration data received by the group-based communication server 110 may comprise an application bundle identifier (e.g., application bundle title, an application bundle image, and/or the like), an application bundle accessibility setting, and a plurality of application identifiers selected by the developer user from a list of applications displayed within an application menu, each of the plurality of application identifiers corresponding to an application associated with the developer enterprise identifier associated with the client device 107 that was selected by the developer user to be included in the bundled plurality of applications associated with the application bundle to be generated. Upon receiving the application bundle configuration data from the developer client device 107, the group-based communication server 110 may generate application bundle data comprising an application bundle identifier, at least one executable instruction, a plurality of application identifiers, and a selectable application bundle element. In various embodiments, the application bundle data may be associated with the developer enterprise identifier. Further, the group-based communication server 110 may transmit the application bundle data to the group-based communication repository 120 for storage.

As shown at Block 911, a client device 102 may receive a user selection of an application bundle menu element at a group-based communication interface, the application bundle menu element being associated with an application bundle menu. For example, the client device 102 may be associated with a user identifier associated with an enterprise identifier and a group-based communication workspace identifier. As described herein, the selection of the application bundle menu element rendered within a group-based communication interface may represent a user request to provide an application bundle menu within the group-based communication interface. The user selection of the application bundle menu element may be received at the client device 102 and transmitted to the group-based communication server 110, as shown at Blocks 912 and 913. Upon receiving the user selection of an application menu bundle element, as shown at Block 914, the group-based communication server 110 may parse various application bundle data to identify one or more application bundles available to the user associated with the user identifier associated with the client device 102 for installation within a group-based communication workspace and/or group-based communication channel. As described herein, parsing various application bundle data to identify one or more application bundles available to the user associated with the user identifier associated with the client device 102 for installation may comprise identifying the application bundle accessibility setting defined within the application bundle data of each of the application bundles of the group-based communication system 118.

Further, in various embodiments, the group-based communication server 110 may identify an application bundle as being available for installation based at least in part on determining whether each of the plurality of applications associated with the application bundle identifier has been authorized for installation by each of the one or more administrative users associated with the group-based communication workspace and/or group-based communication channel associated with the user selection of the application menu element received by the group-based communication server 110. For example, in the exemplary embodiment described herein wherein the client device 102 is associated with enterprise identifier and a group-based communication workspace identifier, the group-based communication server 110 may parse an available application table associated with the enterprise identifier and the group-based communication workspace to identify one or more application identifiers associated with a prohibited application indicator, as described herein in further detail in reference to Block 504 of FIG. 5A. In various embodiments wherein an application identifier associated with an application bundle identifier is associated with a prohibited application indicator, the group-based communication server 110 may determine that the application bundle associated with the application bundle identifier associated with the application identifier is not available to the user associated with the client device 102 for installation within the group-based communication workspace. For example, in the exemplary embodiment illustrated in FIG. 9, the group-based communication server 110 may parse the application bundle data associated with the application bundle generated by the developer client device 107, as described herein in reference to Blocks 901-910. The group-based communication server 110 may determine that the application bundle data associated with the application bundle generated by the developer client device 107 comprises an enterprise application bundle accessibility setting, wherein the designated enterprise identifier, as described herein, is the enterprise identifier associated with the user identifier associated with the client device 102. Accordingly, in an exemplary embodiment wherein the workspace administrator user associated with the group-based communication workspace associated with the client device 102 has not provided administrator user input associating any of the applications associated with the application bundle identifier as a prohibited application, the group-based communication server 110 may be configured to determine that the application bundle generated by the developer client device 107 may be available to the client device 102 for installation within the group-based communication workspace associated with the enterprise identifier.

As shown at Block 915, upon identifying each of the application bundle identifiers associated with an application bundle determined to be available to a user for installation, the group-based communication server 110 may generate an application bundle menu comprising an available application bundle list of one or more selectable application bundle elements, each selectable application bundle element being associated with a respective application bundle identifier associated with an available application bundle. In various embodiments, the one or more selectable application bundle elements rendered within the available application bundle list (e.g., within the application bundle menu) may correspond to at least a portion of the application bundle identifiers identified by the group-based communication server 110 as being available to a user for installation within the group-based communication workspace, as described in further detail herein. For example, continuing the description of the exemplary embodiment described above in reference to Blocks 901-910 and 914, wherein the application bundle generated by the developer client device 107 is determined by the group-based communication server 110 to be available to the client device 102 for installation within the group-based communication workspace associated therewith, the group-based communication server 110 may be configured to include the selectable application bundle element defined by the application bundle data corresponding to the application bundle generated by the developer client device 107 within the available application bundle list.

As shown at Blocks 916 and 917, the group-based communication server 110 may transmit the generated available application bundle list for rendering within the application bundle menu to the client device 102, which may be configured to receive the list. Upon receiving the available application bundle list comprising one or more selectable application bundle elements, as shown at Block 918, the client device 102 may be further configured to display the available application bundle list within the application bundle menu at the group-based communication interface. As described herein, the client device 102 may be configured to receive a user selection of a selectable application bundle element (e.g., the selectable application bundle element defined by the application bundle data corresponding to the application bundle generated by the developer client device 107) via the application bundle menu rendered within the group-based communication interface at the client device 102.

D. Authenticating User Credentials Associated with Applications Associated with Application Bundle As noted above, systems and methods for authenticating user credentials associated with at least one application associated with a bundled plurality of applications to be collectively installed in a group-based communication workspace enabling communications between client devices via a group-based communication system according to various embodiments are discussed herein.

Figure 10A:
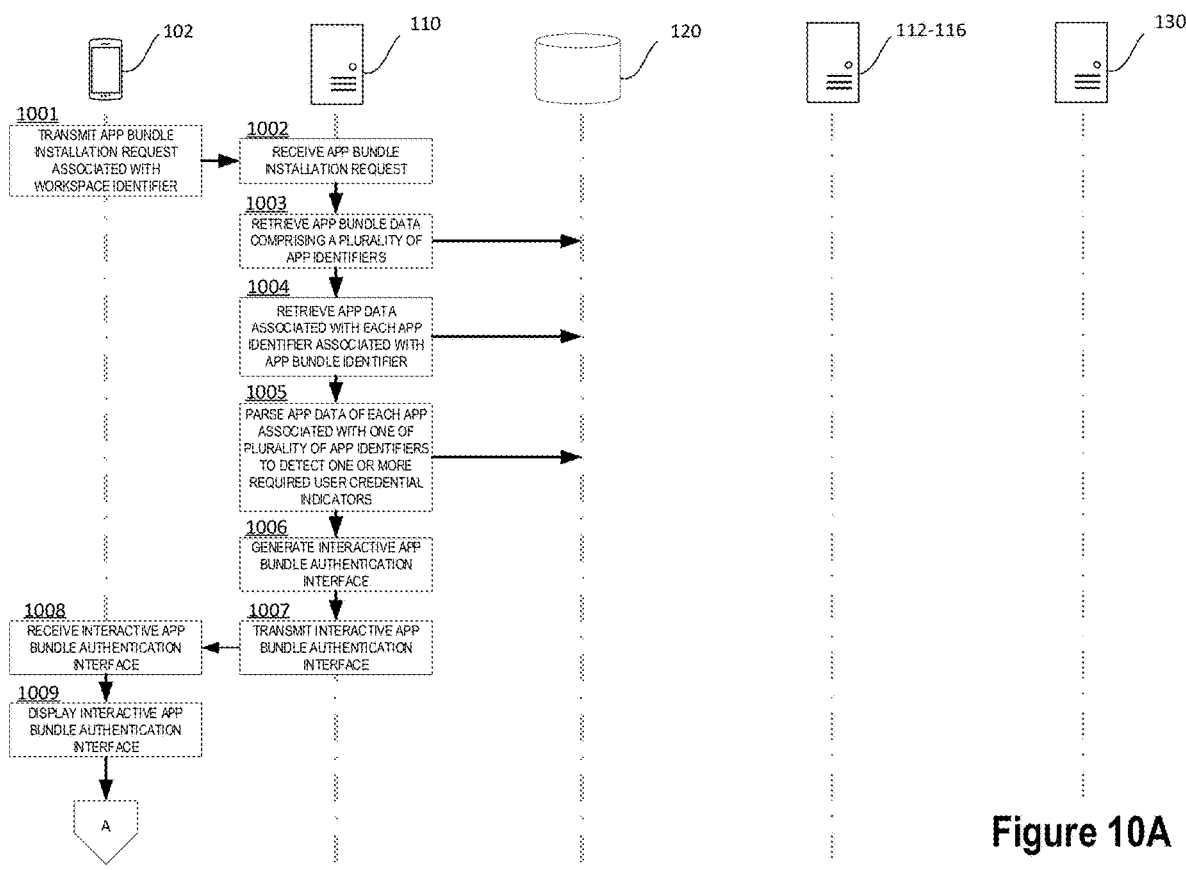
FIGS. 10A-10C illustrate lane diagrams showing functionality of various components in accordance with various embodiments.
Figure 10B:
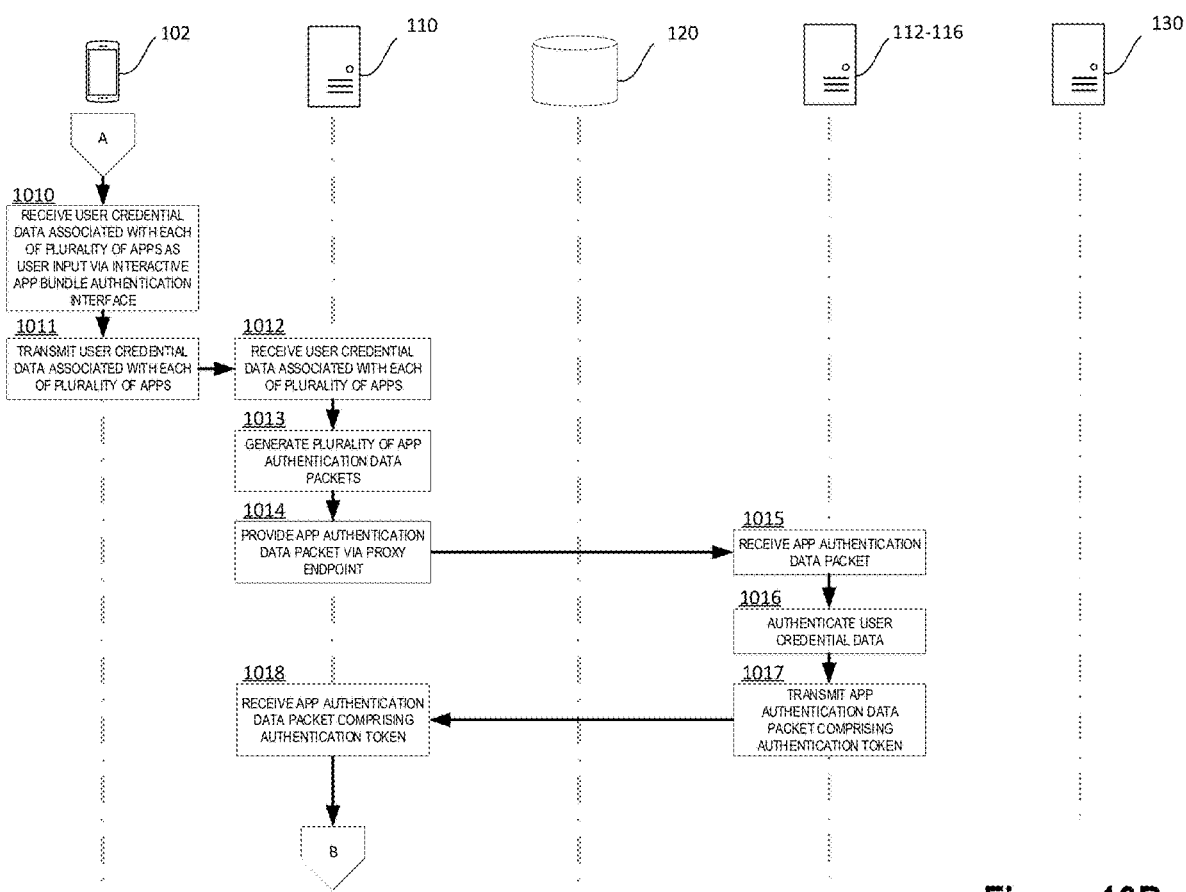
Figure 10C:
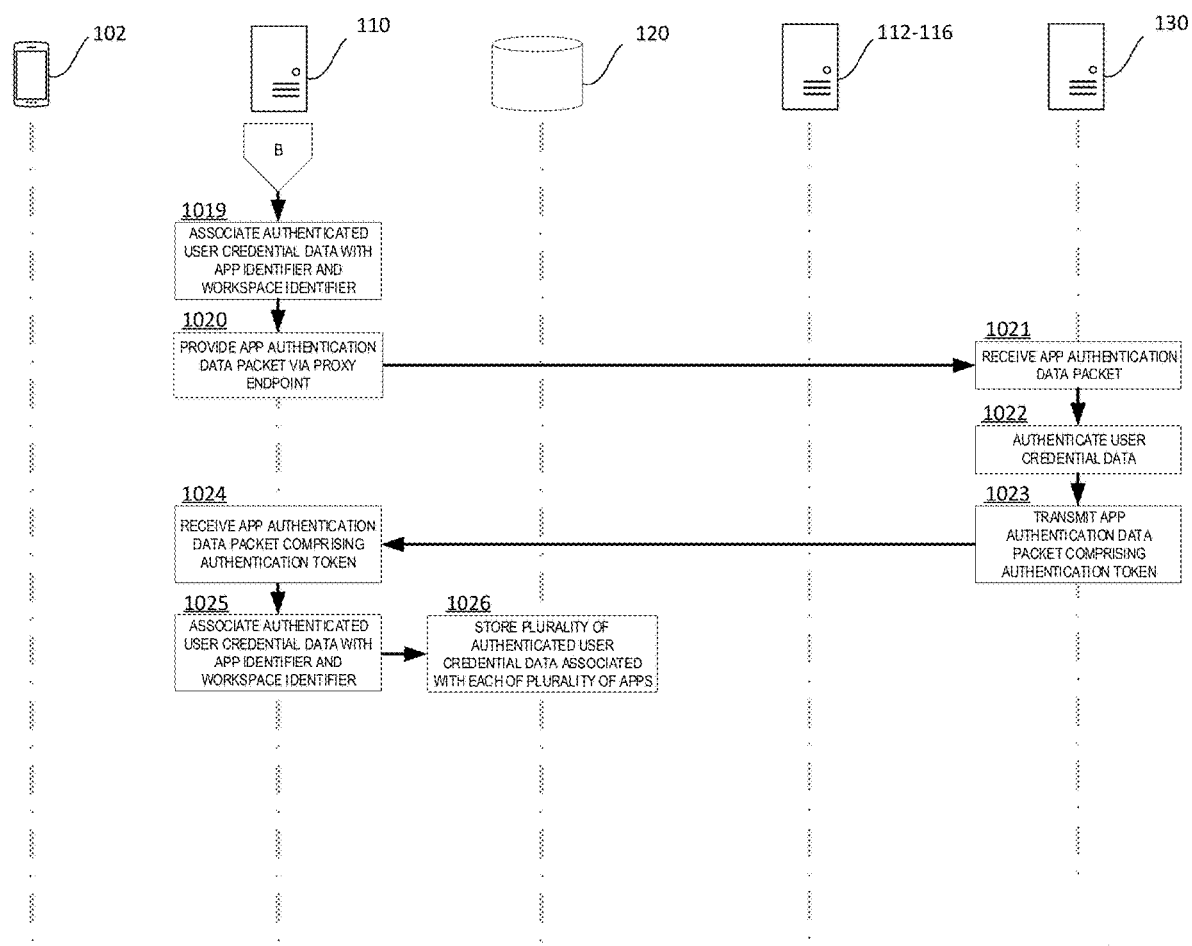

FIGS. 10A-10C illustrate lane diagrams showing functionality of various components associated with exemplary application bundle data in accordance with various embodiments. In particular, FIGS. 10A-10C illustrate various exemplary operations associated with systems and methods for authenticating user credential data associated with a user profile and at least one application of a bundled plurality of applications within a group-based communication system.

In various embodiments, in response to receiving a selection of a selectable application bundle element associated with the application bundle identifier at a group-based communication interface displayed on the client device, a client device 102 may transmit an application bundle installation request, as described herein, associated with an application bundle identifier and a group-based communication workspace to a group-based communication server 110, as shown at Block 1001A of FIG. 10A. As shown at Block 1002A, the group-based communication server 110 may be configured to receive the application bundle installation request from the client device 102.

Upon receipt of the application bundle installation request, the process proceeds to Block 1003, at which the group-based communication server 110 may retrieve, from a group-based communication repository 120, the application bundle data comprising the application bundle identifier associated with application bundle installation request. As described herein, the application bundle data may comprise a plurality of application identifiers respectively associated with the plurality of applications associated with the application bundle identifier and at least one executable instruction. In various embodiments, the at least one executable instruction of the application bundle data may cause the group-based communication server to initialize the installation process within a group-based communication workspace for each of the plurality of applications. For example, as described herein, the application bundle data retrieved from the group-based communication repository 120 may correspond to an application bundle which, itself, may be embodied as an application within the group-based communication system 118 that, upon execution, based at least in part on the application bundle data associated therewith (e.g., the plurality of application identifiers, the at least one executable instruction, and/or the like), causes the group-based communication server 110 to retrieve the application data associated respectively with each of the plurality of application identifiers. Further, in various embodiments, the application bundle data may comprise various application data associated respectively with each application of the plurality of applications associated with the application bundle identifier. In such an exemplary circumstance, the at least one executable instruction of the application bundle data is configured to initialize the installation process within a group-based communication workspace for each of the plurality of applications based at least in part on the various application data—and the respective installation instructions included therein—included in the application bundle data. Alternatively, the application bundle data may comprise application bundle installation workflow data, the application bundle installation workflow data defining the functionality of an application bundle installation workflow associated therewith. In various embodiments, the application bundle installation workflow may comprise a workflow of the group-based communication system 118 configured to cause the group-based communication server 110 to install each of a plurality of applications associated with the application bundle identifier within a group-based communication workspace. For example, the application bundle may be embodied as an executable workflow defined by the application bundle data, which may comprise application bundle installation workflow data comprising at least one executable instruction configured to facilitate the execution of one or more steps required to install each of the plurality of applications associated with the application bundle identifier within a group-based communication workspace.

As shown at Block 1004, in various embodiments, the at least one executable instruction of the application bundle data may cause the group-based communication server 110 to retrieve the application data associated respectively with each of the plurality of application identifiers from a group-based communication repository 120, as shown at Block 1004. Upon retrieving the application data associated with each application identifier associated with the application bundle identifier, the group-based communication server 110, as shown at Block 1005, may parse the various application data associated each of the application identifiers associated with the application bundle identifier to detect one or more application identifiers of the plurality of application identifiers associated with the application bundle associated with a required user credential indicator.

In various embodiments, based at least in part on the configuration of the application data associated with an application as defined by a developer user associated therewith, the group-based communication server 110 may be configured to associate a required user credential indicator with the application. In various embodiments, a required user credential indicator may comprise one or more items of data associated with an application identifier that indicate that the application associated therewith requires user credential data associated with the application in order to enable one or more functionalities of the application within the group-based communication system 118. For example, a required user credential indicator may be a data structure comprising a flag, or a record of a data structure whereby a logic "1" indicates that the application associated therewith requires user credential data associated with the application in order to enable one or more functionalities of the application within the group-based communication system 118 and a logic "0" indicates that the every functionality of the application associated therewith may be enabled within the group-based communication system user credential data associated with the application.

Upon detecting one or more applications of the plurality of applications associated with the application bundle identifier associated with a required user credential indicator, the group-based communication server 110 may generate an interactive application bundle authentication interface, as shown at Block 1006. As described in further detail herein in reference to FIG. 13, the interactive application bundle authentication interface may comprise one or more input parameters (i.e. input fields corresponding to various required user credentials associated with one or more applications) configured according to one or more executable instructions defined at least in part by the application bundle data associated with the application bundle identifier. In various embodiments, the interactive application bundle authentication interface may render each of the application identifiers associated with the application bundle identifier that are determined by the group-based communication server 110 to be associated with a required user credential indicator. Further, the interactive application bundle authentication interface may render a plurality of interactive dialogues corresponding to each of the plurality of application identifiers, each interactive dialogue being configured to receive user input comprising user credential data. The interactive application bundle authentication interface may further comprise a selectable application bundle authentication element configured to receive user selection thereof as confirmation of the desire of the user to transmit the user credential data input at the interactive application bundle authentication interface to each of the respective applications associated with the application identifiers rendered within the interactive application bundle authentication interface at the time of the user selection.

In various embodiments, as described herein, the interactive application bundle authentication interface may be embodied as a single-page interface generated by the group-based communication server 110, wherein the application identifiers and corresponding interactive dialogues associated with each of the plurality of applications associated with a required user credential indicator are simultaneously rendered within a single interface page such that a user may provide user credential data associated with each of the applications prior to selecting the selectable application bundle authentication element. Alternatively, in various embodiments, the interactive application bundle authentication interface may be embodied as a multi-page interface comprising at least one application program interface (API) associated with each of the plurality of applications associated with a required user credential indicator, each of the plurality of APIs being defined by the application data and retrievable based at least in part on an executable instruction associated with the application bundle data. For example, each API of the plurality of APIs may comprise an application identifier associated with the application and one or more interactive dialogues configured to receive user input corresponding to the required user credential data. In various embodiments, the plurality of APIs may be configured so as to be sequentially rendered within the group-based communication interface, such that, for example, the group-based communication server 110 may render a second API upon determining that the required user credential data associated with a first application associated with a first API has been provided by the user at the first API.

Upon generating the interactive application bundle authentication interface, as shown at Blocks 1007 and 1008, the group-based communication server 110 may transmit the interactive application bundle authentication interface to the developer client device 102 associated with the application bundle installation request for rendering at a display device associated therewith. As shown at Block 1009, the interactive application bundle authentication interface may be displayed at the client device 102 within the group-based communication interface.

As shown at Block 1010 of FIG. 10B, the client device 102 may receive user credential data associated with each of the applications associated with both the application bundle identifier and a required user credential indicator, the user credential data being defined by the user input at the interactive application bundle authentication interface. In various embodiments, the user credential data received by the client device 102 may comprise user information, such as, for example, a username and a user password, associated with an application associated with one of the plurality of application identifiers rendered within the interactive application bundle authentication interface.

As shown at Blocks 1011 and 1012, the client device 102 may transmit the user credential data received via the interactive application bundle authentication interface to the group-based communication server 110. As described herein, the user credential data received by the group-based communication server 110 may be associated with a user identifier associated with the client device 102, a user profile associated with the user identifier, and a group-based communication workspace identifier. In various embodiments, each of the interactive dialogs rendered within the interactive application bundle authentication interface may be associated with an application identifier such that user credential data generated in response to the user input at an interactive dialog may be further associated with the application associated with the interactive dialog.

Upon receiving the user credential data associated with each of the plurality of applications associated with the application bundle identifier and a required user credential indicator, the group-based communication server 110 may generate a plurality of application authentication data packets, each comprising application authentication routing data and payload data associated with the corresponding application, as indicated at Block 1013. In various embodiments, an application authentication data packet may comprise an application user authentication request, comprising a collection of data associated with an application and a user identifier transmitted by a group-based communication server to an application providing instructions requesting that user credential data provided by a user be authenticated by the application, such that the user profile associated with the user credential data is verified by the application as being associated with the application.

As described herein, application authentication routing data may comprise data identifying data usable by the corresponding application 112-116 to identify the client device requesting the processing action. In various embodiments, the group-based communication server 110 may configure each of the application authentication data packets in accordance with one or more formatting and/or content requirements of the application 112-116 corresponding thereto, as indicated in the application data associated with each application 112-116. For example, in various embodiments, the group-based communication server 110 may assemble application authentication for the application authentication data packet to comprise (1) one or more verification tokens (e.g., a group-based communication server 110 verification token), (2) a group-identifier (e.g., group-based communication workspace identifier), (3) a group-based communication channel identifier, (4) a user identifier (e.g., a client device 102 specific client token identifying the client device 102-106 that provides the user credential data), (5) an enterprise identifier, (6) a response URL enabling the application 112-116 to transmit a response (e.g., a confirmation response) back to the requesting client device 102, (7) a timestamp indicating when the application authentication is requested, (8) an application identifier associated with the corresponding application, and/or the like. In various embodiments, the payload data may comprise the user credential data generated in response to the user input received by the client device 102 at the interactive application bundle authentication interface. Specifically, with respect to the exemplary process shown at Block 1013, the processing action routing data comprises (1) an application authentication request associated with an application identifier associated with the application 112-116 and (2) a client token identifying the client device 102 that generated the application bundle installation request (i.e. the client device that received the user input defining the user credential data associated with the application).

Upon generation of the one or more application authentication data packets corresponding respectively to each of the applications associated with application identifiers associated with both the application bundle identifier and a required user credential indicator, the group-based communication server 110 provides each of the data packets via respective proxy endpoints to each of the corresponding applications 112-116 identified with the various routing data as shown at Blocks 1014 and 1015. In various embodiments a proxy endpoint may provide an API for passing the application authentication data packet from the group-based communication server 110 to an application 112-116, thereby enabling the application 112-116 to consume the routing data and/or the payload data within the data packet authenticating the user credential data provided within the data packet. The data included within the application authentication data packet is passed to the application 112-116, for example, using the API to provide the data to the application 112-116 in the appropriate format to execute the requested action.

Providing the application authentication data packet to an application 112-116 causes the application 112-116 to execute an authentication process based at least in part on the payload data (e.g., the user credential data), as shown at Block 1016. In various embodiments, an application server associated with an application 112-116 may authenticate the user account credentials (e.g., a username and a user password) associated with the application by querying a database for a user account matching the user authentication credentials provided. Further, in this example embodiment, the application server may identify an authenticated user account matching these authentication credentials. Upon identifying an authenticated user account that matches the authentication credentials defined by the user credential data associated with the application, the application server may generate an authentication token associated with the user credential data and the user identifier. The application server may then transmit a response that includes an authentication confirmation signal and/or an authentication token associated with the application 112-116, as shown at Blocks 1017 and 1018. In various embodiments. The group-based communication system 118 may utilize an authentication token to authenticate the identity of a user associated with the user profile and grant to the user permissions in the group-based communication system with respect to the one or more applications. For example, an authentication token may include information specifying the permissions associated with a user profile and a particular application. As described herein in reference to Block 1014, the group-based communication server 110 may be configured to transmit one or more application authentication data packets, respectively, to one or more applications 112-116. Similarly, upon execution of an authentication process based on the user credential data provided within the application authentication data packet, the group-based communication server 110 may be configured to receive one or more application authentication data packets from each of the one or more applications 112-116 to which an application authentication data packet was transmitted.

Upon receiving an application authentication data packet comprising an authentication token from an application 112-116 to which an application authentication data packet comprising user credential data was transmitted, as shown at Block 1019 of FIG. 10C, the group-based communication server 110 may generate an authenticated application indicator associated with an application identifier and a user identifier associated with a group-based communication workspace. An authenticated application indicator may comprise one or more items of data associated with an application identifier and a user profile that indicate that one or more user credentials provided by a user associated with the user profile have been authenticated by an application associated therewith. In various embodiments, the group-based communication server 110 may associate the authenticated application indicator with the application identifier associated with the application 112-116 and the user identifier (e.g., the user identifier associated with the client token included in the application authentication data packet) based at least in part on the authentication token received from the application 112-116. Further, in various embodiments, the group-based communication server 110 may associate the authenticated application indicator and the user credential data associated with the authentication data with the application identifier associated with the application 112-116 and the user profile associated with the user identifier associated with the group-based communication workspace.

In various embodiments, one or more of the application authentication data packets generated by the group-based communication server 110, as described herein in reference to Block 1014 of FIG. 10B, may be provided by the group-based communication server 110 to a third party security credential resource 130 via a proxy endpoint, the third party security credential resource 130 having managerial access to user account credential data associated with an application 112-116 of the plurality of applications associated with the application bundle identifier, as shown at Blocks 1020 and 1021.

As described herein, a third party security credential resource may comprise a software and/or hardware module configured to store, retrieve, manage, and/or provide authentication credentials. For example, the third party security credential resource may be a third party security credential management application provided by way of a remote networked device, such as a server or processing device, maintained by a third party individual, company, or organization. The group-based communication server may access a third party application provided by a third party security credential resource 130 to execute functions, flows, or actions associated with an application authentication data packet. In various embodiments, the third party security credential resource 130 may at least generate and/or store one or more application authentication data packets comprising one or more authentication tokens associated with one or more user profiles. In various embodiments, a group-based communication server may interact with a third party security credential resource 130 to transmit an application authentication data packet comprising an application authentication request associated with a user identifier, a group-based communication workspace, and a client device. In various embodiments, a group-based communication server may interact with a third party security credential resource 130 to receive one or more application authentication data packets comprising on or more authentication tokens. In various embodiments, as a non-limiting example, the third party security credential resource 130 may comprise a security credential generation engine and/or a security credential repository. Further, in various embodiments, a third party security credential resource 130 may be configured to store user account credentials (e.g., user credential data) associated with a particular service application or set of service applications, and provide user account credentials to such service applications. For example, a third party security credential resource 130 may comprise a password manager, single sign-on service, token manager, and/or the like. In some embodiments a third party security credential resource 130 may be configured to provide a set of user credentials (e.g., username, password, identification number, and/or the like, or any combination thereof) associated with an application. Additionally, in various embodiments a credentials manager may be configured to provide authentication credentials automatically or in response to user engagement. In various embodiments, the group-based communication server 110 may transmit the application authentication data packet to a third party security credential resource 130 associated therewith based at least in part on one or more executable instructions defined within the application data associated with the application.

As shown at Block 1022, providing an application authentication data packet to a third party security credential resource 130 causes the third party security credential resource 130 to execute an authentication process based at least in part on the payload data (e.g., the user credential data). In various embodiments, the third party security credential resource 130 may authenticate the user account credentials (e.g., a username and a user password) associated with an application associated therewith by querying a database for a user account matching the user credential data provided by the client device at the interactive application authentication interface. Further, in this example embodiment, the third party security credential resource 130 may identify an authenticated user account associated with the application with the matching these user authentication credentials. Upon identifying a user account associated with the application that matches the corresponding user authentication credentials defined by the user credential data, the third party security credential resource 130 may generate an authentication token associated with the user credential data, the application identifier, the user identifier, and/or the group-based communication workspace. The third party security credential resource 130 may then transmit a response that includes an authentication confirmation signal and/or the authentication token associated with the application to the group-based communication server 110, as shown at Blocks 1023 and 1024.

Upon receiving an application authentication data packet comprising an authentication token from the third party security credential resource 130, as shown at Block 1025, the group-based communication server 110 may generate an authenticated application indicator associated with an application identifier and a user identifier associated with a group-based communication workspace, as described in further detail herein in reference to Block 1019. In various embodiments, for example, the group-based communication server 110 may associate the authenticated user credential data with a user profile associated with the user identifier, as described herein. Further, in various embodiments, the group-based communication server 110 may associate the various authenticated user credential data corresponding to each of the plurality of application identifiers associated with the application bundle identifier and a required user credential indicator with various workspace data associated with the group-based communication workspace associated with the authentication token.

As shown in Block 1026, the group-based communication server 110 may transmit the authenticated user credential data associated with user identifier, the group-based communication workspace and each of the plurality of application identifiers associated with the application bundle identifier and a required user credential indicator to a group-based communication repository 120 for storage. For example, the authenticated user credential data may be stored in a workspace storage location associated with the group-based communication workspace identifier.

In various embodiments, upon receiving an authentication token associated with the user credential data provided for each of the plurality of applications associated with the application bundle identifier and a required user credential indicator, the group-based communication server 110 may be configured to continue the installation process of the plurality of applications associated with the application bundle identifier, as described herein, based at least in part on the one or more executable instructions defined by the application bundle data.

Example Group-Based Communication Interfaces

A. Interactive Application Bundle Authorization Interface

The group-based communication server 110 may be configured to generate an interactive application bundle authorization interface for rendering within a group-based communication interface. Exemplary interactive application bundle authorization interface configurations 1100A, 1100B are presented in FIGS. 11A-11B. As described in further detail herein, the group-based communication server 110 may generate an interactive application bundle authorization interface in response to receiving an application bundle installation request associated with an application bundle identifier and a group-based communication workspace from a client device and determining that one or more of the application identifiers associated with the application bundle identifier requires further authorization to be installed within the group-based communication workspace. The interactive application bundle authorization interface may be generated for rendering within a group-based communication interface displayed at a client device associated with an administrator user (e.g., an enterprise administrator user, a workspace administrator user) associated with an administrator user identifier (an enterprise administrator user identifier, a workspace administrator user identifier) associated with a group-based communication workspace associated with the application bundle installation request.

Figure 11A:
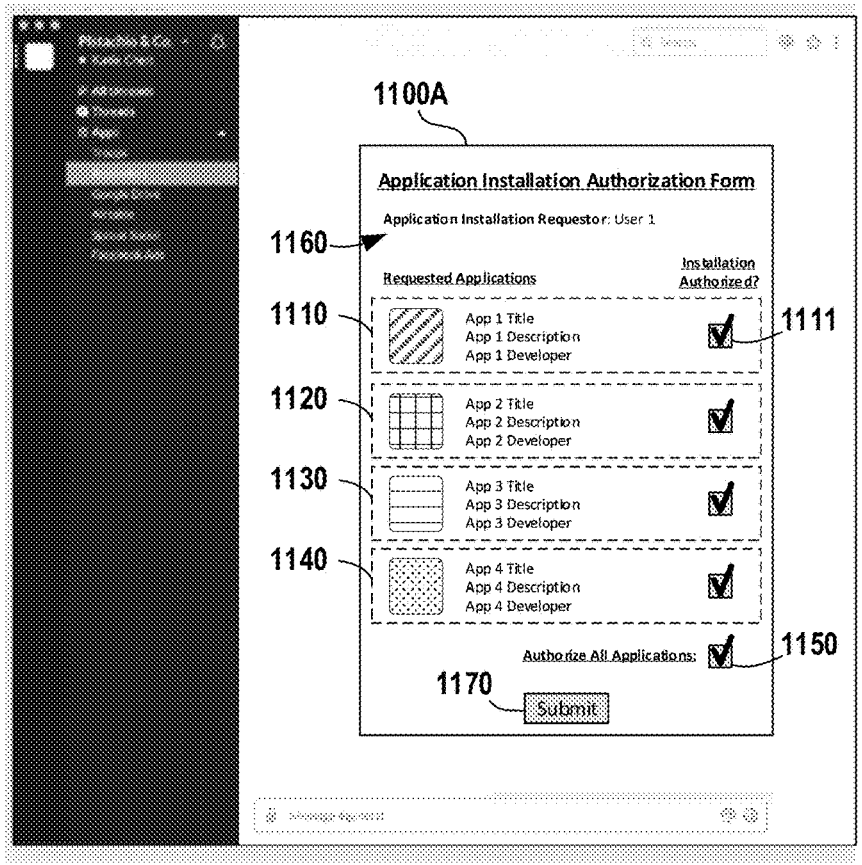
FIGS. 11A-11B illustrate an example group-based communication interface providing an interactive application bundle authorization interface.

FIG. 11A illustrates an exemplary interactive application bundle authorization interface 1100A generated by the group-based communication server 110 to be rendered within a group-based communication interface displayed at a client device associated with a workspace administrator user associated with a workspace administrator user identifier. As illustrated, the group-based communication interface may comprise a group-based communication channel interface configured to display group-based communication messages posted by one or more users in a channel messaging pane rendered within the group-based communication channel interface. Further, the group-based communication server may render the interactive application bundle authorization interface 1100A within the group-based communication interface.

In various embodiments, the interactive application bundle authorization interface 1100A may render installation request data 1160 associated with the application bundle installation request associated with the group-based communication workspace received by the group-based communication server 110. As illustrated, the installation request data 1160 rendered within the interactive application bundle authorization interface 1100A may comprise a user identifier associated with the application bundle installation request.

Further, in various embodiments, the interactive application bundle authorization interface 1100A may render one or more application identifiers 1110, 1120, 1130, 1140 associated with the application bundle identifier associated with the application bundle installation request received by the group-based communication server 110. For example, each of the one or more application identifiers rendered within the interactive application bundle authorization interface may have been determined by the group-based communication server 110 to require further authorization by the workspace administrator user to be installed within the group-based communication workspace. As illustrated, the interactive application bundle authorization interface 1100A comprises a list of a plurality of application identifiers 1110, 1120, 1130, 1140. In various embodiments, the application identifiers rendered within the interactive application bundle authorization interface 1100A may comprise data associated with the application associated therewith, such as, for example, an application title, an application description, an application developer identifier, and an application image.

In various embodiments, the interactive application bundle authorization interface 1100A may render at least one selectable element 1111 corresponding to one or more application identifiers 1110, 1120, 1130, 1140. In various embodiments, the interactive application bundle authorization interface may be configured to receive user input comprising a selection of one or more of the at least one selectable elements corresponding to one or more application identifiers. The administrator user selection of a selectable element 1111 may indicate a desire to authorize (or prohibit) the installation of the application 1110 associated with the selectable element 1111 within the group-based communication workspace. In various embodiments, a selectable element 1150 may correspond to each of the at least one application identifiers 1110, 1120, 1130, 1140 rendered within the interactive application bundle authorization interface, such that a selection of the selectable element 1150 may indicate a desire to authorize (or prohibit) the installation of each of the applications 1110, 1120, 1130, 1140 associated with the selectable element 1150 within the group-based communication workspace.

In various embodiments, the interactive application bundle authorization interface may comprise a selectable verification element 1170. In various embodiments, the selection of selectable element 1111 and subsequent selection of selectable verification element 1170 may generate an authorization signal indicating a desire of the workspace administrator user to authorize the installation within the group-based communication workspace of the application 1110 corresponding to the selected element 1111. Further, the selection of the selectable element 1150 and subsequent selection of the selectable verification element 1170 may generate an authorization signal indicating a desire of the workspace administrator user to authorize the installation of each of applications 1110, 1120, 1130, 1140 corresponding to the selected element 1150 within the group-based communication workspace.

Figure 11B:
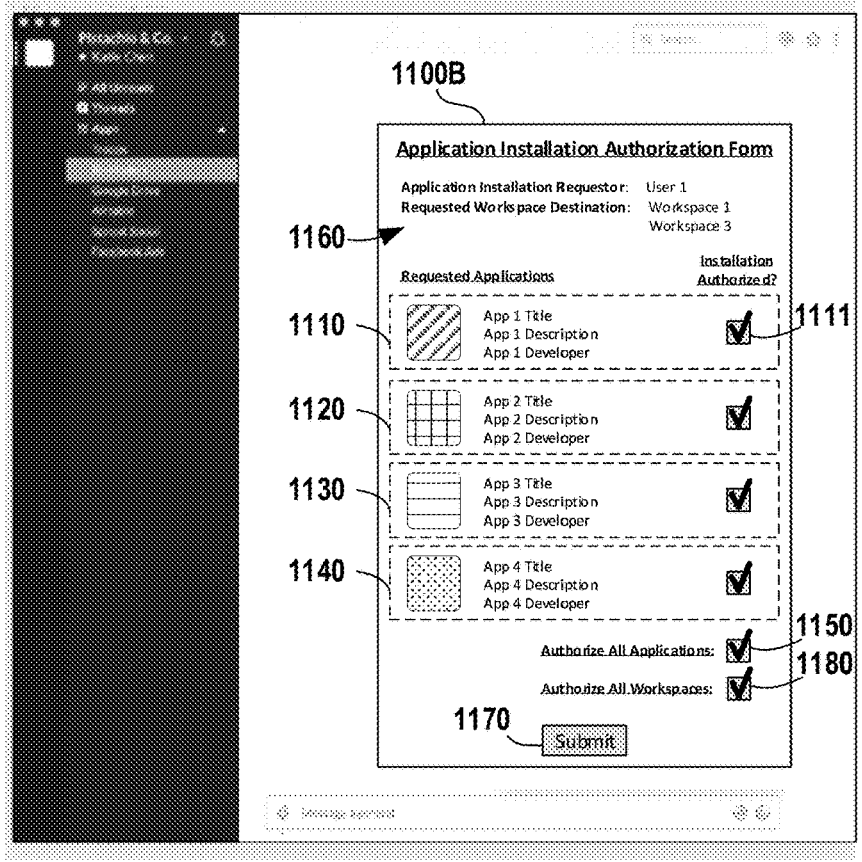

FIG. 11B illustrates an exemplary interactive application bundle authorization interface generated by the group-based communication server 110 to be rendered within a group-based communication interface displayed at a client device associated with an enterprise administrator user associated with an enterprise administrator user identifier. The illustrated exemplary interactive application bundle authorization interface 1110B comprises a similar configuration to that of interactive application bundle authorization interface 1110A illustrated in FIG. 11A. For example, interactive application bundle authorization interface 1110B comprises installation request data 1160; one or more application identifiers 1110, 1120, 1130, 1140 associated with the application bundle identifier; at least one selectable element 1111 corresponding to one or more application identifiers 1110, 1120, 1130, 1140; a selectable element 1150 corresponding to each of the at least one application identifiers 1110, 1120, 1130, 1140; and a selectable verification element 1170.

As described herein, the interactive application bundle authorization interface 1100B may render installation request data 1160 associated with the application bundle installation request received by the group-based communication server 110. The installation request data 1160 rendered within the interactive application bundle authorization interface 1100B may comprise a group-based communication workspace identifier associated with the application bundle installation request. In various embodiments, based on user input received at the client device associated with the user identifier associated with the application bundle installation request, the application bundle installation request may be associated with one or more group-based communication workspaces associated with the enterprise identifier. In such a circumstance, the installation request data 1160 rendered within the interactive application bundle authorization interface 1100B may comprise each of the one or more group-based communication workspace identifiers associated with the application bundle installation request.

Further, as illustrated in FIG. 11B, interactive application bundle authorization interface 1100B may comprise a selectable element 1180 corresponding to each of the group-based communication workspaces associated with the enterprise identifier associated with the enterprise administrator user identifier. In such a circumstance, a selection of the selectable element 1180 at the client device associated with the enterprise administrator user may indicate a desire to authorize (or prohibit) the installation of each of the selected applications 1110, 1120, 1130, 1140 (e.g., those applications corresponding to a selectable element that has been selected) within each of the group-based communication workspaces associated with the enterprise identifier associated with the enterprise administrator user identifier.

B. Interactive Application Bundle Generation Interface

The group-based communication server 110 may be configured to generate an interactive application bundle generation interface for rendering within a group-based communication interface. Exemplary interactive application bundle generation interface configuration 1200 is presented in FIG. 12. As described in further detail herein, the group-based communication server 110 may generate an interactive application bundle generation interface in response to receiving an application bundle generation request from a client device. The interactive application bundle generation interface may be generated for rendering within a group-based communication interface displayed at a client device associated with the user identifier associated with the application bundle generation request.

Figure 12:
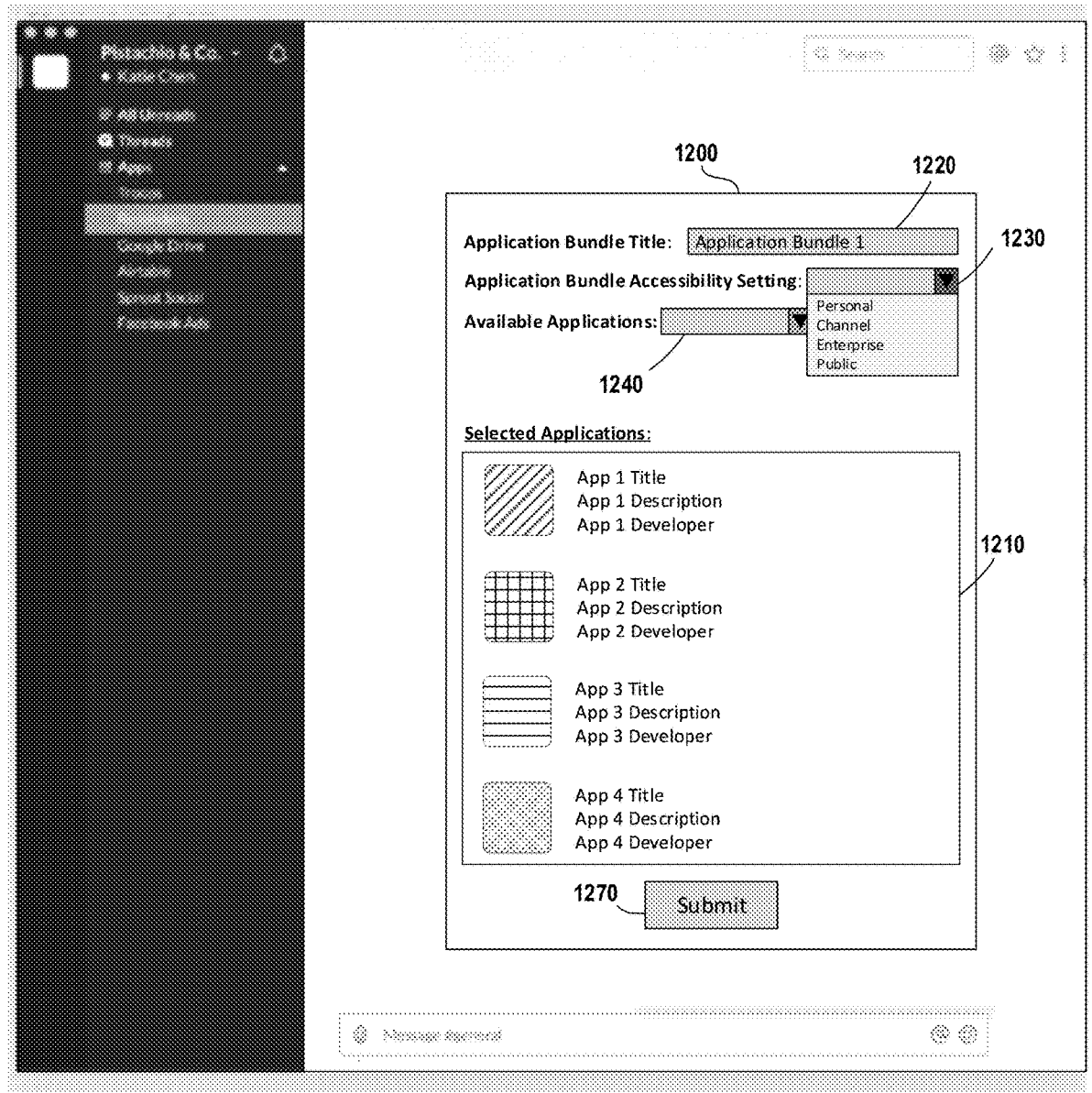
FIG. 12 shows an example group-based communication interface providing an interactive application bundle generation interface.

FIG. 12 illustrates an exemplary interactive application bundle generation interface 1200 generated by the group-based communication server 110 to be rendered within a group-based communication interface displayed at a client device associated with the user identifier associated with the application bundle generation request. As illustrated, the group-based communication interface may comprise a group-based communication channel interface configured to display group-based communication messages posted by one or more users in a channel messaging pane rendered within the group-based communication channel interface. Further, the group-based communication server may render the interactive application bundle generation interface 1200 within the group-based communication interface.

In various embodiments, the interactive application bundle generation interface 1200 may render at least one interactive dialog configured to receive user input at a client device configured to display the interactive application bundle generation interface. For example, as illustrated in FIG. 12, the interactive application bundle generation interface 1200 may include a first interactive dialog 1220 comprising a Tillable field configured to receive user input corresponding to application bundle title. Further, the interactive application bundle generation interface 1200 may render a second interactive dialog 1230 comprising a drop-down menu comprising a plurality of pre-defined selectable options, each option corresponding to a respective application bundle accessibility setting. A user may provide user input at a client device comprising a selection of one of the application bundle accessibility settings listed within the second interactive dialog 1230, the user selection being indicative of a desired application bundle accessibility setting to be associated with the application bundle identifier of the application bundle to be generated.

In various embodiments, the interactive application bundle generation interface 1200 may render a third interactive dialog 1240 comprising a drop-down menu comprising an application menu, as described herein, wherein the application menu comprises a list of selectable application identifier elements associated with applications associated with the user identifier associated with the client device displaying the interactive application bundle generation interface 1200 (e.g., the applications that have been installed within the group-based communication workspace by the user). Alternatively, in various embodiments, the third interactive dialog 1240 comprising the application menu may comprise a list of selectable application identifier elements associated with applications available to the user for installation within the group-based communication workspace from which the interactive application bundle generation interface 1200 was accessed, and/or a list of selectable application identifier elements associated with every application implemented within the group-based communication system 118.

In various embodiments, the interactive application bundle generation interface 1200 may be configured to render a selected application pane 1210 comprising a list of a plurality of application identifiers selected by the user at the third interactive dialog 1240 (e.g., the application menu), each listed application identifier corresponding to an application selected by the user to be included in the bundled plurality of applications associated with the application bundle to be generated. As illustrated, the plurality of application identifiers rendered within the selected application pane 1210 may comprise various application data associated with each of the plurality of applications associated therewith, such as, for example, an application title, an application description, an application developer identifier, an application image, and/or the like.

In various embodiments, the interactive application bundle generation interface 1200 may further render a selectable application bundle creation element 1270 configured to receive user selection thereof as confirmation of the desire of the user to create an application bundle configured according to the user input displayed at the interactive application bundle generation interface 1200 at the time of the user selection. In various embodiments, the selection of an application identifier at the third interactive dialog 1240 and subsequent selection of selectable application bundle creation element 1270 may generate application bundle configuration data to be transferred to the group-based communication server 110 in order to generate application bundle data based at least in part on the user input received by the client device at the interactive application bundle generation interface 1200.

C. Interactive Application Bundle Authentication Interface

The group-based communication server 110 may be configured to generate an interactive application bundle authentication interface for rendering within a group-based communication interface. Exemplary interactive application bundle authentication interface configuration 1300 is presented in FIG. 13. As described in further detail herein, the group-based communication server 110 may generate an interactive application bundle authentication interface in response to detecting one or more required user credential indicators associated with one or more of the plurality of application identifiers associated with the application bundle identifier. The interactive application bundle authentication interface may be generated for rendering within a group-based communication interface displayed at a client device associated with the user identifier associated with the application bundle installation request.

Figure 13:
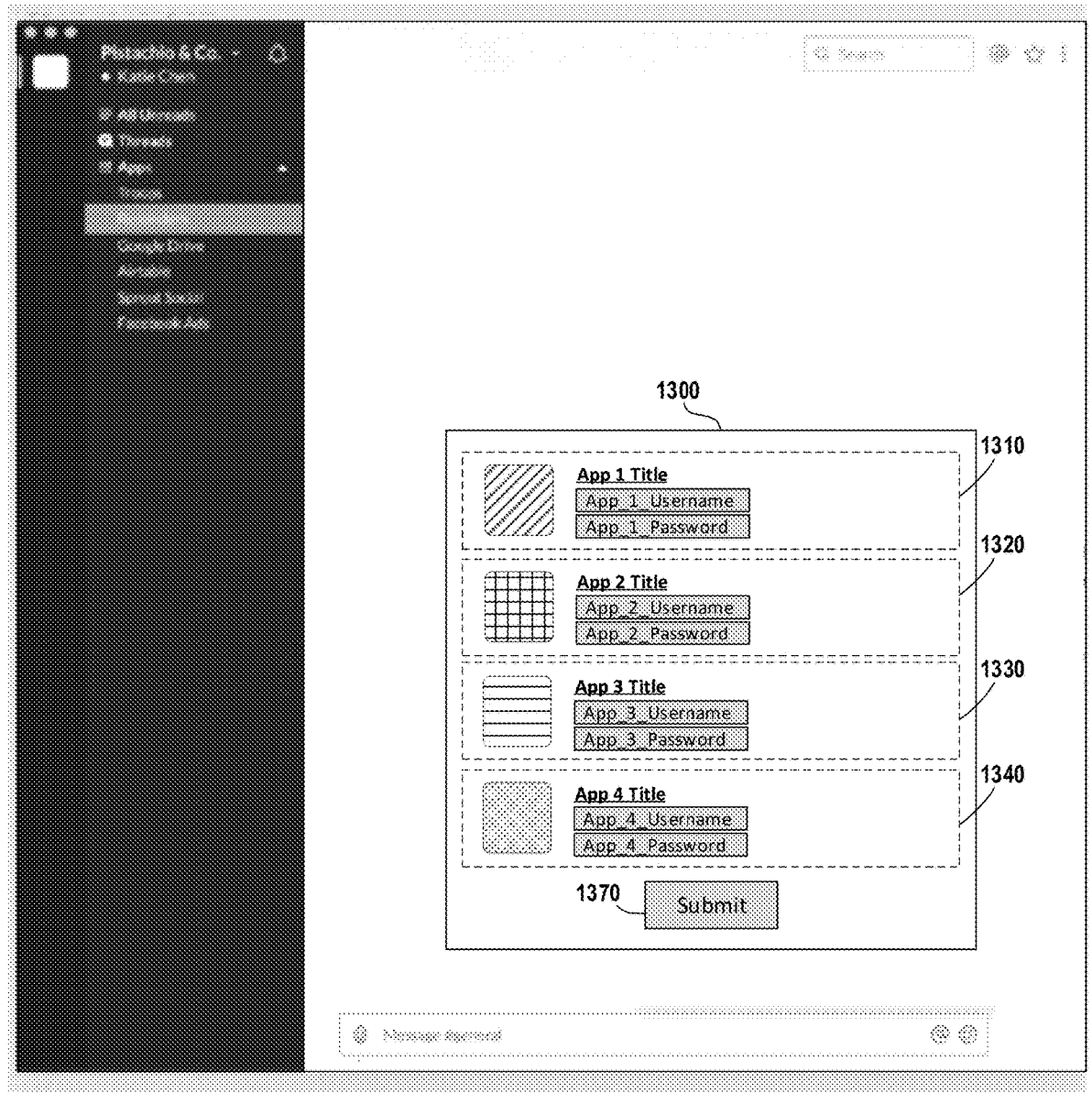
FIG. 13 shows an example group-based communication interface providing an interactive application bundle authentication interface.

FIG. 13 illustrates an exemplary interactive application bundle authentication interface 1300 generated by the group-based communication server 110 to be rendered within a group-based communication interface displayed at a client device associated with the user identifier associated with the application bundle installation request. As illustrated, the group-based communication interface may comprise a group-based communication channel interface configured to display group-based communication messages posted by one or more users in a channel messaging pane rendered within the group-based communication channel interface. Further, the group-based communication server may render the interactive application bundle authentication interface 1300 within the group-based communication interface.

In various embodiments, the interactive application bundle authentication interface 1300 may render one or more application identifiers 1310, 1320, 1330, 1340 associated with the application bundle identifier associated with the application bundle installation request received by the group-based communication server 110. For example, each of the one or more application identifiers rendered within the interactive application bundle authentication interface 1300 may have been determined by the group-based communication server 110 to be associated with a required user credential indicator, and further to not have been associated with an authenticated application indicator associated with the user identifier associated with a group-based communication workspace from which the interactive application bundle authentication interface 1300 was accessed. As illustrated, the interactive application bundle authentication interface 1300 comprises a list of a plurality of application identifiers 1310, 1320, 1330, 1340. In various embodiments, the application identifiers rendered within the interactive application bundle authentication interface 1300 may comprise data associated with the application associated therewith, such as, for example, an application title, an application description, an application developer identifier, and an application image.

In various embodiments, the interactive application bundle authorization interface 1100A may render at least one interactive dialogue corresponding to each of the plurality of application identifiers 1310, 1320, 1330, 1340. In various embodiments, the at least one interactive dialogues may comprise Tillable fields configured to receive user input comprising user credential data. The user credential data received by at least one interactive dialogues may comprise user information, such as, for example, a username and a user password, associated with a user account associated with an application associated with the corresponding application identifier rendered within the interactive application bundle authentication interface.

In various embodiments, the interactive application bundle authentication interface 1300 may further comprise a selectable application bundle authentication element 1370 configured to receive user selection thereof as confirmation of the desire of the user to transmit the user credential data input at the interactive application bundle authentication interface 1300 to each of the respective applications associated with the application identifiers 1310, 1320, 1330, 1340 rendered within the interactive application bundle authentication interface 1300 at the time of the user selection.

As shown in FIG. 13, the interactive application bundle authentication interface 1300 may be embodied as a single-page interface generated by the group-based communication server 110, wherein the application identifiers 1310, 1320, 1330, 1340 and corresponding interactive dialogues associated with each of the plurality of applications associated with a required user credential indicator are simultaneously rendered within a single interface page such that a user may provide user credential data associated with each of the applications prior to selecting the selectable application bundle authentication element. Alternatively, in various embodiments, the interactive application bundle authentication interface 1300 may be embodied as a multi-page interface comprising at least one application program interface (API) associated with each of the plurality of applications associated with a required user credential indicator, each of the plurality of APIs being defined by the application data and retrievable based at least in part on an executable instruction associated with the application bundle data. For example, each API of the plurality of APIs may comprise an application identifier associated with the application and one or more interactive dialogues configured to receive user input corresponding to the required user credential data. In various embodiments, the plurality of APIs may be configured so as to be sequentially rendered within the group-based communication interface, such that, for example, the group-based communication server 110 may render a second API upon determining that the required user credential data associated with a first application associated with a first API has been provided by the user at the first API.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although That which is claimed is:

1. An apparatus for authorizing within a group-based communication interface a bundled plurality of applications to be collectively installed in a group-based communication workspace enabling communications between client devices via a group-based communication system, the apparatus comprising at least one processor, and at least one non-transitory memory comprising instructions that, with the at least one processor, cause the apparatus to:

receive an application bundle installation request comprising application bundle data;

in response to receiving the application bundle installation request, retrieve the application bundle data from a group-based communication repository, the application bundle data comprising a plurality of application identifiers associated respectively with a plurality of applications and a least one executable instruction associated with each of the plurality of applications;

generate an application bundle authorization data packet comprising an application bundle installation authorization request and at least one authorization token corresponding to the plurality of applications associated with an application bundle identifier, wherein the application bundle installation authorization request is associated with the application bundle identifier and a group-based communication workspace identifier;

transmit the application bundle authorization data packet to at least one administrator client device respectively associated with at least one administrator user identifier associated with the group-based communication workspace identifier;

upon receiving a response from the at least one administrator client device, wherein the response comprises the least one authorization token corresponding with the plurality of applications associated with the application bundle identifier, generate a plurality of authorized application indicators respectively associated with each of the plurality of applications associated with the application bundle identifier, each of the plurality of authorized application indicators being associated with the group-based communication workspace identifier.

2. The apparatus of claim 1, wherein the at least one non-transitory memory further comprises instructions that, with the at least one processor, cause the apparatus to:

retrieve from the repository an available application table associated with the group-based communication workspace identifier, the available application table identifying one or more applications available for installation within a group-based communication workspace associated with the group-based communication workspace identifier;

parse the available application table to detect one or more of the plurality of application identifiers associated with the application bundle identifier; and determine, based at least in part on the available application table, whether each of the plurality of applications associated with the application bundle identifier are authorized.

3. The apparatus of claim 1, wherein the application bundle installation request identifying the application bundle identifier is received from a client device associated with a user identifier, the application bundle request being associated with one or more of the user identifier, the group-based communication workspace identifier, or the application bundle identifier, wherein the user identifier is associated with access rights to a group-based communication workspace associated with the group-based communication workspace identifier.

4. The apparatus of claim 1, wherein the at least one authorization token is associated with executable instructions to generate a plurality of authorized application indicators respectively associated with each of the plurality of applications associated with the application bundle identifier and the group-based communication workspace identifier.

5. The apparatus of claim 1, wherein the at least one non-transitory memory further comprises instructions that, with the at least one processor, cause the apparatus to:

execute the at least one executable instruction associated with the plurality of applications to install one or more of the plurality of applications at the group-based communication system such that all of the one or more of the plurality of applications is associated with one or more of a user identifier or a group-based communication workspace identifier, wherein the group-based communication workspace identifier is associated with a group-based communication workspace enabling communications between client devices via the group-based communication system, and wherein the user identifier is associated with access rights to a group-based communication workspace.

6. The apparatus of claim 1, wherein the application bundle data comprises application data respectively associated with each of the plurality of application identifiers.

7. The apparatus of claim 1, wherein the application bundle data comprises workflow data, wherein the workflow data is configured to cause a group-based communication system to facilitate execution of one or more steps required to install each of the plurality of the plurality of applications respectively associated with each of the plurality of application identifiers within a group-based communication workspace.

8. The apparatus of claim 1, wherein the at least one non-transitory memory further comprises instructions that, with the at least one processor, cause the apparatus to:

receive user credential data associated with a user identifier associated with a user profile and with at least one application of the plurality of applications associated with a corresponding application identifier of the plurality of application identifiers associated with the application bundle identifier; and transmit an application authentication data packet to the at least one application respectively associated with the corresponding application identifier of the plurality of application identifiers associated with the application bundle identifier, the application authentication data packet comprising the user credential data associated with the corresponding application identifier of the plurality of application identifiers; and receive at least one response from the at least one application, wherein the at least one response comprises at least one authentication token associated with the corresponding application identifier of the plurality of application identifiers, the user identifier, and the user credential data.

9. The apparatus of claim 8, wherein the at least one non-transitory memory further comprises instructions that, with the at least one processor, cause the apparatus to:

transmit an interactive application bundle authentication interface comprising at least one interactive dialogs, each of the at least one interactive dialogs being respectively the at least one application associated with a corresponding application identifier of the plurality of application identifiers associated with the application bundle identifier and configured to receive user credential data associated with the corresponding application identifier of the plurality of application identifiers associated with the application bundle identifier.

10. The apparatus of claim 8, wherein the at least one application comprises a plurality of unauthenticated applications, each of the plurality of unauthenticated applications being associated with a corresponding application identifier of the plurality of application identifiers.

11. The apparatus of claim 1, wherein the at least one administrator user identifier comprises a workspace administrator user identifier associated with a workspace administrator user, wherein the workspace administrator user is a user associated with a user profile that is associated with credentials that indicate that the administrator client device associated therewith may edit access control parameters associated with the group-based communication workspace identifier.

12. The apparatus of claim 1, wherein the at least one administrator user identifier comprises an enterprise administrator user identifier associated with an a enterprise administrator user and enterprise identifier associated with the group-based communication workspace identifier, wherein the enterprise administrator user is a user associated with a user profile having credentials indicating that the administrator client device associated therewith has permissions to edit access control parameters associated with a plurality of group-based communication workspaces associated with the enterprise identifier, the plurality of group-based communication workspaces comprising the group-based communication workspace.

13. The apparatus of claim 12, wherein the at least one authorization token comprises a plurality of authorization tokens comprising a first authorization token and a second authorization token, wherein the first authorization token is associated with the group-based communication workspace identifier and the second authorization token is associated with a second group-based communication workspace identifier associated with a second group-based communication workspace of the plurality of group-based communication workspace associated with the enterprise identifier.

14. The apparatus of claim 12, wherein the at least one administrator user identifier further comprises a workspace administrator user identifier associated with an a workspace administrator user and enterprise identifier associated with the group-based communication workspace identifier, wherein the workspace administrator user is a user associated with a user profile that is associated with credentials that indicate that the administrator client device associated therewith may edit access control parameters associated with the group-based communication workspace identifier.

15. The apparatus of claim 1, wherein transmitting the application bundle authorization data packet comprises causing display of an authorization interface for an administrator, wherein the authorization interface comprises at least a portion of the application bundle data and comprises an interactive element associated with each of the plurality of application identifiers configured for receipt of user input indicating authorization of installation of the applications associated with each of the plurality of application identifiers.

16. The apparatus of claim 1, wherein the application bundle authorization data packet further comprises an interactive application bundle authorization interface configured to display at least one of the plurality of application identifiers, wherein the interactive application bundle authorization interface may be configured such that the response received from the administrator client device corresponds with a selective authorization of one or more of the at least one of the plurality of application identifiers for installation within a group-based communication workspace.

17. The apparatus of claim 16, wherein the interactive application bundle authorization interface comprises a selectable element corresponding to each of the at least one of the plurality of application identifiers displayed within the interactive application bundle authorization interface, and wherein the response received from the administrator client device corresponds with a selective authorization of each of the at least one of the plurality of application identifiers for installation within the group-based communication workspace.

18. The apparatus of claim 1, wherein the at least one non-transitory memory further comprises instructions that, with the at least one processor, cause the apparatus to render a plurality of selectable elements respectively associated with each of the plurality of application identifiers for display within a group-based communication interface.

19. The apparatus of claim 1, wherein the at least one non-transitory memory further comprises instructions that, with the at least one processor, cause the apparatus to serially install at least a portion of the plurality of applications respectively associated with the plurality of application identifiers associated with the application bundle identifier such that the at least a portion of the plurality of applications are installed within a group-based communication workspace in a first sequence.

20. The apparatus of claim 1, wherein the at least one non-transitory memory further comprises instructions that, with the at least one processor, cause the apparatus to at least substantially simultaneously install at least a portion of the plurality of applications respectively associated with the plurality of application identifiers associated with the application bundle identifier.

21. The apparatus of claim 1, wherein the application bundle data further comprises an application bundle accessibility setting, the application bundle accessibility setting corresponding to data configured to define at least a portion of users of a group-based communication system to which a selectable element associated with the application bundle identifier is provided via a group-based communication interface associated with a corresponding user identifier associated therewith.

22. The apparatus of claim 1, wherein receiving an application bundle installation request comprises:
rendering an interactive application bundle generation interface comprising at least one interactive dialog configured to receive user input providing an application bundle identifier and at least one interactive listing of application identifiers available for inclusion within an application bundle associated with the application bundle identifier; and
receiving the application bundle data generated based at least in part on user input provided via the interactive application bundle generation interface.

23. The apparatus of claim 1, wherein receiving an application bundle installation request comprises:
rendering a bundle selection interface comprising a plurality of selectable elements each associated with one of a plurality of available application bundles; and receiving data identifying a user selection of an application bundle of the plurality of available application bundles for installation.

24. The apparatus of claim 1, wherein the at least one non-transitory memory further comprises instructions that, with the at least one processor, cause the apparatus to:
render within a group-based communication interface an available application bundle menu comprising a selectable application bundle element associated with the application bundle identifier;
wherein the available application bundle menu further comprises a recommended application bundle identifier, wherein the recommended application bundle identifier is generated based at least in part on one or both of historical data and contextual data associated with a user identifier associated with the client device.

25. A method for authorizing within a group-based communication interface a bundled plurality of applications to be collectively installed in a group-based communication workspace enabling communications between client devices via a group-based communication system, the method comprising:
receiving an application bundle installation request comprising application bundle data;
in response to receiving the application bundle installation request, retrieving the application bundle data from a group-based communication repository, the application bundle data comprising a plurality of application identifiers associated respectively with a plurality of applications and at least one executable instruction associated with each of the plurality of applications;
generating an application bundle authorization data packet comprising an application bundle installation authorization request and at least one authorization token corresponding to the plurality of applications associated with an application bundle identifier, wherein the application bundle installation authorization request is associated with the application bundle identifier and a group-based communication workspace identifier;
transmitting the application bundle authorization data packet to at least one administrator client device respectively associated with at least one administrator user identifier associated with the group-based communication workspace identifier;
upon receiving a response from the at least one administrator client device, wherein the response comprises the least one authorization token corresponding with the plurality of applications associated with the application bundle identifier,
generating a plurality of authorized application indicators respectively associated with each of the plurality of applications associated with the application bundle identifier, each of the plurality of authorized application indicators being associated with the group-based communication workspace identifier.

26. The method of claim 25, further comprising:
retrieving from the repository an available application table associated with the group-based communication workspace identifier, the available application table identifying one or more applications available for installation within a group-based communication workspace associated with the group-based communication workspace identifier;
parsing the available application table to detect one or more of the plurality of application identifiers associated with the application bundle identifier; and
determining, based at least in part on the available application table, whether each of the plurality of applications associated with the application bundle identifier are authorized.

27. The method of claim 25, wherein the application bundle installation request identifying the application bundle identifier is received from a client device associated with a user identifier, the application bundle request being associated with one or more of the user identifier, the group-based communication workspace identifier, or the application bundle identifier, wherein the user identifier is associated with access rights to a group-based communication workspace associated with the group-based communication workspace identifier.

28. The method of claim 25, wherein the at least one authorization token is associated with executable instructions to generate a plurality of authorized application indicators respectively associated with each of the plurality of applications associated with the application bundle identifier and the group-based communication workspace identifier.

29. The method of claim 25, further comprising executing the at least one executable instruction associated with the plurality of applications to install one or more of the plurality of applications at the group-based communication system such that all of the one or more of the plurality of applications is associated with one or more of a user identifier or a group-based communication workspace identifier, wherein the group-based communication workspace identifier is associated with a group-based communication workspace enabling communications between client devices via the group-based communication system, and wherein the user identifier is associated with access rights to a group-based communication workspace.

30. The method of claim 25, wherein the application bundle data comprises application data respectively associated with each of the plurality of application identifiers.

31. The method of claim 25, wherein the application bundle data comprises workflow data, wherein the workflow data is configured to cause a group-based communication system to facilitate execution of one or more steps required to install each of the plurality of the plurality of applications respectively associated with each of the plurality of application identifiers within a group-based communication workspace.

32. The method of claim 25, further comprising:
receiving user credential data associated with a user identifier associated with a user profile and with at least one application of the plurality of applications associated with a corresponding application identifier of the plurality of application identifiers associated with the application bundle identifier; and
transmitting an application authentication data packet to the at least one application respectively associated with the corresponding application identifier of the plurality of application identifiers associated with the application bundle identifier, the application authentication data packet comprising the user credential data associated with the corresponding application identifier of the plurality of application identifiers; and
receiving at least one response from the at least one application, wherein the at least one response comprises at least one authentication token associated with the corresponding application identifier of the plurality of application identifiers, the user identifier, and the user credential data.

33. The method of claim 25, wherein transmitting the application bundle authorization data packet comprises causing display of an authorization interface for an administrator, wherein the authorization interface comprises at least a portion of the application bundle data and comprises an interactive element associated with each of the plurality of application identifiers configured for receipt of user input indicating authorization of installation of the applications associated with each of the plurality of application identifiers.

34. The method of claim 32, further comprising:
transmitting an interactive application bundle authentication interface comprising at least one interactive dialogs, each of the at least one interactive dialogs being respectively the at least one application associated with a corresponding application identifier of the plurality of application identifiers associated with the application bundle identifier and configured to receive user credential data associated with the corresponding application identifier of the plurality of application identifiers associated with the application bundle identifier.

35. The method of claim 32, wherein the at least one application comprises a plurality of unauthenticated applications, each of the plurality of unauthenticated applications being associated with a corresponding application identifier of the plurality of application identifiers.

36. The method of claim 25, wherein the at least one administrator user identifier comprises a workspace administrator user identifier associated with a workspace administrator user, wherein the workspace administrator user is a user associated with a user profile that is associated with credentials that indicate that the administrator client device associated therewith may edit access control parameters associated with the group-based communication workspace identifier.

37. The method of claim 25, wherein the at least one administrator user identifier comprises an enterprise administrator user identifier associated with an a enterprise administrator user and enterprise identifier associated with the group-based communication workspace identifier, wherein the enterprise administrator user is a user associated with a user profile having credentials indicating that the administrator client device associated therewith has permissions to edit access control parameters associated with a plurality of group-based communication workspaces associated with the enterprise identifier, the plurality of group-based communication workspaces comprising the group-based communication workspace.

38. The method of claim 37, wherein the at the least one authorization token comprises a plurality of authorization tokens comprising a first authorization token and a second authorization token, wherein the first authorization token is associated with the group-based communication workspace identifier and the second authorization token is associated with a second group-based communication workspace identifier associated with a second group-based communication workspace of the plurality of group-based communication workspace associated with the enterprise identifier.

39. The method of claim 37, wherein the at least one administrator user identifier further comprises a workspace administrator user identifier associated with an a workspace administrator user and enterprise identifier associated with the group-based communication workspace identifier, wherein the workspace administrator user is a user associated with a user profile that is associated with credentials that indicate that the administrator client device associated therewith may edit access control parameters associated with the group-based communication workspace identifier.

40. The method of claim 25, wherein the application bundle authorization data packet further comprises an interactive application bundle authorization interface configured to display at least one of the plurality of application identifiers, wherein the interactive application bundle authorization interface may be configured such that the response received from the administrator client device corresponds with a selective authorization of one or more of the at least one of the plurality of application identifiers for installation within a group-based communication workspace.

41. The method of claim 40, wherein the interactive application bundle authorization interface comprises a selectable element corresponding to each of the at least one of the plurality of application identifiers displayed within the interactive application bundle authorization interface, and wherein the response received from the administrator client device corresponds with a selective authorization of each of the at least one of the plurality of application identifiers for installation within the group-based communication workspace.

42. The method of claim 25, further comprising:
rendering a plurality of selectable elements respectively associated with each of the plurality of application identifiers for display within a group-based communication interface.

43. The method of claim 25, further comprising:
serially installing at least a portion of the plurality of applications respectively associated with the plurality of application identifiers associated with the application bundle identifier such that the at least a portion of the plurality of applications are installed within a group-based communication workspace in a first sequence.

44. The method of claim 25, further comprising:
at least substantially simultaneously installing at least a portion of the plurality of applications respectively associated with the plurality of application identifiers associated with the application bundle identifier.

45. The method of claim 25, wherein the application bundle data further comprises an application bundle accessibility setting, the application bundle accessibility setting corresponding to data configured to define at least a portion of users of a group-based communication system to which a selectable element associated with the application bundle identifier is provided via a group-based communication interface associated with a corresponding user identifier associated therewith.

46. The method of claim 25, wherein receiving an application bundle installation request comprises:
rendering an interactive application bundle generation interface comprising at least one interactive dialog configured to receive user input providing an application bundle identifier and at least one interactive listing of application identifiers available for inclusion within an application bundle associated with the application bundle identifier; and
receiving the application bundle data generated based at least in part on user input provided via the interactive application bundle generation interface.

47. The method of claim 25, wherein receiving an application bundle installation request comprises:
rendering a bundle selection interface comprising a plurality of selectable elements each associated with one of a plurality of available application bundles; and
receiving data identifying a user selection of an application bundle of the plurality of available application bundles for installation.

48. The method of claim 25, further comprising:
  rendering within a group-based communication interface an available application bundle menu comprising a selectable application bundle element associated with the application bundle identifier;
  wherein the available application bundle menu further comprises a recommended application bundle identifier, wherein the recommended application bundle identifier is generated based at least in part on one or both of historical data and contextual data associated with a user identifier associated with the client device.

49. A computer program product for authorizing within a group-based communication interface a bundled plurality of applications to be collectively installed in a group-based communication workspace enabling communications between client devices via a group-based communication system, the computer program product comprising at least one non-transitory computer-readable storage medium having computer-readable program code portions stored herein, the computer-readable program code portions comprising an executable portion configured to:
  receive an application bundle installation request comprising application bundle data;
  in response to receiving the application bundle installation request, retrieve the application bundle data from a group-based communication repository, the application bundle data comprising a plurality of application identifiers associated respectively with a plurality of applications and at least one executable instruction associated with each of the plurality of applications;
  generate an application bundle authorization data packet comprising an application bundle installation authorization request and at least one authorization token corresponding to the plurality of applications associated with an application bundle identifier, wherein the application bundle installation authorization request is associated with the application bundle identifier and a group-based communication workspace identifier;
  transmit the application bundle authorization data packet to at least one administrator client device respectively associated with at least one administrator user identifier associated with the group-based communication workspace identifier;
  upon receiving a response from the at least one administrator client device, wherein the response comprises the least one authorization token corresponding with the plurality of applications associated with the application bundle identifier,
  generate a plurality of authorized application indicators respectively associated with each of the plurality of applications associated with the application bundle identifier, each of the plurality of authorized application indicators being associated with the group-based communication workspace identifier.

50. The computer program product of claim 49, wherein the computer-readable program code portions further comprise an executable portion configured to:
  retrieve from the repository an available application table associated with the group-based communication workspace identifier, the available application table identifying one or more applications available for installation within a group-based communication workspace associated with the group-based communication workspace identifier;
  parse the available application table to detect one or more of the plurality of application identifiers associated with the application bundle identifier; and
  determine, based at least in part on the available application table, whether each of the plurality of applications associated with the application bundle identifier are authorized.

51. The computer program product of claim 49, wherein the application bundle installation request identifying the application bundle identifier is received from a client device associated with a user identifier, the application bundle request being associated with one or more of the user identifier, the group-based communication workspace identifier, or the application bundle identifier, wherein the user identifier is associated with access rights to a group-based communication workspace associated with the group-based communication workspace identifier.

52. The computer program product of claim 49, wherein the at least one authorization token is associated with executable instructions to generate a plurality of authorized application indicators respectively associated with each of the plurality of applications associated with the application bundle identifier and the group-based communication workspace identifier.

53. The computer program product of claim 49, wherein the computer-readable program code portions further comprise an executable portion configured to execute the at least one executable instruction associated with the plurality of applications to install one or more of the plurality of applications at the group-based communication system such that all of the one or more of the plurality of applications is associated with one or more of a user identifier or a group-based communication workspace identifier, wherein the group-based communication workspace identifier is associated with a group-based communication workspace enabling communications between client devices via the group-based communication system, and wherein the user identifier is associated with access rights to a group-based communication workspace.

54. The computer program product of claim 49, wherein the application bundle data comprises application data respectively associated with each of the plurality of application identifiers.

55. The computer program product of claim 49, wherein the application bundle data comprises workflow data, wherein the workflow data is configured to cause a group-based communication system to facilitate execution of one or more steps required to install each of the plurality of the plurality of applications respectively associated with each of the plurality of application identifiers within a group-based communication workspace.

56. The computer program product of claim 49, wherein the computer-readable program code portions further comprise an executable portion configured to:
  receive user credential data associated with a user identifier associated with a user profile and with at least one application of the plurality of applications associated with a corresponding application identifier of the plurality of application identifiers associated with the application bundle identifier; and
  transmit an application authentication data packet to the at least one application respectively associated with the corresponding application identifier of the plurality of application identifiers associated with the application bundle identifier, the application authentication data packet comprising the user credential data associated with the corresponding application identifier of the plurality of application identifiers; and
  receive at least one response from the at least one application, wherein the at least one response comprises at least one authentication token associated with the corresponding application identifier of the plurality of application identifiers, the user identifier, and the user credential data.

57. The computer program product of claim 49, wherein transmitting the application bundle authorization data packet comprises causing display of an authorization interface for an administrator, wherein the authorization interface comprises at least a portion of the application bundle data and comprises an interactive element associated with each of the plurality of application identifiers configured for receipt of user input indicating authorization of installation of the applications associated with each of the plurality of application identifiers.

58. The computer program product of claim 56, wherein the computer-readable program code portions further comprise an executable portion configured to:
    transmit an interactive application bundle authentication interface comprising at least one interactive dialogs, each of the at least one interactive dialogs being respectively the at least one application associated with a corresponding application identifier of the plurality of application identifiers associated with the application bundle identifier and configured to receive user credential data associated with the corresponding application identifier of the plurality of application identifiers associated with the application bundle identifier.

59. The computer program product of claim 56, wherein the at least one application comprises a plurality of unauthenticated applications, each of the plurality of unauthenticated applications being associated with a corresponding application identifier of the plurality of application identifiers.

60. The computer program product of claim 49, wherein the at least one administrator user identifier comprises a workspace administrator user identifier associated with a workspace administrator user, wherein the workspace administrator user is a user associated with a user profile that is associated with credentials that indicate that the administrator client device associated therewith may edit access control parameters associated with the group-based communication workspace identifier.

61. The computer program product of claim 49, wherein the at least one administrator user identifier comprises an enterprise administrator user identifier associated with an a enterprise administrator user and enterprise identifier associated with the group-based communication workspace identifier, wherein the enterprise administrator user is a user associated with a user profile having credentials indicating that the administrator client device associated therewith has permissions to edit access control parameters associated with a plurality of group-based communication workspaces associated with the enterprise identifier, the plurality of group-based communication workspaces comprising the group-based communication workspace.

62. The computer program product of claim 61, wherein the at the least one authorization token comprises a plurality of authorization tokens comprising a first authorization token and a second authorization token, wherein the first authorization token is associated with the group-based communication workspace identifier and the second authorization token is associated with a second group-based communication workspace identifier associated with a second group-based communication workspace of the plurality of group-based communication workspace associated with the enterprise identifier.

63. The computer program product of claim 61, wherein the at least one administrator user identifier further comprises a workspace administrator user identifier associated with an a workspace administrator user and enterprise identifier associated with the group-based communication workspace identifier, wherein the workspace administrator user is a user associated with a user profile that is associated with credentials that indicate that the administrator client device associated therewith may edit access control parameters associated with the group-based communication workspace identifier.

64. The computer program product of claim 49, wherein the application bundle authorization data packet further comprises an interactive application bundle authorization interface configured to display at least one of the plurality of application identifiers, wherein the interactive application bundle authorization interface may be configured such that the response received from the administrator client device corresponds with a selective authorization of one or more of the at least one of the plurality of application identifiers for installation within a group-based communication workspace.

65. The computer program product of claim 64, wherein the interactive application bundle authorization interface comprises a selectable element corresponding to each of the at least one of the plurality of application identifiers displayed within the interactive application bundle authorization interface, and wherein the response received from the administrator client device corresponds with a selective authorization of each of the at least one of the plurality of application identifiers for installation within the group-based communication workspace.

66. The computer program product of claim 49, wherein the computer-readable program code portions further comprise an executable portion configured to render a plurality of selectable elements respectively associated with each of the plurality of application identifiers for display within a group-based communication interface.

67. The computer program product of claim 49, wherein the computer-readable program code portions further comprise an executable portion configured to:
    serially install at least a portion of the plurality of applications respectively associated with the plurality of application identifiers associated with the application bundle identifier such that the at least a portion of the plurality of applications are installed within a group-based communication workspace in a first sequence.

68. The computer program product of claim 49, wherein the computer-readable program code portions further comprise an executable portion configured to:
    at least substantially simultaneously install at least a portion of the plurality of applications respectively associated with the plurality of application identifiers associated with the application bundle identifier.

69. The computer program product of claim 49, wherein the application bundle data further comprises an application bundle accessibility setting, the application bundle accessibility setting corresponding to data configured to define at least a portion of users of a group-based communication system to which a selectable element associated with the application bundle identifier is provided via a group-based communication interface associated with a corresponding user identifier associated therewith.

70. The computer program product of claim 49, wherein receiving an application bundle installation request comprises:

rendering an interactive application bundle generation interface comprising at least one interactive dialog configured to receive user input providing an application bundle identifier and at least one interactive listing of application identifiers available for inclusion within an application bundle associated with the application bundle identifier; and receiving the application bundle data generated based at least in part on user input provided via the interactive application bundle generation interface.

71. The computer program product of claim 49, wherein receiving an application bundle installation request comprises:

rendering a bundle selection interface comprising a plurality of selectable elements each associated with one of a plurality of available application bundles; and receiving data identifying a user selection of an application bundle of the plurality of available application bundles for installation.

72. The computer program product of claim 49, wherein the computer-readable program code portions further comprise an executable portion configured to:

render within a group-based communication interface an available application bundle menu comprising a selectable application bundle element associated with the application bundle identifier;

wherein the available application bundle menu further comprises a recommended application bundle identifier, wherein the recommended application bundle identifier is generated based at least in part on one or both of historical data and contextual data associated with a user identifier associated with the client device.

* * * * *